(12) United States Patent
Gomi et al.

(10) Patent No.: US 7,088,399 B2
(45) Date of Patent: Aug. 8, 2006

(54) SIGNAL PROCESSING APPARATUS SIGNAL PROCESSING METHOD PROGRAM AND RECORDING MEDIUM FOR DETECTING A POSITION IN A PATTERN CORRESPONDING TO NOISE

(75) Inventors: Shinichiro Gomi, Chiba (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 10/265,662

(22) Filed: Oct. 8, 2002

(65) Prior Publication Data

US 2003/0071922 A1  Apr. 17, 2003

(30) Foreign Application Priority Data

Oct. 9, 2001 (JP) ............................. 2001-311523
Oct. 9, 2001 (JP) ............................. 2001-311524

(51) Int. Cl.
*H04N 9/78* (2006.01)
*H04N 5/21* (2006.01)

(52) U.S. Cl. ...................... 348/663; 348/624; 348/630; 348/666

(58) Field of Classification Search ............... 348/663, 348/666, 606, 607, 615, 618, 619, 621, 624, 348/625, 630, 712, 713; 382/165, 254, 275, 382/266, 267; H04N 5/21, 9/77, 9/78, 9/64
See application file for complete search history.

(56) References Cited

U.S. PATENT DOCUMENTS 4,754,322 A * 6/1988 Okuda et al. ............... 348/669
4,814,863 A * 3/1989 Topper et al. .............. 348/666

* cited by examiner

*Primary Examiner*—Sherrie Hsia
(74) *Attorney, Agent, or Firm*—Oblon, Spivak, McClelland, Maier & Neustadt, P.C.

(57) ABSTRACT

A dot detection section of a dot-interference detection section detects a portion where pixels are arranged as "dark-bright-dark" or "bright-dark-bright" in the horizontal direction, within a Y signal containing dot interference, separated by a YC separation process, and outputs the detection result as dot values to a horizontal array checking section and a vertical array checking section. The horizontal array checking section detects whether or not dot values of a predetermined number of pixels arranged horizontally in such a manner as to contain a subject pixel, have the same value. The vertical array checking section detects whether or not dot values of a predetermined number of pixels arranged vertically in such a manner as to contain a subject pixel, are alternately generated as 1 and 2. An enhancement processing section performs an enhancement process on the Y signal of portions other than the portions where dot interference occurs.

9 Claims, 48 Drawing Sheets

FIG. 3
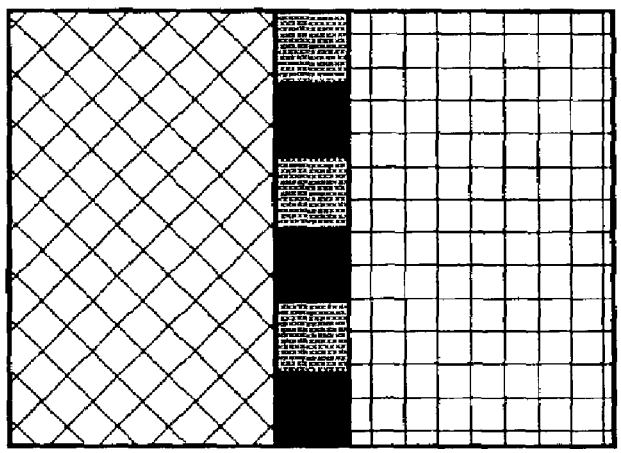
DOT INTERFERENCE
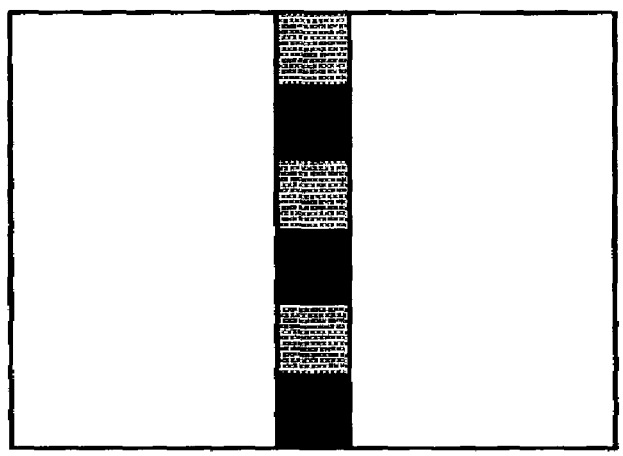
DOT INTERFERENCE
DETECTION d[i][j]=1 d[i][j]=2

FIG. 8 d[i][j-2] d[i][j-1] d[i][j] d[i][j+1] d[i][j+2]

WHEN h_num = 3

FIG. 10A

| j-2 | j-1 | j |
|---|---|---|
| d=2 | d=2 | d=2 |

FIG. 10B

| j-1 | j | j+1 |
|---|---|---|
| d=2 | d=2 | d=2 |

FIG. 10C

| j | j+1 | j+2 |
|---|---|---|
| d=2 | d=2 | d=2 |

WHEN v_num = 3

FIG. 27

| | | | | | |
|---|---|---|---|---|---|
| U | V | ⟨C[i−1][j]⟩<br>U | V | U | |
| V | U | ⟨C[i][j]⟩<br>V | U | V | |
| U | V | ⟨C[i+1][j]⟩<br>U | V | U | |

FIG. 29

| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |

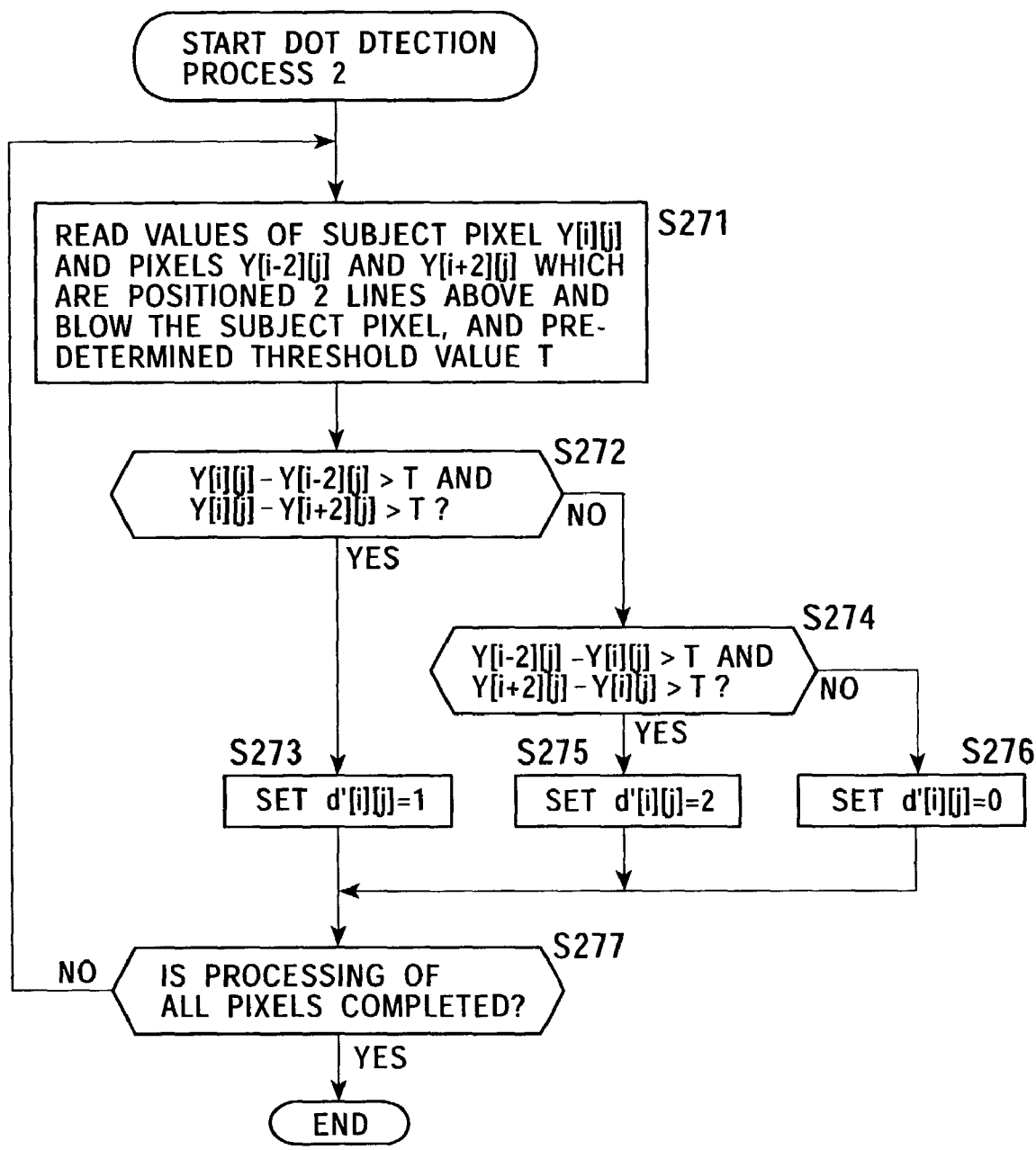

WHEN v_num = 3

FIG. 47

| | | | | | | | | | | | | |
|---|---|---|---|---|---|---|---|---|---|---|---|---|
| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |
| 1 | 0 | 1 | 0 | 0 | 0 | 0 | 0 | 0 | 0 | −1 | 0 | −1 |

SIGNAL PROCESSING APPARATUS SIGNAL PROCESSING METHOD PROGRAM AND RECORDING MEDIUM FOR DETECTING A POSITION IN A PATTERN CORRESPONDING TO NOISE

BACKGROUND OF THE INVENTION

1. Field of the Invention

The present invention relates to a signal processing apparatus, a signal processing method, a program, and a recording medium. More particularly, the present invention relates to a signal processing apparatus, for example, which is capable of detecting the position of noise having a specific pattern, generated as a result of YC separation, from a signal after being subjected to a YC separation process, to a signal processing method therefor, to a program therefor, and to a recording medium therefor.

2. Description of the Related Art

In the composite video system, a color video signal in which a Y signal, which is a luminance signal, and a C signal, which is a color signal, are combined is used to improve transmission efficiency. Extraction of the luminance signal Y and the color signal C from the combined signal of the Y signal and the C signal (so-called composite signal) is called YC separation (or luminance/color-difference separation). The composite signal can be transmitted using one cable. With respect to a composite signal, a technology for performing inter-frame YC separation on a still portion of a video signal and for performing intra-field (between lines) YC separation on a moving image portion is disclosed in, for example, Japanese Unexamined Patent Application Publication No. 10-322718.

However, in the current signal processing technology, it is not possible to completely separate the Y signal and the C signal once they are combined. As a result, noise, called dot interference or cross color, due to the fact that YC separation is not perfect, occurs in a signal on which YC separation is performed. In the conventional YC separation technology, it is not possible to completely eliminate this noise due to detection errors, intra-field YC separation errors, etc., in the still portion and the moving portion.

Dot interference refers to a phenomenon in which black dots which do not exist in the original signal occur in the reproduced image (in most cases, these occur in an arranged manner in the horizontal direction). The dot interference is noise which is likely to occur in edge portions where the color changes.

In this manner, when image processing is performed using a signal containing noise after the YC separation processing, there is a risk that, for example, as a result of the noise portion being enhanced further by enhancement processing, or as a result of performing an enlarging process on an image in which noise has occurred, an image having conspicuous noise portions is generated. Furthermore, when a filtering process is performed at the same time as YC separation processing in order to reduce the influence of noise, there is a risk that the resolution of the portion where no noise occurs will be reduced.

SUMMARY OF THE INVENTION

The present invention has been made in view of such circumstances. An object of the present invention is to perform image processing while avoiding noise portions by detecting, with higher accuracy, noise portions from a video signal containing noise, which is obtained by YC separation, and to generate a better image by performing the most appropriate noise reduction process on portions where noise occurs.

To achieve the above-mentioned object, in one aspect, the present invention provides a signal processing apparatus comprising a detection section for detecting a position at which a specific pattern, corresponding to noise which occurs after an image signal is separated into component signals, is generated, from one or more of the component signals within the two or more component signals generated by the separation.

The detection section may detect the position at which the specific pattern is generated when the one or more of the component signals are arranged at a predetermined pattern in the vertical direction or in the horizontal direction.

The signal processing apparatus may further comprise an extraction section for extracting a position of an image having a predetermined feature on the basis of one or more of the other of the component signals within the component signals generated by the separation, wherein the detection section detects the position at which the specific pattern is generated on the basis of data of one or more of the component signals corresponding to the image position extracted by the extraction section.

The predetermined feature may be a color edge.

The separation may be YC separation.

The signal processing apparatus may further comprise an enhancement processing section for performing enhancement processing on the component signal, wherein the enhancement processing section performs enhancement processing on the component signal which is not detected by the detection section as a signal indicating the position at which the specific pattern corresponding to the noise is generated.

The signal processing apparatus may further comprise a filtering processing section for performing a filtering process on the component signal, wherein the filtering processing section performs a filtering process on the component signal which is detected by the detection section as a signal indicating the position at which the specific pattern corresponding to the noise is generated.

The signal processing apparatus may further comprise an interpolation section for performing an interpolation process by using the component signal after being subjected to a filtering process by the filtering processing section.

In another aspect, the present invention provides a signal processing method comprising a detection step of detecting a position at which a specific pattern, corresponding to noise which occurs after an image signal is separated into component signals, is generated, from one or more of the component signals within the two or more component signals generated by the separation.

In another aspect, the present invention provides a computer-executable program comprising a detection step of detecting a position at which a specific pattern, corresponding to noise which occurs after an image signal is separated into component signals, is generated, from one or more of the component signals within the two or more component signals generated by the separation.

In the signal processing apparatus, the signal processing method, and the program of the present invention, a position at which a specific pattern, corresponding to noise which occurs after an image signal is separated into component signals, is generated, is detected from one or more of the component signals within the two or more component signals generated by the separation. Thus, since a dot-interference portion having a specific pattern can be accurately detected from, for example, a video signal containing dot interference, obtained by YC separation, it is possible to generate a better image by performing image processing while avoiding noise portions and by performing the most appropriate noise reduction process on the portions where noise occurs.

BRIEF DESCRIPTION OF THE DRAWINGS

FIG. 3 illustrates dot interference resulting from YC separation;

FIG. 8 illustrates pixels to be obtained;

FIGS. 10A, 10B, and 10C illustrate a horizontal array pattern;

FIG. 27 illustrates an input color signal;

FIG. 29 illustrates an edge detection filter;

FIG. 38 is a flowchart illustrating a dot detection process 2;

FIG. 47 illustrates an edge detection filter;

DESCRIPTION OF THE PREFERRED EMBODIMENTS

Embodiments of the present invention will be described below with reference to the drawings.

[Enhancement Process for NTSC Color Image Signal]

Figure 1:
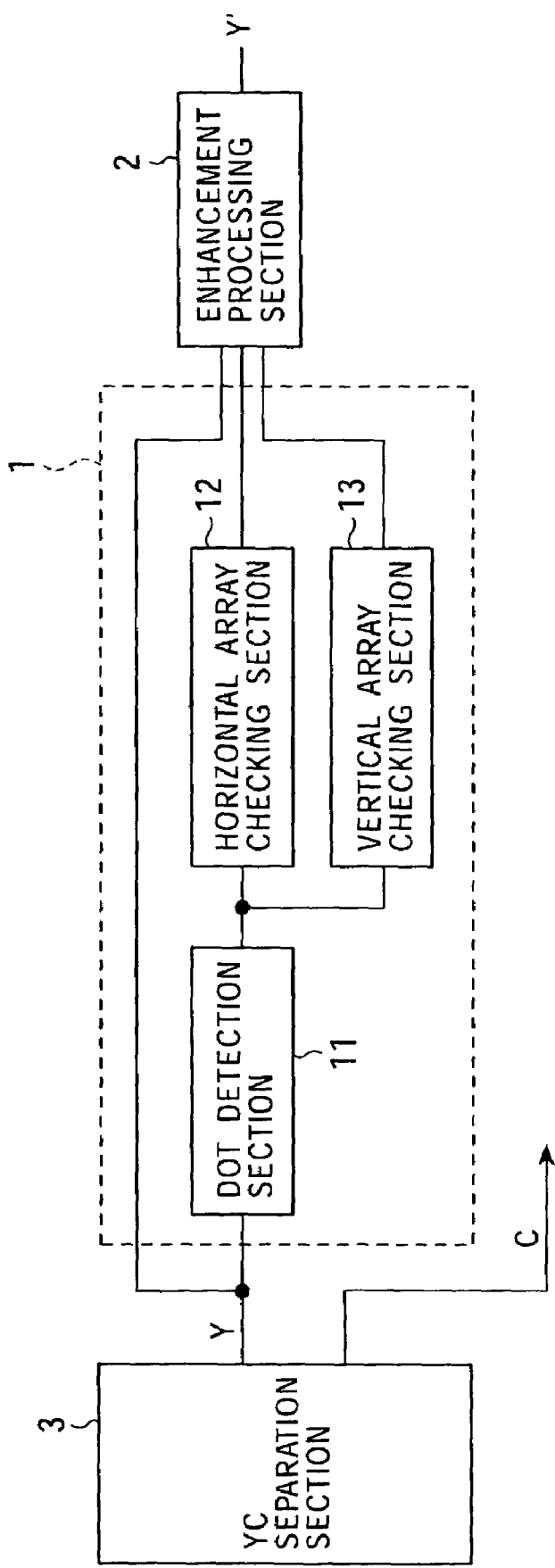
FIG. 1 is a block diagram illustrating a first embodiment of the present invention.

FIG. 1 is a block diagram illustrating a first embodiment of the present invention. In the first embodiment, a description will be given of processing for a Y signal after an NTSC (National Television System Committee) color image signal is YC-separated.

Figure 2:
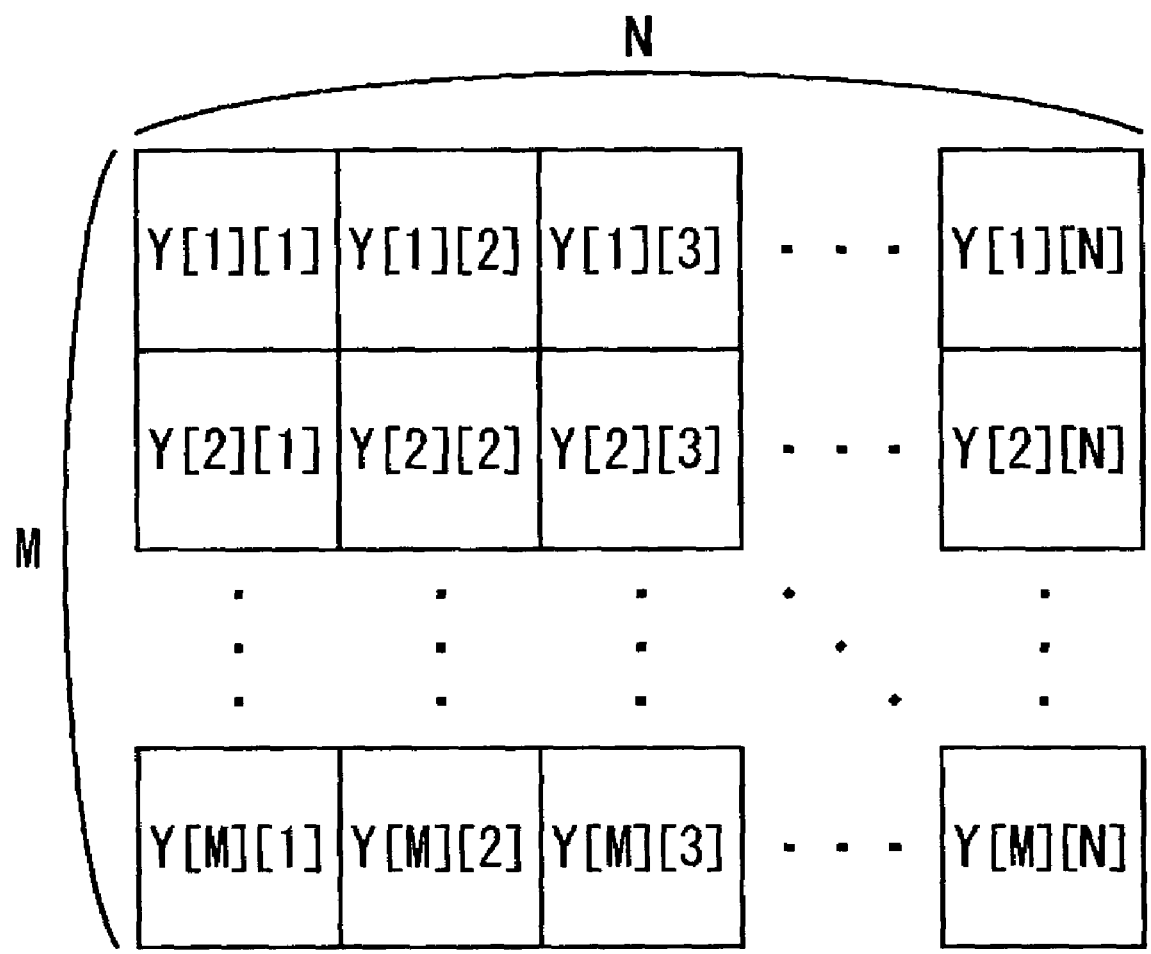
FIG. 2 illustrates an input Y signal.

A dot-interference detection section 1 receives an input of a Y signal containing dot interference, separated by a YC separation section 3 for performing a YC separation process which is similar to a conventional process, detects the position at which dot interference has occurred, and outputs the position to an enhancement processing section 2 together with the input Y signal. As shown in FIG. 2, the Y signal is input as an M×N pixel array signal to the dot-interference detection section 1 and the enhancement processing section 2.

For a subject pixel within the input Y signal, a dot detection section 11 compares the subject pixel with pixels positioned above and below the subject pixel in the array and, as shown in FIG. 3, detects a portion where pixels are arranged as "dark-bright-dark" or "bright-dark-bright" in the vertical direction, and outputs the detection result as dot values d[i][j] to a horizontal array checking section 12 and a vertical array checking section 13.

The horizontal array checking section 12 determines whether or not the dot values d[i][j] of a predetermined number of pixels arranged horizontally in such a manner as to contain the subject pixel are the same as each other, and outputs the detection result to the enhancement processing section 2. The number of horizontal arrays may be set as desired.

The vertical array checking section 13 detects whether or not the dot values d[i][j] of a predetermined number of pixels arranged vertically in such a manner as to contain the subject pixel are alternately generated as 1 and 2, and outputs the detection result to the enhancement processing section 2. The number of vertical arrays may be set as desired.

The enhancement processing section 2 receives an input of a Y signal from the dot-interference detection section 1, detects a portion where dot interference is thought to have occurred on the basis of the signal input from the horizontal array checking section 12 and the vertical array checking section 13 of the dot-interference detection section 1, and performs an enhancement process on the Y signal of portions other than the portions where dot interference has occurred.

Figure 4:
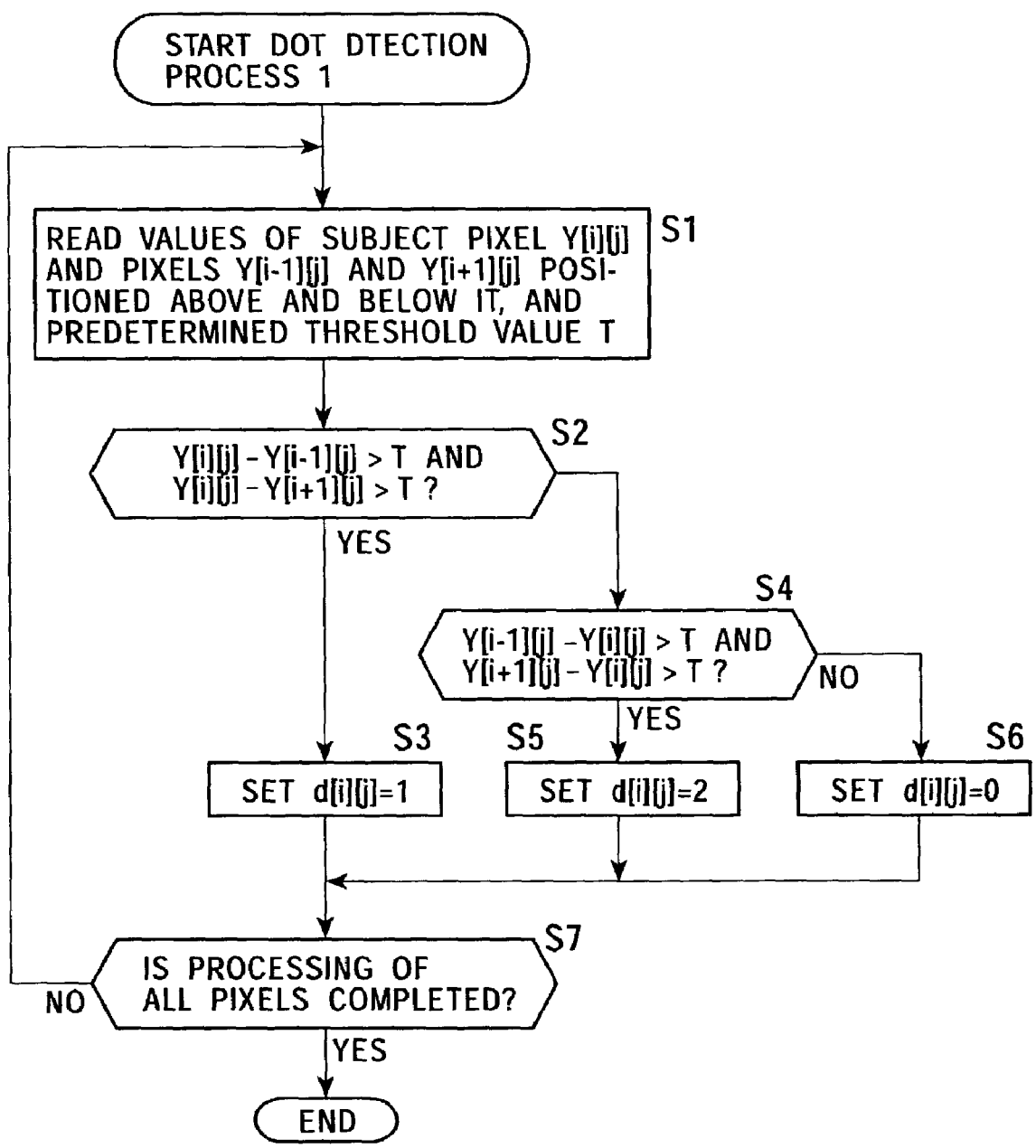
FIG. 4 is a flowchart illustrating a dot-interference detection process 1.

Next, referring to the flowchart in FIG. 4, a description will be given of a dot detection process 1 performed by the dot detection section 11.

Figure 5:
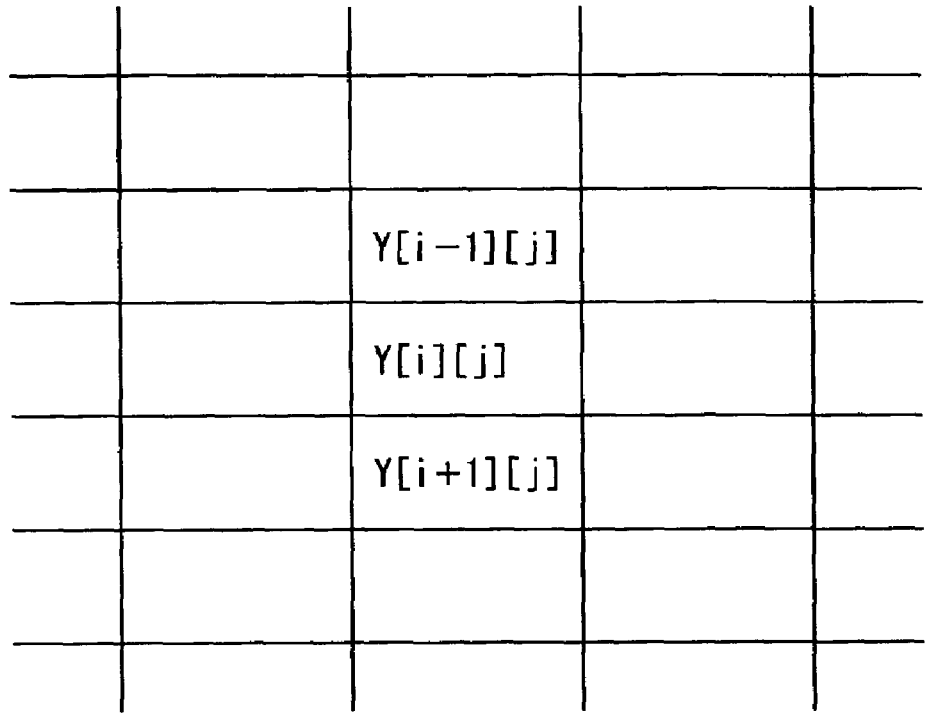
FIG. 5 illustrates pixels to be obtained.

In step S1, the dot detection section 11 reads the values of a subject pixel Y[i][j], and pixels Y[i−1][j] and Y[i+1][j] positioned above and below the subject pixel, as shown in FIG. 5, from the input Y signal, and reads a predetermined threshold value T for detecting a dot.

The threshold value T can be set as desired. When the value of T is set to a higher value, this array is detected as dots in the horizontal array only when the pixel values differ greatly, and when the value of T is set to a lower value, this array is easily detected as dots even if the pixel values do not differ greatly. Therefore, when the original image contains many color edges and is likely to cause dot interference or when the original image contains data which is likely to be mis-detected as dot interference, the set value is changed according to the original image corresponding to the input Y signal, thus making it possible to perform the most appropriate dot detection.

In step S2, the dot detection section 11 determines whether or not Y[i][j]−Y[i−1][j]>T and Y[i][j]−Y[i+1][j]>T on the basis of the pixel values and the threshold value T, which are obtained in step S1.

Figure 6A:
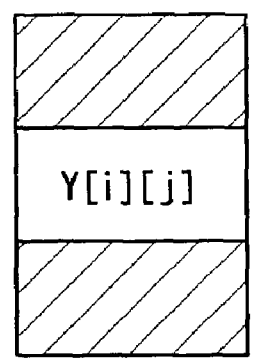
FIGS. 6A and 6B illustrate a dot value to be output.

When it is determined in step S2 that Y[i][j]−Y[i−1][j]>T and Y[i][j]−Y[i+1][j]>T, the subject pixel Y[i][j] and the pixels Y[i−1][j] and Y[i+1][j], which are positioned above and below the subject pixel, are arranged as "dark-bright-dark" in the vertical direction, as shown in FIG. 6A. Therefore, in step S3, the dot detection section 11 sets the dot value d[i][j]=1.

When it is determined in step S2 that Y[i][j]−Y[i−1][j]>T and Y[i][j]−Y[i+1][j]>T are not satisfied, in step S4, the dot detection section 11 determines whether or not Y[i−1][j]−Y[i][j]>T and Y[i+1][j]−Y[i][j]>T on the basis of the pixel values and the threshold value, which are obtained in step S1.

Figure 6B:
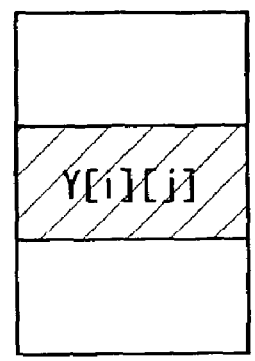

When it is determined in step S4 that Y[i−1][j]−Y[i][j]>T and Y[i+1][j]−Y[i][j]>T, since the subject pixel Y[i][j] and the pixels Y[i−1][j] and Y[i+1][j] positioned above and below the subject pixel are arranged as "bright-dark-bright" in the vertical direction, as shown in FIG. 6B, in step S5, the dot detection section 11 sets the dot value d[i][j]=2.

When it is determined in step S4 that Y[i−1][j]−Y[i][j]>T and Y[i+1][j]−Y[i][j]>T are not satisfied, since the subject pixel Y[i][j], and the pixels Y[i−1][j] and Y[i+1][j], positioned above and below the subject pixel, are not arranged as "dark-bright-dark" or "bright-dark-bright" in the vertical direction, in step S6, the dot detection section 11 sets the dot value d[i][j]=0.

After the process of step S3, S5, or S6, in step S7, the dot detection section 11 determines whether or not the processing of all the pixels is completed. When it is determined in step S7 that the processing is not completed, the process returns to step S1, and this and subsequent processes are repeated. When it is determined in step S7 that the processing of all the pixels is completed, the processing is terminated.

As a result of the processes described with reference to FIG. 4, when the subject pixel Y[i][j] and the pixels Y[i−1][j] and Y[i+1][j], positioned above and below the subject pixel, are arranged as "dark-bright-dark" or "bright-dark-bright" in the vertical direction, this array is detected, the dot values are set based on the detection result, and these values are output to the horizontal array checking section 12 and the vertical array checking section 13.

Figure 7:
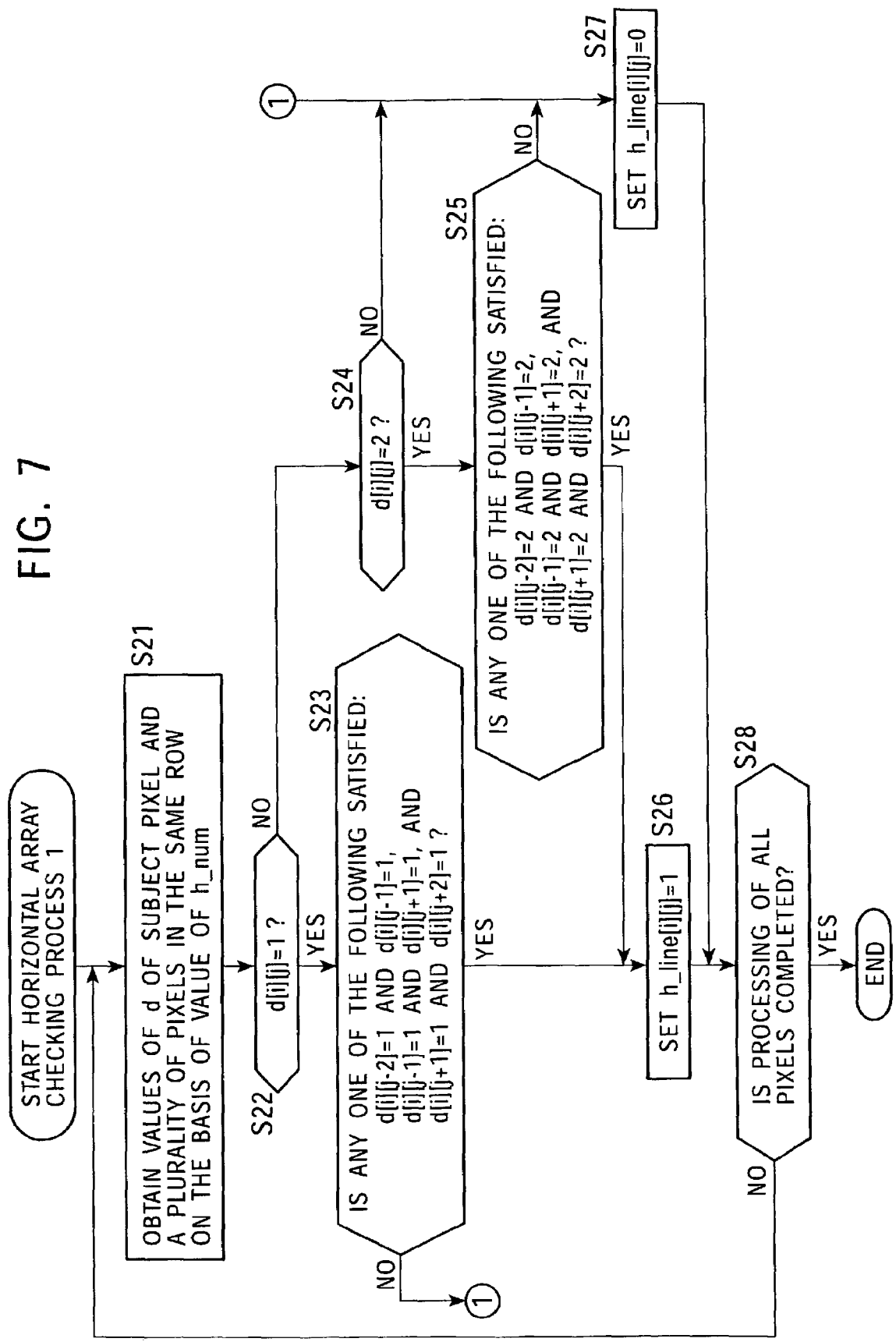
FIG. 7 is a flowchart illustrating a horizontal array checking process 1.

Next, referring to the flowchart in FIG. 7 a description will be given of a horizontal array checking process 1 performed by the horizontal array checking section 12.

In step S21, the horizontal array checking section 12 obtains the dot values d of the subject pixel and a plurality of pixels in the same row on the basis of the value of h_num, which is a value indicating the number of checking of a horizontal array. Although h_num can be set as desired, the case of h_num=3 will be described here.

Figure 8:
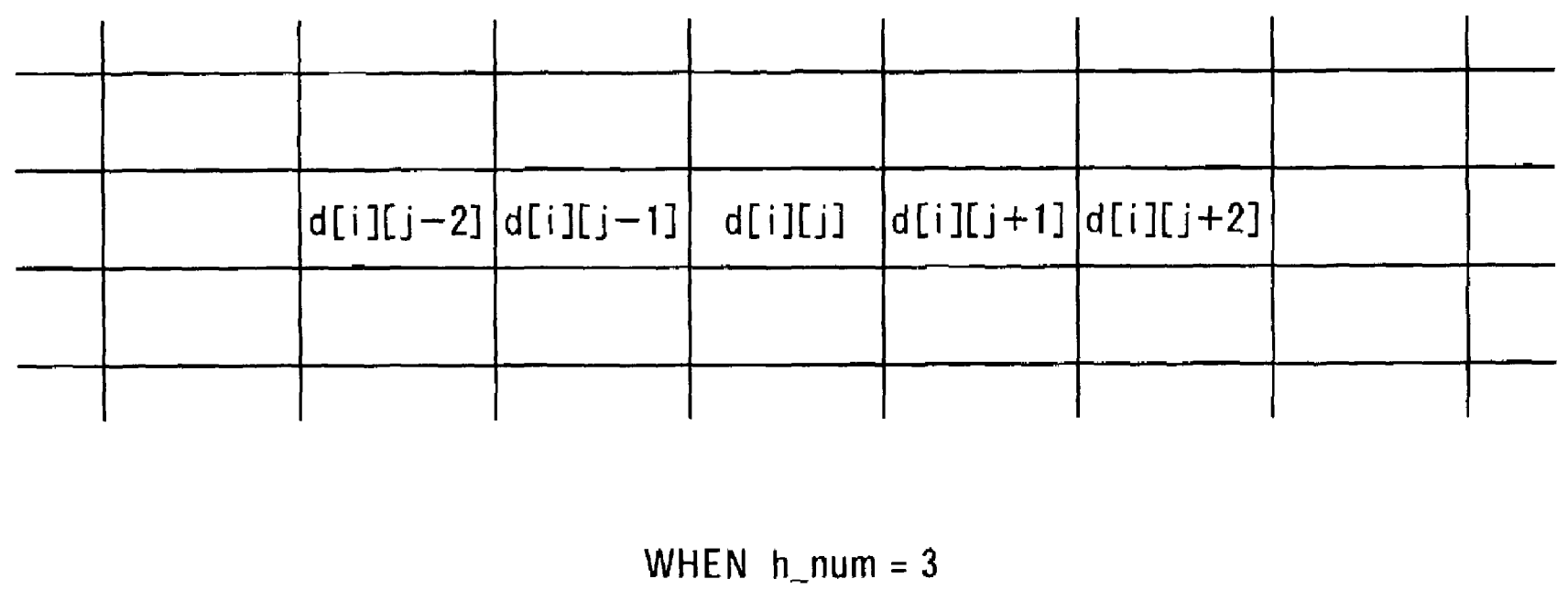

In the case of h_num=3, as shown in FIG. 8, with the dot value d[i][j] of the subject pixel as the center, the dot values d[i][j−2], d[i][j−1], d[i][j], d[i][j+1], and d[i][j+2] of five horizontally arranged pixels are obtained. When the three pixels containing the subject pixel have the same dot value, there are cases in which, as shown in FIG. 9A, d[i][j−2], d[i][j−1], and d[i][j] have the same dot value, cases in which, as shown in FIG. 9B, d[i][j−1], d[i][j], and d[i][j+1] have the same dot value, and cases in which, as shown in FIG. 9C, d[i][j], d[i][j+1], and d[i][j+2] have the same dot value (in FIGS. 9A, 9B, and 9C, in each case, the dot value d of the subject pixel is equal to 1).

In step S22, the horizontal array checking section 12 determines whether d[i][j]=1 on the basis of the dot value obtained in step S21.

Figure 9A:
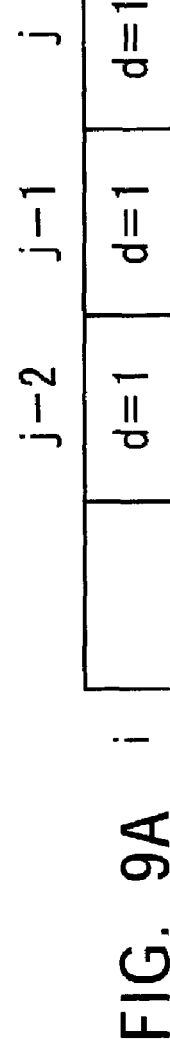
FIGS. 9A, 9B, and 9C illustrate a horizontal array pattern.
Figure 9B:
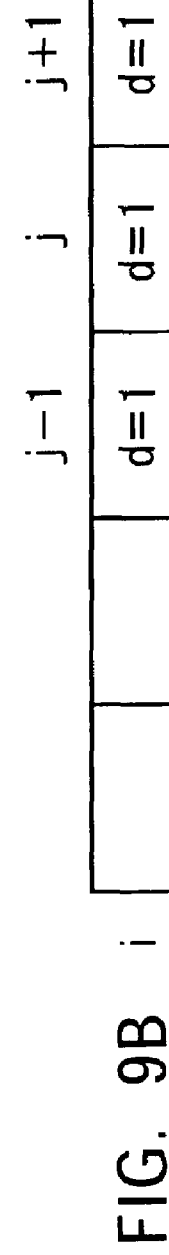
Figure 9C:
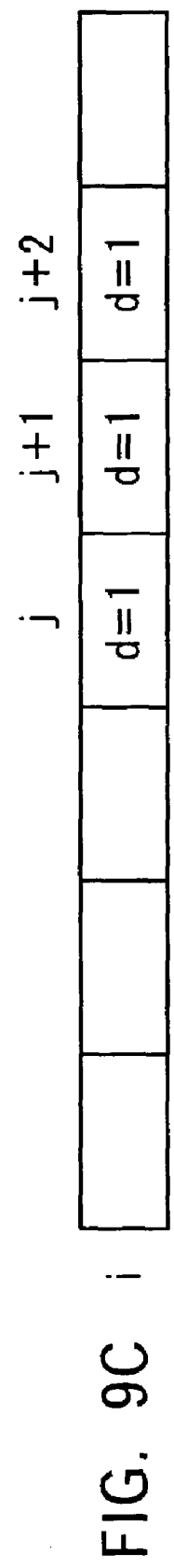

When it is determined in step S22 that d[i][j]=1, in step S23, the horizontal array checking section 12 determines whether any one of the following conditions is satisfied: d[i][j−2]=1 and d[i][j−1]=1 (that is, the array of the dot values shown in FIG. 9A is provided); d[i][j−1]=1 and d[i][j+1]=1 (that is, the array of the dot values shown in FIG. 9B is provided); and d[i][j+1]=1 and d[i][j+2]=1 (that is, the array of the dot values shown in FIG. 9C is provided).

When it is determined in step S23 that any one of the following conditions is satisfied: d[i][j−2]=1 and d[i][j−1]=1; d[i][j−1]=1 and d[i][j+1]=1; or d[i][j+1]=1 and d[i][j+2]=1, the process proceeds to step S26. When it is determined in step S23 that none of the following conditions is satisfied: d[i][j−2]=1 and d[i][j−1]=1; d[i][j−1]=1 and d[i][j+1]=1; and d[i][j+1]=1 and d[i][j+2]=1, the process proceeds to step S27.

When it is determined in step S22 that d[i][j] is not equal to 1, in step S24, the horizontal array checking section 12 determines whether or not d[i][j]=2 on the basis of the dot values obtained in step S21.

When it is determined in step S24 that d[i][j]=2 is not satisfied, the process proceeds to step S27.

Figures 10A, 10B, 10C:
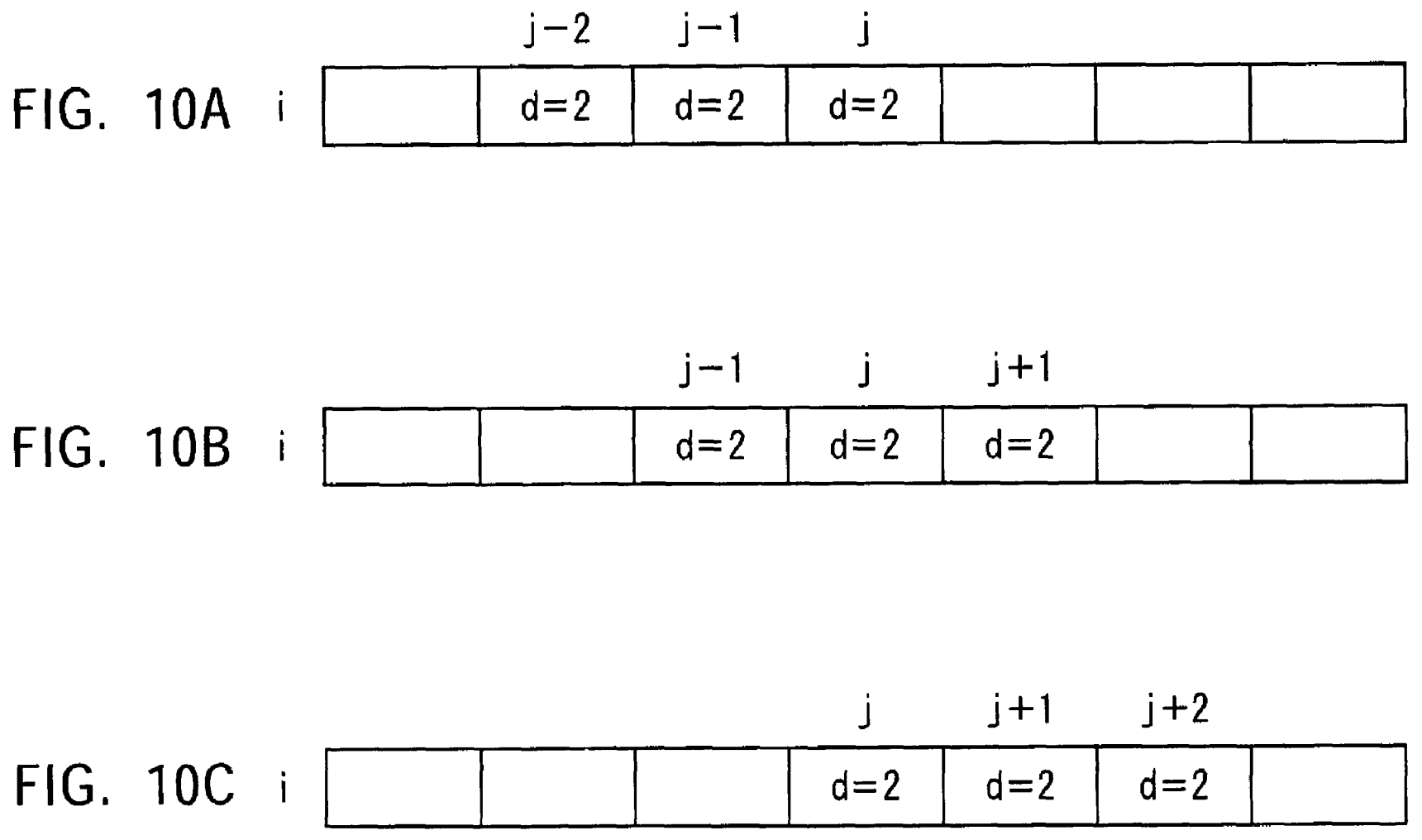

When it is determined in step S24 that d[i][j]=2, in step S25, the horizontal array checking section 12 determines whether any one of the following conditions is satisfied: d[i][j−2]=2 and d[i][j−1]=2 (that is, the array shown in FIG. 10A is provided); d[i][j−1]=2 and d[i][j+1]=2 (that is, the array shown in FIG. 10B is provided); and d[i][j+1]=2 and d[i][j+2]=2 (that is, the array shown in FIG. 10(C) is provided).

When it is determined in step S23 that any one of the following conditions is satisfied: d[i][j−2]=1 and d[i][j−1]=1; d[i][j−1]=1 and d[i][j+1]=1; and d[i][j+1]=1 and d[i][j+2]=1, or when it is determined in step S25 that any one of the following conditions is satisfied: d[i][j−2]=2 and d[i][j−1]=2; d[i][j−1]=2 and d[i][j+1]=2; and d[i][j+1]=2 and d[i][j+2]=2, in step S26, the horizontal array checking section 12 sets a variable h_line[i][j] indicating whether or not the horizontally arranged pixels, containing the subject pixel, of a number based on the value of h_num, have the same dot value to h_line[i][j]=1.

In a case where it is determined in step S23 that none of the following conditions is satisfied: d[i][j−2]=1 and d[i][j−1]=1; d[i][j−1]=1 and d[i][j+1]=1; and d[i][j+1]=1 and d[i][j+2]=1, when it is determined in step S24 that d[i][j]=2 is not satisfied, or when it is determined in step S25 that none of the following conditions is satisfied: d[i][j−2]=2 and d[i][j−1]=2; d[i][j−1]=2 and d[i][j+1]=2; and d[i][j+1]=2 and d[i][j+2]=2, in step S27, the horizontal array checking section 12 sets a variable h_line[i][j] indicating whether or not the horizontally arranged pixels of a number based on the value of h_num have the same dot value to h_line[i][j]=0.

After the process of step S26 or after the process of step S27, in step S28, the horizontal array checking section 12 determines whether or not the processing of all the pixels is completed.

When it is determined in step S28 that the processing of all the pixels is not completed, the process returns to step S21, and this and subsequent steps are repeated. When it is determined in step S28 that the processing of all the pixels is completed, the processing is terminated.

As a result of the processes described with reference to FIG. 7, when the subject pixel has a dot value 1 or 2, it is determined whether or not the horizontally arranged pixels, containing the subject pixel, of a number based on the value of h_num have the same dot value, and a variable h_line[i][j] is output. When h_line[i][j]=1, since pixels having the same dot value are arranged horizontally, it may be said that the possibility that dot interference has not occurred is high.

Figure 11:
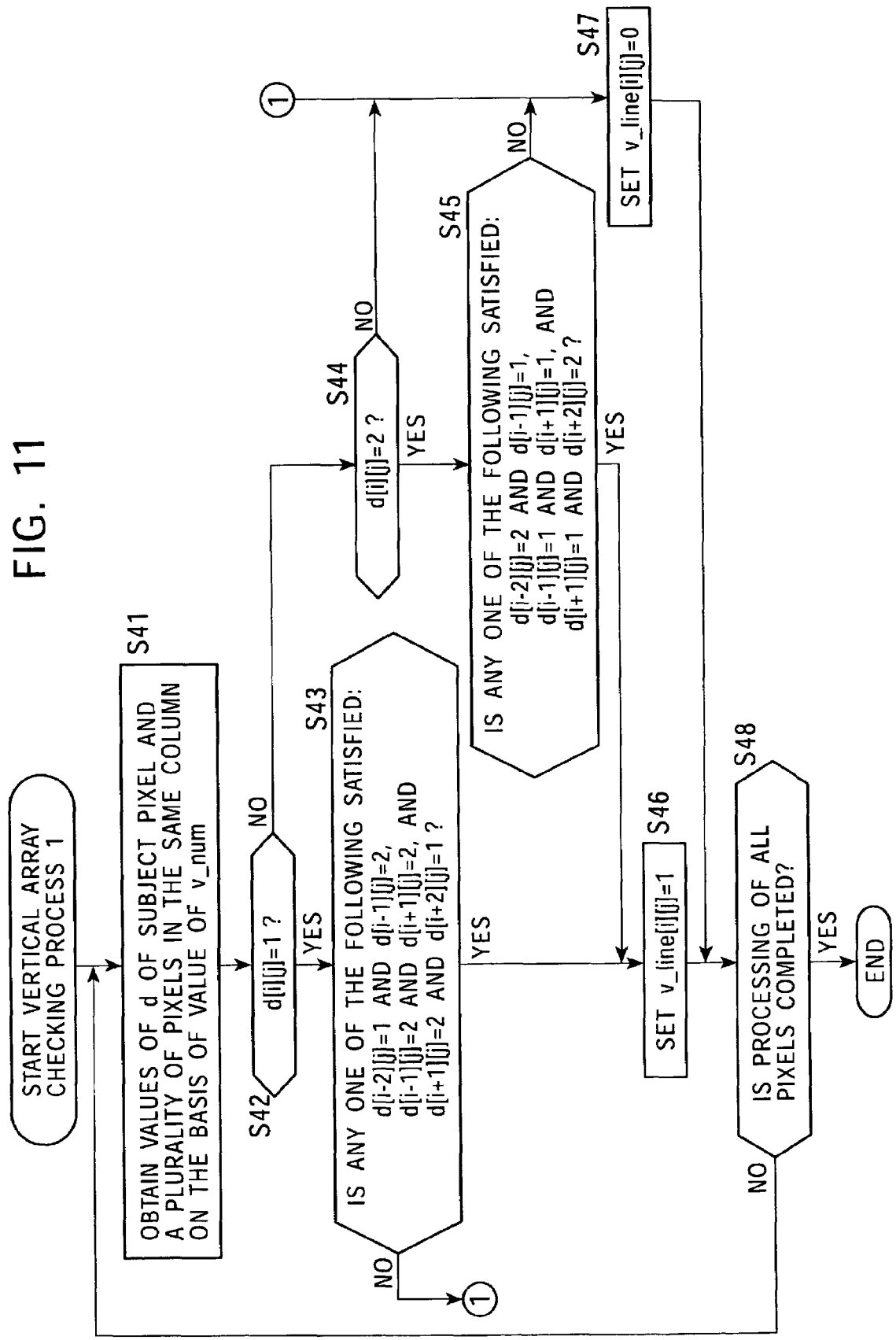
FIG. 11 is a flowchart illustrating a vertical array checking process 1.

Next, referring to the flowchart in FIG. 11, a description will be given of a vertical array checking process 1 performed by the vertical array checking section 13.

In step S41, the vertical array checking section 13 obtains the dot values d of the subject pixel and a plurality of pixels in the same column on the basis of the value of v_num, which is a value indicating the number of checking of a vertical array. Although v_num can be set as desired, the case of v_num=3 is described here.

Figure 12:
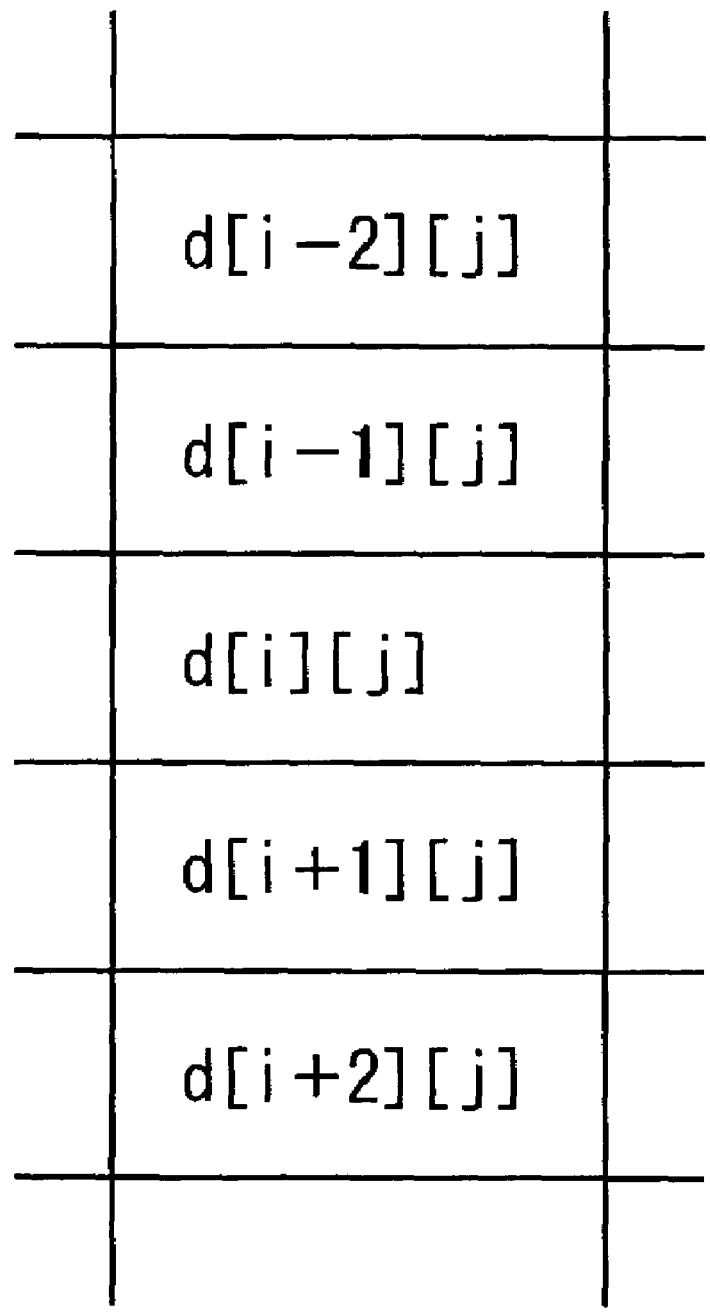
FIG. 12 illustrates pixels to be obtained.

When v_num=3, as shown in FIG. 12, the dot values d[i+2][j], d[i+1][j], d[i][j], d[i−1][j], and d[i−2][j] of the five vertically arranged pixels with the dot value d[i][j] of the subject pixel as the center are obtained. Three pixels containing the subject pixel are detected, and when these dot values are alternately arranged as 1 and 2, as shown in FIG. 13A, with respect to d[i−1][j], there are cases in which d[i−2][j] and d[i][j] have different dot values, cases in which, as shown in FIG. 13B, with respect to d[i][j], d[i+1][j] and d[i−1][j] have different dot values, cases in which, as shown in FIG. 13(C), with respect to d[i+1][j], d[i][j] and d[i+2][j] have different dot values (in FIGS. 13A, 13B, and 13C, in each case, the dot value d of the subject pixel is 1).

In step S42, the vertical array checking section 13 determines whether or not d[i][j]=1 on the basis of the dot values obtained in step S41.

Figure 13A:
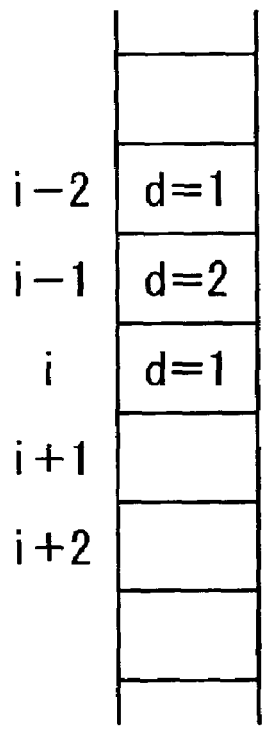
FIGS. 13A, 13B, and 13C illustrate a vertical array pattern.
Figure 13B:
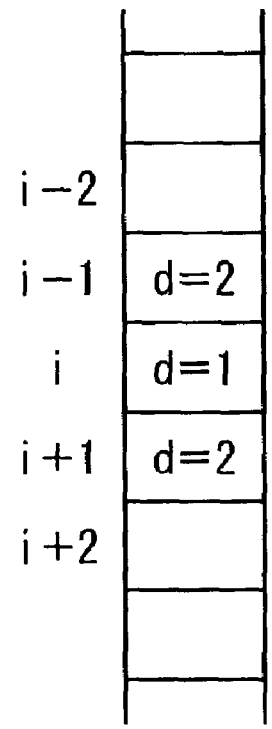
Figure 13C:
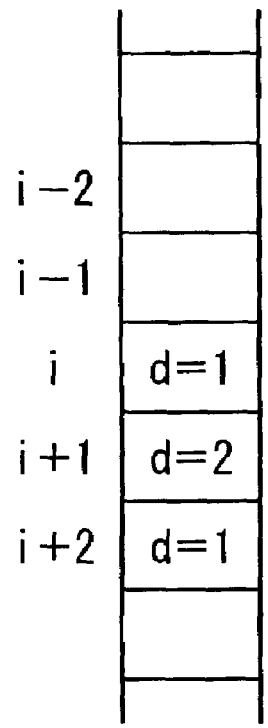

When it is determined in step S42 that d[i][j]=1, in step S43, the vertical array checking section 13 determines whether any one of the following conditions is satisfied on the basis of the dot values obtained in step S41: d[i−2][j]=1 and d[i−1][j]=2 (that is, the array shown in FIG. 13A is provided); d[i−1][j]=2 and d[i+1][j]=2 (that is, the array shown in FIG. 13B is provided), and d[i+1][j]=2 and d[i+2][j]=1 (that is, the array shown in FIG. 13C is provided).

When it is determined in step S43 that any one of the following conditions is satisfied: d[i−2][j]=1 and d[i−1][j]=2; d[i−1][j]=2 and d[i+1][j]=2; and d[i+1][j]=2 and d[i+2][j]=1, the process proceeds to step S46. When it is determined in step S43 that none of the following conditions is satisfied: d[i−2][j]=1 and d[i−1][j]=2; d[i−1][j]=2 and d[i+1][j]=2; and d[i+1][j]=2 and d[i+2][j]=1, the process proceeds to step S47.

When it is determined in step S42 that d[i][j]=1 is not satisfied, in step S44, the vertical array checking section 13 determines whether or not d[i][j]=2 on the basis of the dot values obtained in step S41.

When it is determined in step S44 that d[i][j]=2 is not satisfied, the process proceeds to step S47.

Figure 14A:
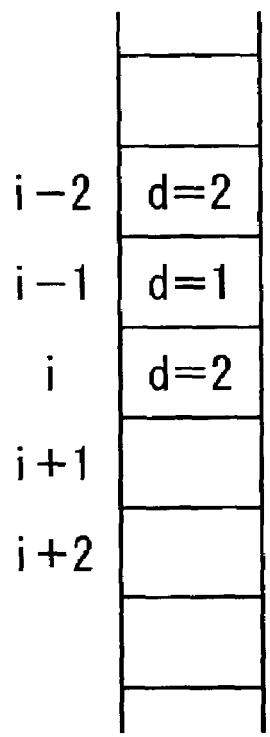
FIGS. 14A, 14B, and 14C illustrate a vertical array pattern.
Figure 14B:
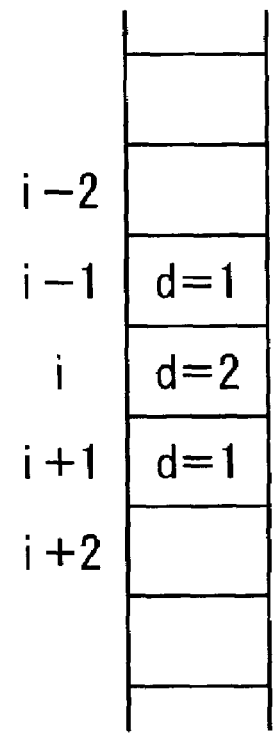
Figure 14C:
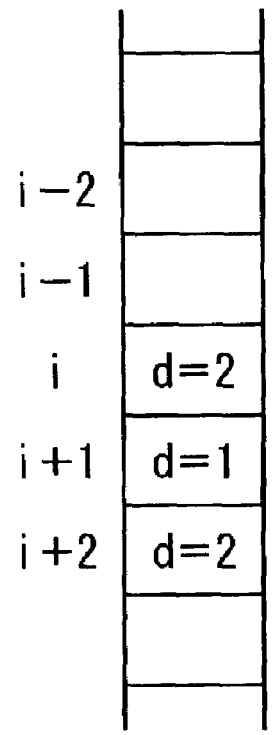

When it is determined in step S44 that d[i][j]=2, in step S45, the vertical array checking section 13 determines whether any one of the following conditions is satisfied on the basis of the dot values obtained in step S41: d[i−2][j]=2 and d[i−1][j]=1 (that is, the array shown in FIG. 14A is provided); d[i−1][j]=1 and d[i+1][j]=1 (that is, the array shown in FIG. 14B is provided); and d[i+1][j]=1 and d[i+2][j]=2 (that is, the array shown in FIG. 14C is provided).

When it is determined in step S43 that any one of the following conditions is satisfied: d[i−2][j]=1 and d[i−1][j]=2; d[i−1][j]=2 and d[i+1][j]=2; and d[i+1][j]=2 and d[i+2][j]=1, or when it is determined in step S45 that any one of the following conditions is satisfied: d[i−2][j]=2 and d[i−1][j]=1; d[i−1][j]=1 and d[i+1][j]=1; and d[i+1][j]=1 and d[i+2][j]=2, in step S46, the vertical array checking section 13 sets a variable v_line[i][j] indicating whether or not the vertically arranged pixels, containing the subject pixel, of a number based on the value of v_num have dot values which are alternately arranged as 1 and 2 to v_line[i][j]=1.

In a case where it is determined in step S43 that none of the following conditions is satisfied: d[i−2][j]=1 and d[i−1][j]=2; d[i−1][j]=2 and d[i+1][j]=2; and d[i+1][j]=2 and d[i+2][j]=1, when it is determined in step S44 that d[i][j]=2 is not satisfied or when it is determined in step S45 that none of the following conditions is satisfied: d[i−2][j]=2 and d[i−1][j]=1; d[i−1][j]=1 and d[i+1][j]=1; and d[i+1][j]=1 and d[i+2][j]=2, in step S47, the vertical array checking section 13 sets a variable v_line[i][j] indicating whether or not the vertically arranged pixels, containing the subject pixel, of a number based on the value of v_num have dot values which are alternately arranged as 1 and 2 to v_line[i][j]=0.

After the process of step S46 or after the process of step S47, in step S48, the vertical array checking section 13 determines whether or not the processing of all the pixels is completed.

When it is determined in step S48 that the processing of all the pixels is not completed, the process returns to step S41, and this and subsequent steps are repeated. When it is determined in step S48 that the processing of all the pixels is completed, the processing is terminated.

As a result of the processes described with reference to FIG. 11, when the subject pixel has a dot value 1 or 2, it is determined whether or not the vertically arranged pixels, containing the subject pixel, of a number based on the value of v_num have dot values which are alternately arranged as 1 and 2, and a variable v_line[i][j] is output. When v_line[i][j]=1, since the vertically arranged pixels alternately have dot values of 1 and 2, it may be said that the possibility that dot interference has occurred is high.

Next, referring to the flowchart in FIG. 15, a description will be given of an image enhancement process 1 performed by the enhancement processing section 2.

In step S61, the enhancement processing section 2 receives an input of a Y signal, and obtains values of v_line[i][j] and h_line[i][j] of the subject pixel from the horizontal array checking section 12 and the vertical array checking section 13 of the dot-interference detection section 1.

In step S62, the enhancement processing section 2 determines whether or not v_line[i][j] of the subject pixel is equal to 1.

When it is determined in step S62 that v_line[i][j]=1, in step S63, the enhancement processing section 2 determines whether or not h_line[i][j] of the subject pixel is equal to 1.

When it is determined in step S63 that h_line[i][j]=1, in step S64, the enhancement processing section 2 determines whether or not the predetermined value of hv_skip is equal to 1.

Here, the value of hv_skip can be set to 1 or 0, whichever is desired. When v_line[i][j]=1, since the corresponding pixels are arranged as "dark-bright-dark" or "bright-dark-bright" in the horizontal direction, there is the possibility that dot interference has occurred. Furthermore, for pixels in which h_line[i][j]=1, since pixels having substantially the same pixel value in the horizontal direction are arranged, it may be said that the possibility that dot interference has occurred is low to some degree. When the value of hv_skip is set to 1 in advance, it is determined that dot interference has not occurred for such a pixel, and when the value of hv_skip is set to 0 in advance, it is determined that dot interference has occurred.

When it is determined in step S62 that v_line[i][j]=1 is not satisfied (that is, v_line[i][j]=0) or when it is determined in step S64 that the value of hv_skip is 1, it is assumed that dot interference has not occurred in that pixel, and in step S65, the enhancement processing section 2 performs an image enhancement process on the subject pixel.

The image enhancement process is performed by a process such that, as shown in, for example, the following equation (1), the Laplacian is subtracted from the input Y signal Y[i][j]. The signal obtained here after the enhancement process is set as an output signal Y'[i][j]. The value of the Laplacian is determined on the basis of equation (2) when it is determined by using, for example, 3×3 pixels in the vicinity of the subject pixel.

$$Y'[i][j]=Y[i][j]-\nabla^2 Y[i][j] \quad (1)$$

$$\nabla^2 Y[i][j]=Y[i-1][j]+Y[i][j-1]+Y[i+1][j]+Y[i][j+1]-4Y[i][j] \quad (2)$$

When it is determined in step S63 that h_line[i][j] is not equal to 1 (that is, h_line[i][j]=0) or when it is determined in step S64 that the value of hv_skip is not equal to 1 (that is, 0), it is assumed that dot interference has occurred in that pixel, and in step S66, the enhancement processing section 2 does not perform an image enhancement process on the subject pixel, and sets the input Y signal Y[i][j] as an output signal Y'[i][j].

After the process of step S65 or after the process of step S66, in step S67, the enhancement processing section 2 determines whether or not the processing of all the pixels is completed.

When it is determined in step S67 that the processing of all the pixels is not completed, the process returns to step S61, and this and subsequent steps are repeated. When it is determined in step S67 that the processing of all the pixels is completed, the processing is terminated.

As a result of the processes described with reference to FIG. 15, the enhancement processing section 2 performs an enhancement process on portions other than dot interference portions on the basis of the values of v_line[i][j] and h_line[i][j] of the subject pixel, which are output from the horizontal array checking section 12 and the vertical array checking section 13 of the dot-interference detection section 1. As a result, it becomes possible to generate a better enhanced image without enhancing the dot interference portions.

[Filtering Process of NTSC Color Image Signal]

Figure 16:
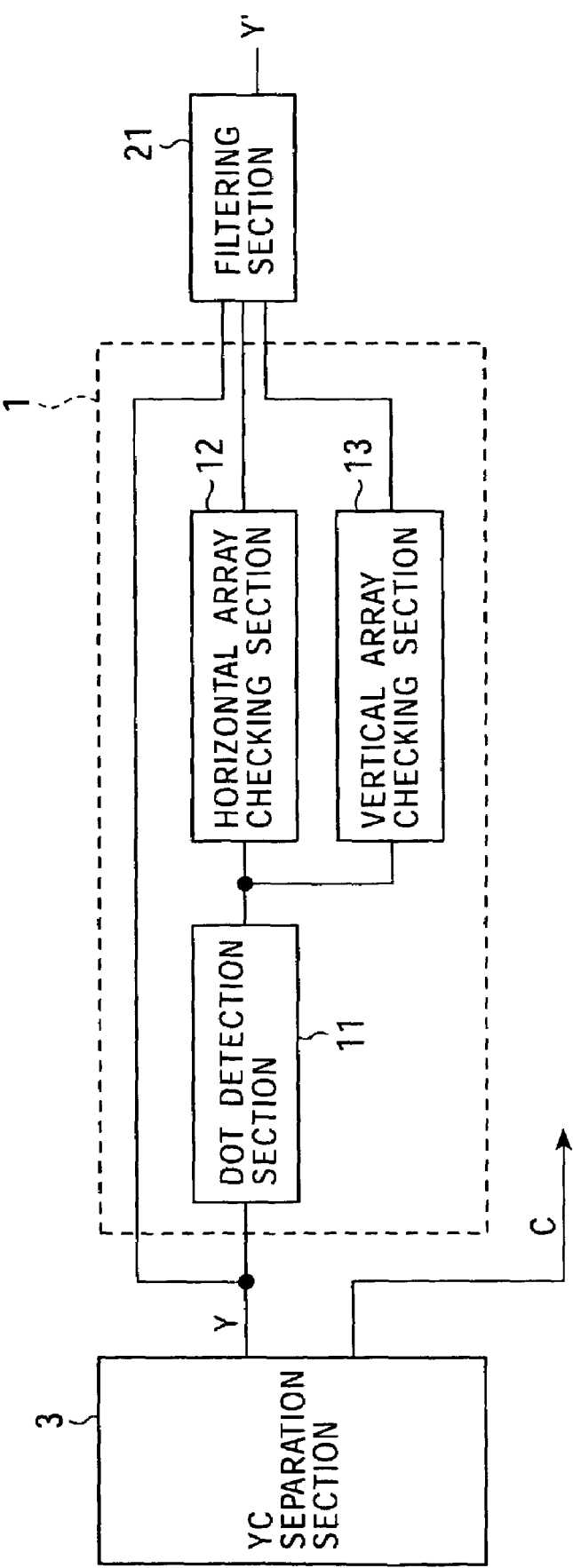
FIG. 16 is a block diagram illustrating a second embodiment of the present invention.

FIG. 16 is a block diagram illustrating a second embodiment of the present invention. In the second embodiment, a description will be given of processes performed on the Y signal after the NTSC color image signal is YC-separated.

Components in FIG. 16 corresponding to those in FIG. 1 are given the same reference numerals, and accordingly, descriptions thereof are omitted. That is, in FIG. 16, basically, the same configuration as that described using the dot-interference detection section 1 is provided except that a filtering section 21 is provided in place of the enhancement processing section 2.

The filtering section 21 receives an input of a Y signal from the dot-interference detection section 1, detects a portion where dot interference is thought to have occurred on the basis of the signals input from the horizontal array checking section 12 and the vertical array checking section 13 of the dot-interference detection section 1, and performs a filtering process on the portion where dot interference has occurred.

The dot detection section 11, the horizontal array checking section 12, and the vertical array checking section 13 of the dot-interference detection section 1 perform the same processes as the processes described with reference to FIGS. 4, 7, and 11, and accordingly, descriptions thereof are omitted here.

Figure 17:
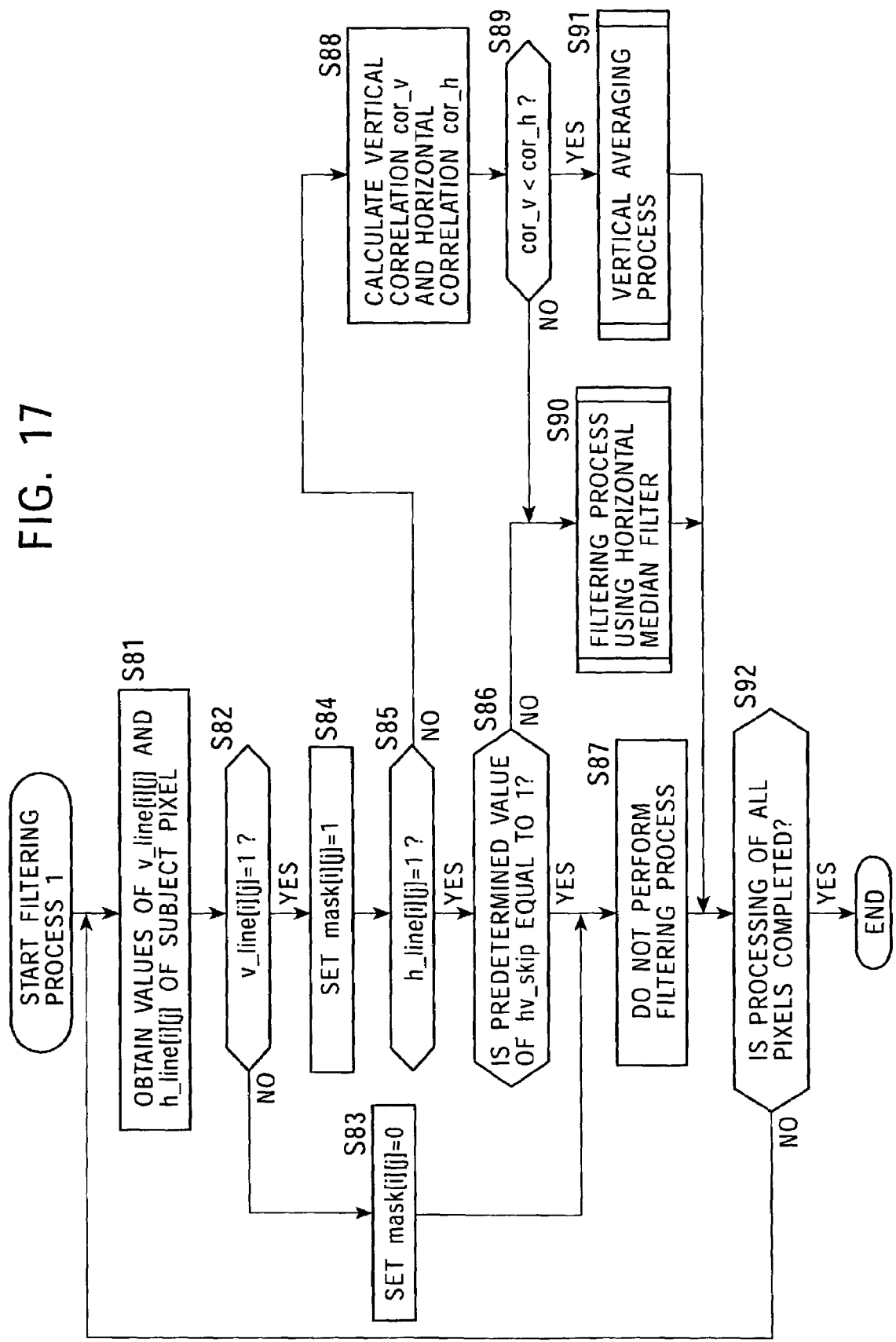
FIG. 17 is a flowchart illustrating a filtering process 1.

Referring to FIG. 17, a description will be given of a filtering process 1 performed by the filtering section 21 of FIG. 16. Hereafter, a description will be given by assuming that an output signal generated by processes described with reference to FIG. 17 is set as an output signal fa[i][j].

In step S81, the filtering section 21 receives an input of a Y signal, and obtains values of v_line[i][j] and h_line[i][j] of the subject pixel from the horizontal array checking section 12 and the vertical array checking section 13 of the dot-interference detection section 1.

In step S82, the filtering section 21 determines whether or not v_line[i][j] obtained in step S81 is equal to 1.

When it is determined in step S82 that v_line[i][j]=1 is not satisfied, in step S83, the filtering section 21 sets the value of mask[i][j] used in the filtering process 2 (to be described later with reference to FIG. 20) as mask[i][j]=0. After the process of step S83, the process proceeds to step S87.

When it is determined in step S82 that v_line[i][j]=1, in step S84, the filtering section 21 sets the value of mask[i][j] used in the filtering process 2 (to be described later with reference to FIG. 20) as mask[i][j]=1.

In step S85, the filtering section 21 determines whether or not the value of h_line[i][j] obtained in step S81 is equal to 1.

When it is determined in step S85 that h_line[i][i][j]=1, in step S86, the filtering section 21 determines whether or not the predetermined value of hv_skip is equal to 1. Here, the value of hv_skip is a value which is determined as desired in a manner similar to the value used in step S64 of FIG. 15.

After the process of step S83 or when it is determined in step S86 that the value of hv_skip is equal to 1, it is assumed that dot interference has not occurred in this pixel, and in step S87, the filtering section 21 does not perform a filtering process and sets the input Y signal Y[i][j] as an output signal fa[i][j].

When it is determined in step S85 that h_line[i][j]=1 is not satisfied, in step S88, the filtering section 21 calculates a correlation cor_v between vertically adjacent pixels, and a correlation cor_h between horizontally adjacent pixels.

The correlation cor_v between vertically adjacent pixels is expressed by the following equation (3), and the correlation cor_h between horizontally adjacent pixels is expressed by the following equation (4):

$$cor\_v = abs(Y[i][j]-Y[i-1][j]) + abs(Y[i][j]-Y[i+1][j]) \quad 3$$

$$cor\_h = abs(Y[i][j]-Y[i][j-1]) + abs(Y[i][j]-Y[i][j+1]) \quad 4$$

Here, abs represents the absolute value of the value within the parentheses which follow.

In step S89, the filtering section 21 determines whether or not cor_v<cor_h on the basis of the calculation result in step S88.

When it is determined in step S86 that the value of hv_skip is not equal to 1 or when it is determined in step S89 that cor_v<cor_h is not satisfied, in step S90, a filtering process using a horizontal median filter (to be described later with reference to FIG. 18) is performed.

When it is determined in step S89 that cor_v<cor_h, in step S91, a vertical averaging process (to be described later with reference to step S19) is performed.

After the process of step S87, after the process of step S90, or after the process of step S91, in step S92, the filtering section 21 determines whether or not the processing of all the pixels is completed.

When it is determined in step S92 that the processing of all the pixels is not completed, the process returns to step S81, and this and subsequent steps are repeated. When it is determined in step S92 that the processing of all the pixels is completed, the processing is terminated.

As a result of the processes described with reference to FIG. 17, dot interference which has occurred by YC separation is detected at the latter stage of a YC separation process, and a filter is applied on only that portion. As a result, it becomes possible to prevent the deterioration of an image due to dot interference without decreasing the resolution of the portion where dot interference has not occurred.

Next, referring to the flowchart in FIG. 18, a description will be given of a filtering process using a horizontal median filter, which is performed in step S90 of FIG. 17.

In step S101, the filtering section 21 obtains Y signals Y[i][j−1], Y[i][j], and Y[i][j+1] of the three pixels of the subject pixel and the pixels which are arranged horizontally on both sides.

In step S102, the filtering section 21 sorts the input values, and denotes the median value as M.

In step S103, the filtering section 21 compares the absolute value of the difference between the value Y[i][j] of the Y signal of the subject pixel and the median value obtained in step S102, with a predetermined threshold value which is set in advance in order to determines whether or not abs(Y[i][j]−M)<threshold value is satisfied.

When it is determined in step S103 that abs(Y[i][j]−M)<threshold value is satisfied, in step S104, the filtering section 21 sets the median value M as an output fa[i][j], and the process returns to step S92 of FIG. 14.

When it is determined in step S103 that abs(Y[i][j]−M)<threshold value is not satisfied, in step S105, the filtering section 21 sets the subject pixel Y[i][j] as an output fa[i][j], and the process returns to step S92 of FIG. 14.

Figure 18:
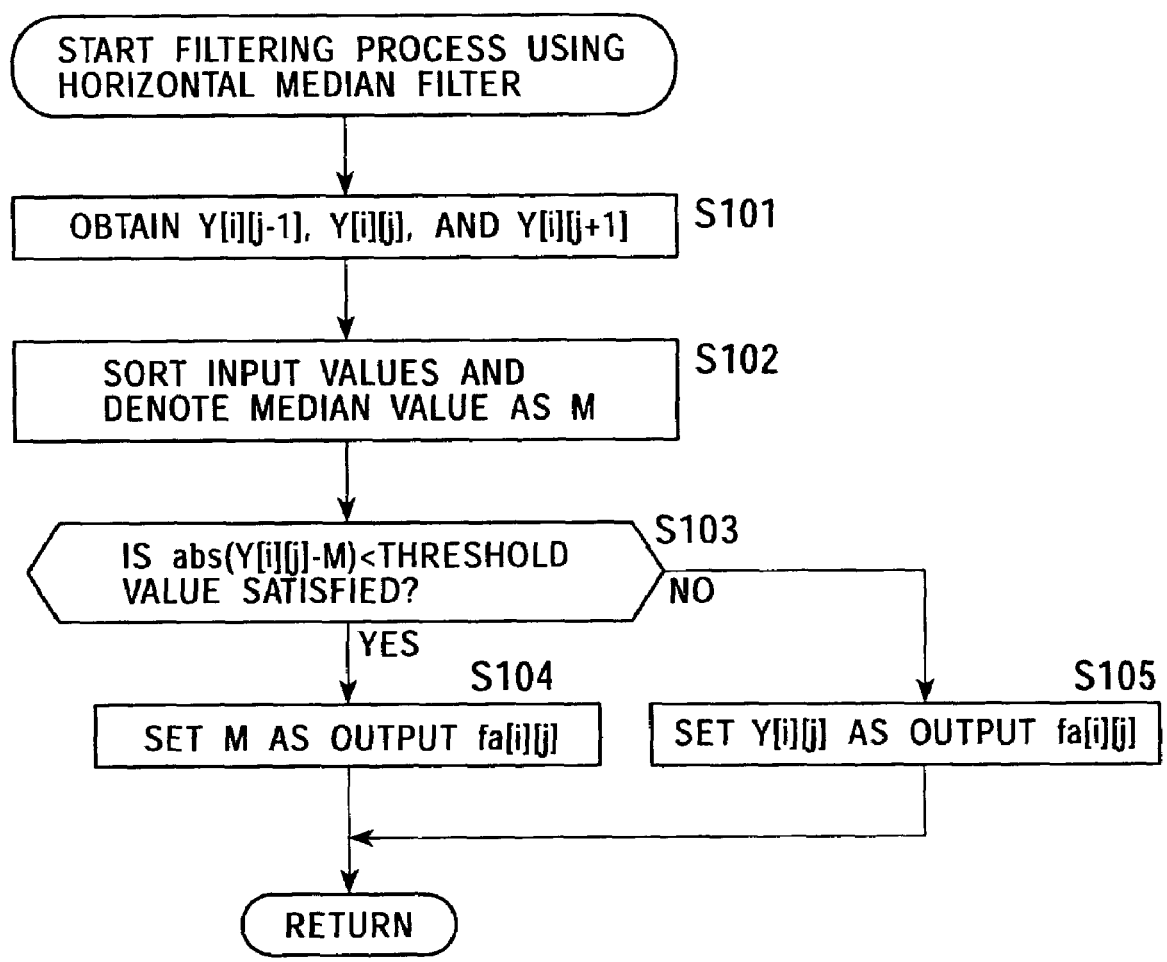
FIG. 18 is a flowchart illustrating a filtering process using a horizontal median filter.

In FIG. 18, although processes are performed by obtaining three pixels containing the subject pixel, the number of pixels to be obtained may be any number represented by n+1 (n is an even number). In this case, pixels to be obtained are denoted as Y[i][j−n/2] . . . Y[i][j−1], Y[i][j], and Y[i][j+1] . . . Y[i][j+n/2].

Figure 19:
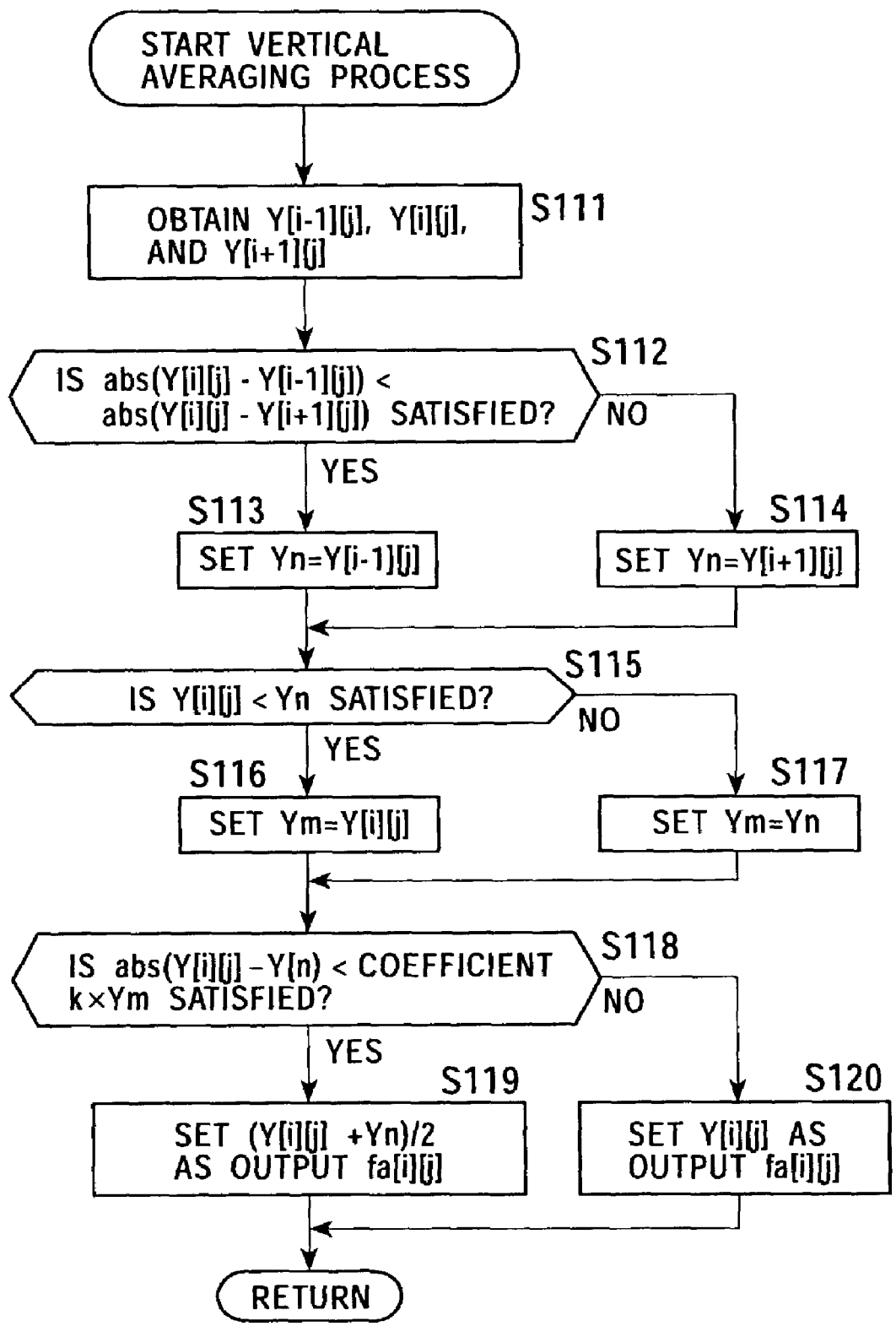
FIG. 19 is a flowchart illustrating a vertical averaging process.

Next, referring to the flowchart in FIG. 19, a description will be given of a vertical averaging process performed in step S91 of FIG. 17.

In step S111, the filtering section 21 obtains Y signals Y[i−1][j], Y[i][j], and Y[i+1][j] of the three pixels of the subject pixel and the pixels arranged above and below the subject pixel.

In step S112, the filtering section 21 determines whether or not abs(Y[i][j]−Y[i−1][j])<abs(Y[i][j]−Y[i+1][j]) is satisfied. That is, the process of step S112 determines which one of Y[i−1][j] and Y[i+1][j] is closer to the value of the subject pixel.

When it is determined in step S112 that abs(Y[i][j]−Y[i−1][j])<abs(Y[i][j]−Y[i+1][j]) is satisfied, in step S113, the filtering section 21 sets Yn indicating a pixel having a value closer to that of the subject pixel as Yn=Y[i−1][j].

When it is determined in step S112 that abs(Y[i][j]−Y[i−1][j])<abs(Y[i][j]−Y[i+1][j]) is not satisfied, in step S114, the filtering section 21 sets Yn indicating a pixel having a value closer to that of the subject pixel as Yn=Y[i+1][j].

After the process of step S113 or S114, in step S115, the filtering section 21 compares Yn set in step S113 or S114 with the subject pixel Y[i][j] in order to determine whether or not Y[i][j]<Yn is satisfied.

When it is determined in step S115 that Y[i][j]<Yn is satisfied, in step S116, the filtering section 21 sets Ym indicating a smaller value between Yn set in step S113 or S114 and the subject pixel Y[i][j] as Ym=Y[i][j].

When it is determined in step S115 that Y[i][j]<Yn is not satisfied, in step S117, the filtering section 21 sets Ym indicating a smaller value between Yn set in step S113 or S114 and the subject pixel Y[i][j] as Ym=Yn.

After the process of step S116 or S117, in step S118, the filtering section 21 determines whether or not abs(Y[i][j]−Yn)<k×Ym is satisfied by using a predetermined coefficient k which is set in advance.

When it is determined in step S118 that abs(Y[i][j]−Yn)<k×Ym is satisfied, in step S119, the filtering section 21 computes (Y[i][j]+Yn)/2 on the basis of Yn set in step S113 or S114 and the subject pixel Y[i][j] and sets it as an output fa[i][j], and then the process returns to step S92 of FIG. 14.

When it is determined in step S118 that abs(Y[i][j]−Yn)<k×Ym is not satisfied, in step S120, the filtering section 21 sets the input subject pixel Y[i][j] as an output fa[i][j], and the process returns to step S92 of FIG. 14.

As a result of the processes described with reference to FIG. 19, an averaging process using three vertically arranged pixels containing the subject pixel is performed. Here, although an averaging process using three pixels is described, the number of pixels to be used may not be three as long as the process is an averaging process using pixels in the vertical direction. Furthermore, a vertical average may be determined by a method differing from the process described with reference to FIG. 19.

Furthermore, the output fa by the filtering process 1 described with reference to FIG. 17 may be set as an output signal (an output signal Y' in FIG. 16). Alternatively, after the filtering process 1 described with reference to FIG. 17 is terminated, a different filtering process may be performed. Referring to the flowchart in FIG. 20, a description will be given of a filtering process 2 performed after the filtering process described with reference to FIG. 17 is terminated.

In step S131, the filtering section 21 determines whether or not a mask[i][j] set in the filtering process 1 described with reference to FIG. 17 is equal to 1.

When it is determined in step S131 that mask[i][j]=1 is not satisfied, the process proceeds to step S141. When it is determined in step S131 that mask[i][j]=1 is satisfied, in steps S132 to S141, by using the signal fa by the filtering process 1 described with reference to FIG. 17, a vertical averaging process similar to the case described with reference to FIG. 19 is performed.

More specifically, in step S132, the filtering section 21 obtains fa[i−1][j], fa[i][j], and fa[i+1][j], which are results of the filtering process of the filtering process 1 described with reference to FIG. 17, and in step S133, the filtering section 21 determines whether or not abs(fa[i][j]−fa[i−1][j])<abs(fa[i][j]−fa[i+1][j]) is satisfied.

When it is determined in step S133 that abs(fa[i][j]−fa[i−1][j])<abs(fa[i][j]−fa[i+1][j]) is satisfied, in step S134, the filtering section 21 sets fan=fa[i−1][j].

When it is determined in step S133 that abs(fa[i][j]−fa[i−1][j])<abs(fa[i][j]−fa[i+1][j]) is not satisfied, in step S135, the filtering section 21 sets fan=fa[i+1][j].

After the process of step S134 or S135, in step S136, the filtering section 21 determines whether or not fa[i][j]<fan is satisfied.

When it is determined in step S136 that fa[i][j]<fan is satisfied, in step S137, the filtering section 21 sets fam=fa[i][j].

When it is determined in step S136 that fa[i][j]<fan is not satisfied, in step S138, the filtering section 21 sets fam=fan.

After the process of step S137 or S138, in step S139, the filtering section 21 determines whether or not abs(fa[i][j−fan])<coefficient k×fam by using a predetermined coefficient k which is set in advance.

When it is determined in step S139 that abs(fa[i][j−fan])<coefficient k×fam is satisfied, in step S140, the filtering section 21 sets (fa[i][j]+fan)/2 as fb[i][j].

When it is determined in step S139 that abs(fa[i][j−fan])<coefficient k×fam is not satisfied, in step S141, the filtering section 21 sets fb[i][j]=fa[i][j].

After the process of step S140 or S141, in step S142, the filtering section 21 computes the weighted average of Y[i][j] and fb[i][j], and outputs it (output Y' in FIG. 16).

For example, when a weighting coefficient for a weighted average is denoted as w, the computation of the weighted average is executed by the following equation (5).

$$(1-w) \times Y[i][j] + w \times fb[i][j] \qquad (5)$$

In step S143, the filtering section 21 determines whether or not the processing of all the pixels is completed. When it is determined in step S143 that the processing of all the pixels is not completed, the process returns to step S131, and this and subsequent steps are repeated. When it is determined in step S143 that the processing of all the pixels is completed, the processing is terminated.

Figure 20:
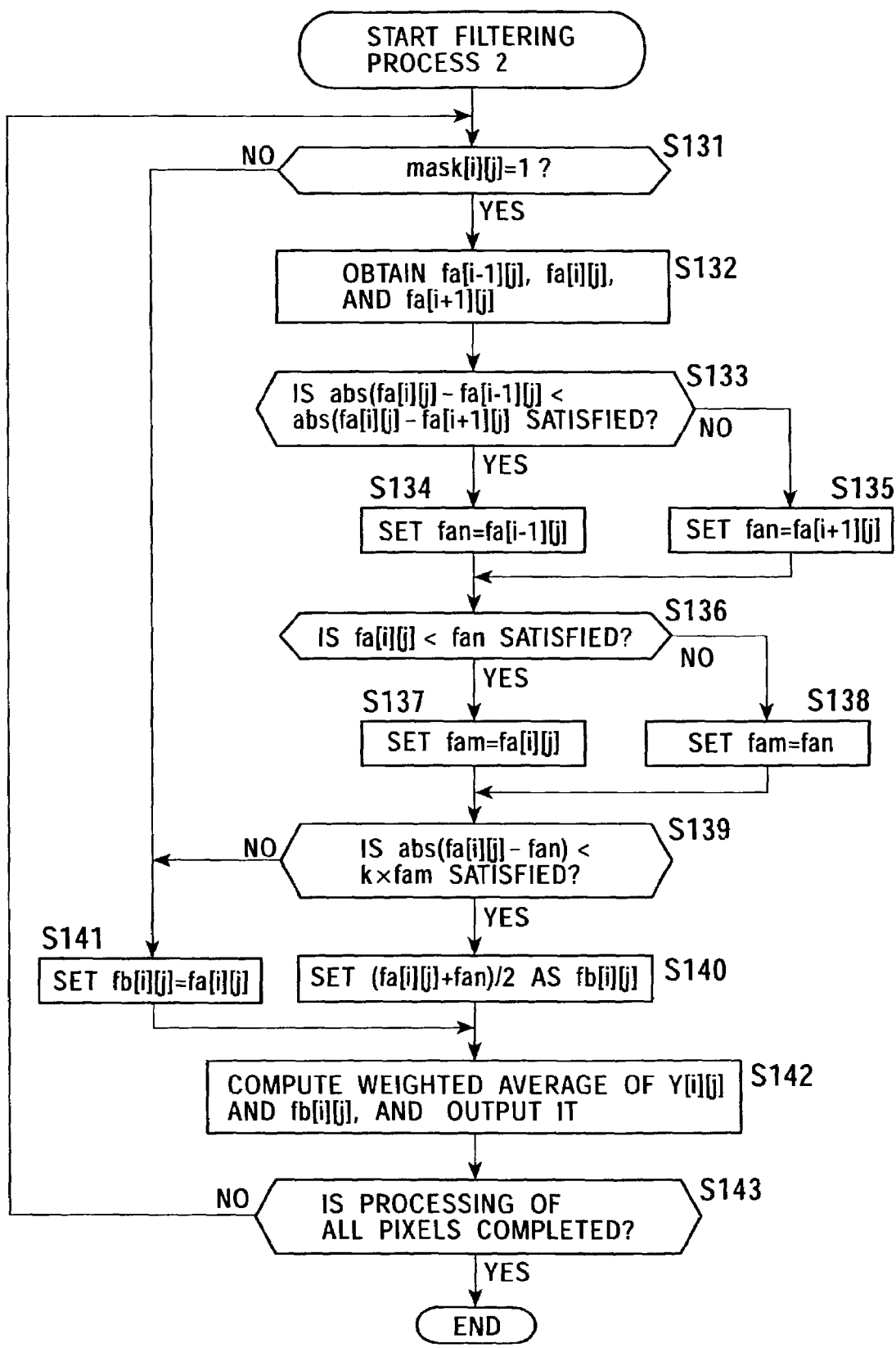
FIG. 20 is a flowchart illustrating a filtering process 2.

As a result of the processes described with reference to FIG. 20, since a filtering process is further performed on the portion where dot interference has occurred, it is possible to obtain a satisfactory output image in which dot interference is reduced.

[Image Enlargement Process of NTSC Color Image Signal]

Figure 21:
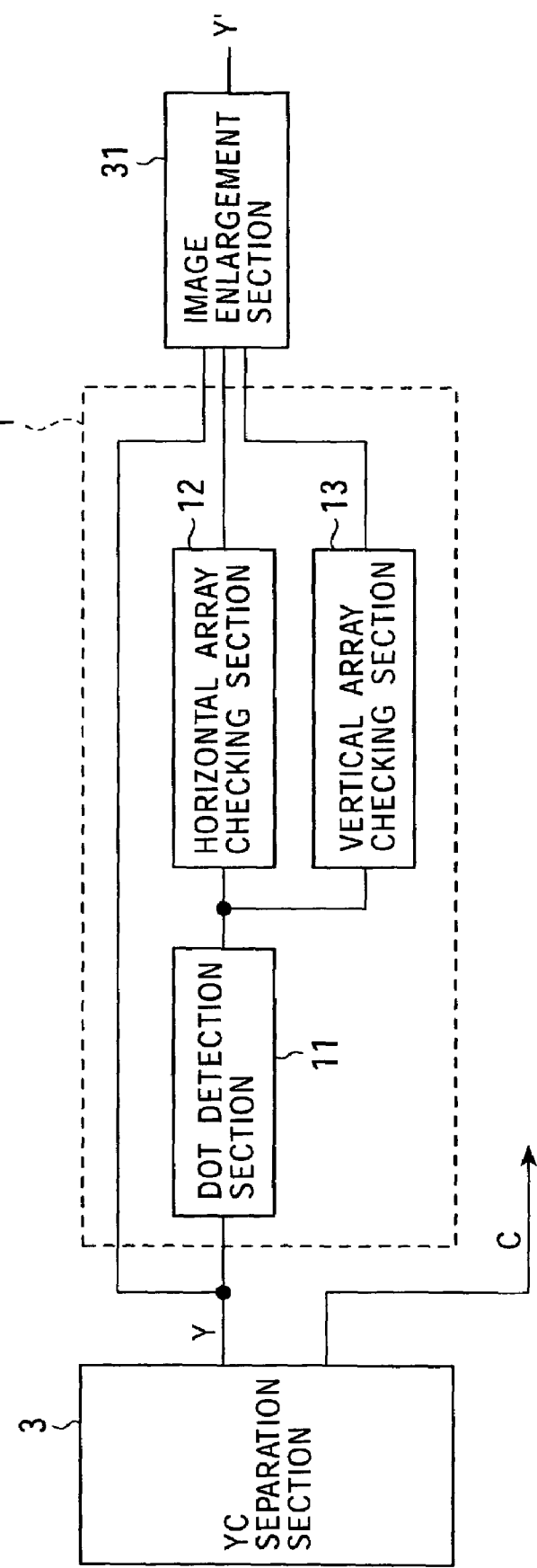
FIG. 21 is a block diagram illustrating a third embodiment of the present invention.

Next, FIG. 21 is a block diagram illustrating a third embodiment of the present invention. In the third embodiment, a description will be given of a process for a Y signal after an NTSC color image signal is YC-separated.

Components in FIG. 21 corresponding to those in FIG. 1 are given the same reference numerals, and accordingly, descriptions thereof are omitted. That is, in FIG. 21, basically, the same configuration as that described with reference to FIG. 1 is provided except that an image enlargement section 31 is provided in place of the enhancement processing section 2.

An image enlargement section 31 receives an input of a Y signal from the dot-interference detection section 1, and detects a portion where dot interference is thought to have occurred on the basis of the signal input from the horizontal array checking section 12 and the vertical array checking section 13 of the dot-interference detection section 1, performs a filtering process on the portion where dot interference has occurred, and then performs an interpolation process for enlarging an image on that portion.

The dot detection section 11, the horizontal array checking section 12, and the vertical array checking section 13 of the dot-interference detection section 1 perform the same processes as the processes described with reference to FIGS. 4, the 7, and FIG. 11, and accordingly, descriptions thereof are omitted here.

Figure 22:
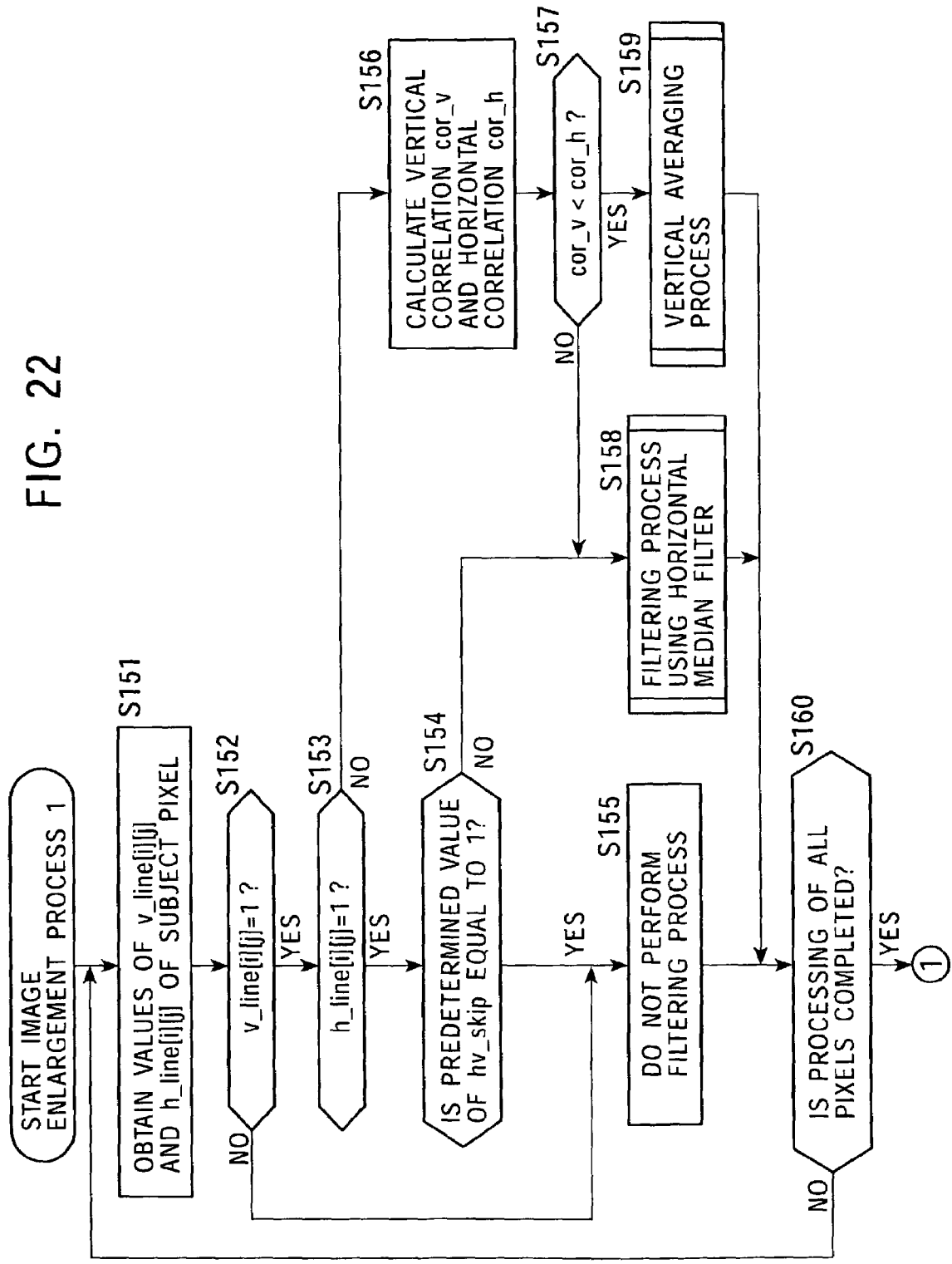
FIG. 22 is a flowchart illustrating an image enlargement process 1.
Figure 23:
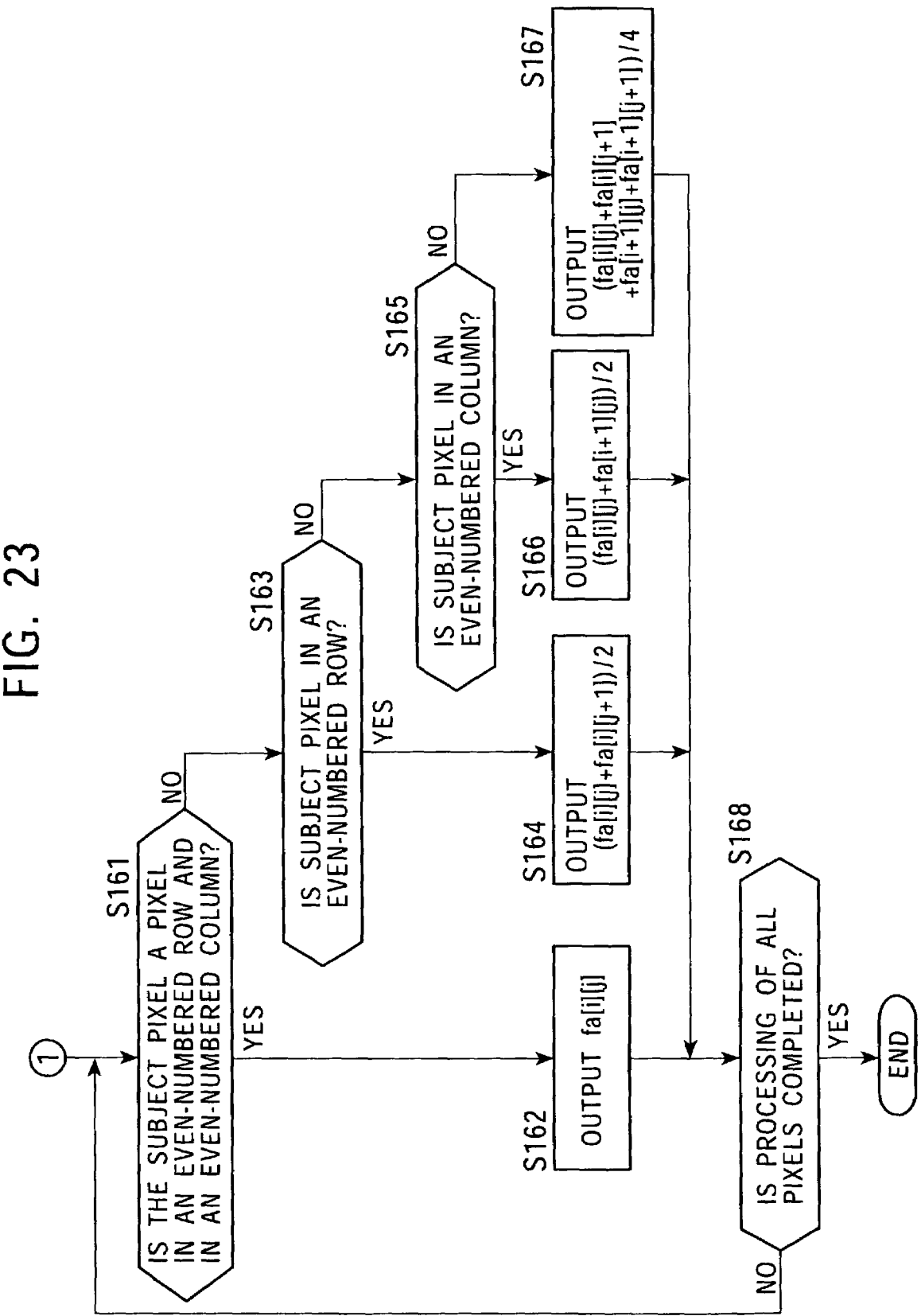
FIG. 23 is a flowchart illustrating the image enlargement process 1.

Referring to FIGS. 22 and 23, a description will be given of an image enlargement process performed by the enlargement section 31.

In steps S151 and S152, the image enlargement section 31 performs the same processes as the processes of steps S81 and S82 described with reference to FIG. 17.

When it is determined in step S152 that v_line[i][j]=1, in steps S153 to S159, the image enlargement section 31 performs the same processes as the processes of steps S85 to S91 described with reference t FIG. 17. When it is determined in step S152 that v_line[i][j] is not equal to 1, the process returns to step S155.

After the process of step S155, after the process of step S158, or after the process of step S159, in step S160, the image enlargement section 31 performs the same process as that of step S92 described with reference to FIG. 17.

When it is determined in step S160 that the processing of all the pixels is not completed, the process returns to step S151, and this and subsequent steps are repeated.

Figure 24:
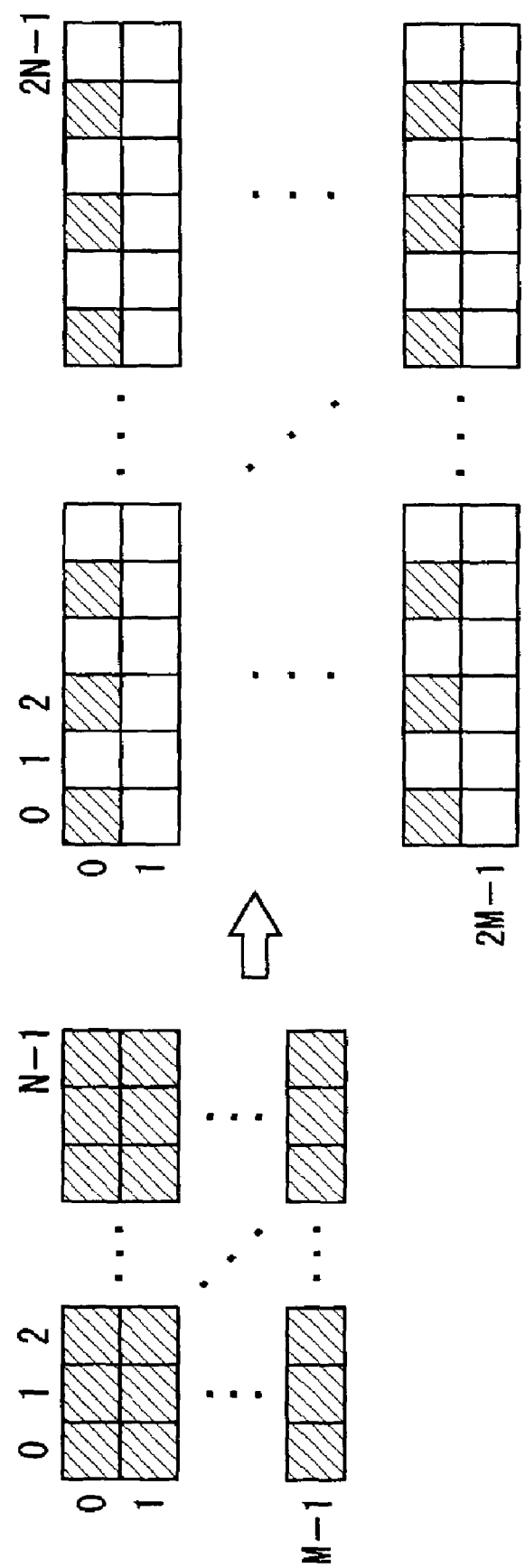
FIG. 24 illustrates an enlargement of an image.

When it is determined in step S160 that the processing of all the pixels is completed, next, an interpolation process for enlarging an image is performed. Here, as shown in FIG. 24, a process for enlarging an image of M×N pixels to an image of 2M×2N pixels is performed. Hereafter, in steps S161 to S168, a description will be given by assuming the subject pixel to be an enlarged pixel.

In step S161, the image enlargement section 31 determines whether or not the subject pixel is a pixel in an even-numbered row and in an even-numbered column.

Figure 25:
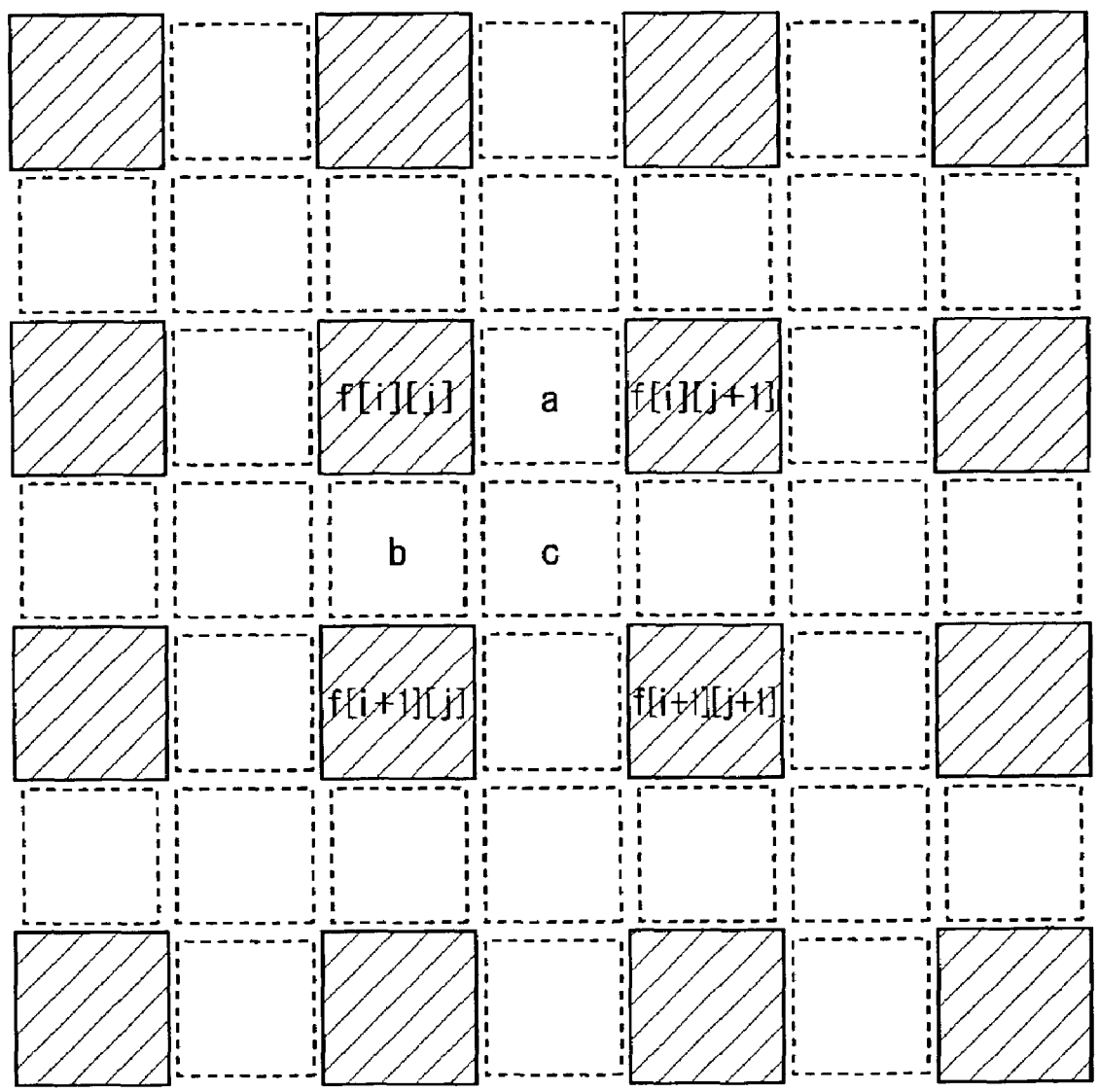
FIG. 25 illustrates an interpolation process.

When it is determined in step S161 that the subject pixel is a pixel in an even-numbered row and in an even-numbered column, since, like a pixel indicated as fa[i][j], fa[i+1][j], fa[i][j+1] or fa[i+1][j+1] in FIG. 25, the subject pixel is a pixel at a position at which the filtering result should be used as it is, in step S162, the image enlargement section 31 outputs fa[i][j].

When it is determined in step S161 that the subject pixel is not a pixel in an even-numbered row and in an even-numbered column, in step S163, the image enlargement section 31 determines whether or not the subject pixel is in an even-numbered row.

When it is determined in step S163 that the subject pixel is in an even-numbered row, since the subject pixel is a pixel sandwiched in the horizontal direction between pixels at positions at which the filtering result should be used as it is, that is, a pixel at a position indicated by "a" in FIG. 25, the subject pixel is interpolated by using pixel values of two pixels positioned on the right and left. Therefore, in step S164, the image enlargement section 31 computes (fa[i][j]+fa[i][j+1])/2 and outputs it.

When it is determined in step S163 that the subject pixel is not in an even-numbered row, in step S165, the image enlargement section 31 determines whether or not the subject pixel is in an even-numbered column.

When it is determined in step S165 that the subject pixel is in an even-numbered column, the subject pixel is a pixel sandwiched in the vertical direction at a position where the filtering result should be used as it is, that is, a pixel at a position indicated by "b" in FIG. 25, the subject pixel is interpolated by using the pixel values of the two pixels positioned above and below the subject pixel. Therefore, in step S166, the image enlargement section 31 computes (fa[i][j]+fa[i+1][j])/2 and outputs it.

When it is determined in step S165 that the subject pixel is not in an even-numbered column, since the subject pixel is a pixel which is not in contact with the pixels in the vertical direction and in the horizontal direction at positions at which the filtering result should be used (in other words, a pixel around which four pixels are positioned obliquely at positions where the filtering result should be used as it is), that is, a pixel at a position indicated by "c" in FIG. 25, the subject pixel is interpolated by using the pixel values of the four pixels positioned in the vicinity of the subject pixel. Therefore, in step S167, the image enlargement section 31 computes (fa[i][j]+fa[i][j+1]+fa[i+1][j]+fa[i+1][j+1])/4 and outputs it.

In step S168, the image enlargement section 31 determines whether or not the processing of all the pixels is completed. When it is determined in step S168 that the processing of all the pixels is not completed, the process returns to step S161, and this and subsequent steps are repeated. When it is determined in step S168 that the processing of all the pixels is completed, the processing is terminated.

As a result of the processes described with reference to FIGS. 22 and 23, by performing an interpolation process on a portion where dot interference has occurred by using a signal after a filtering process is performed, an enlargement process is performed. Therefore, it is possible to obtain a satisfactory enlarged image in which dot interference is reduced without decreasing the resolution of a portion where dot interference has not occurred.

[Enhancement Process of NTSC Color Image Signal Using Color-signal-edge Detection]

Figure 26:
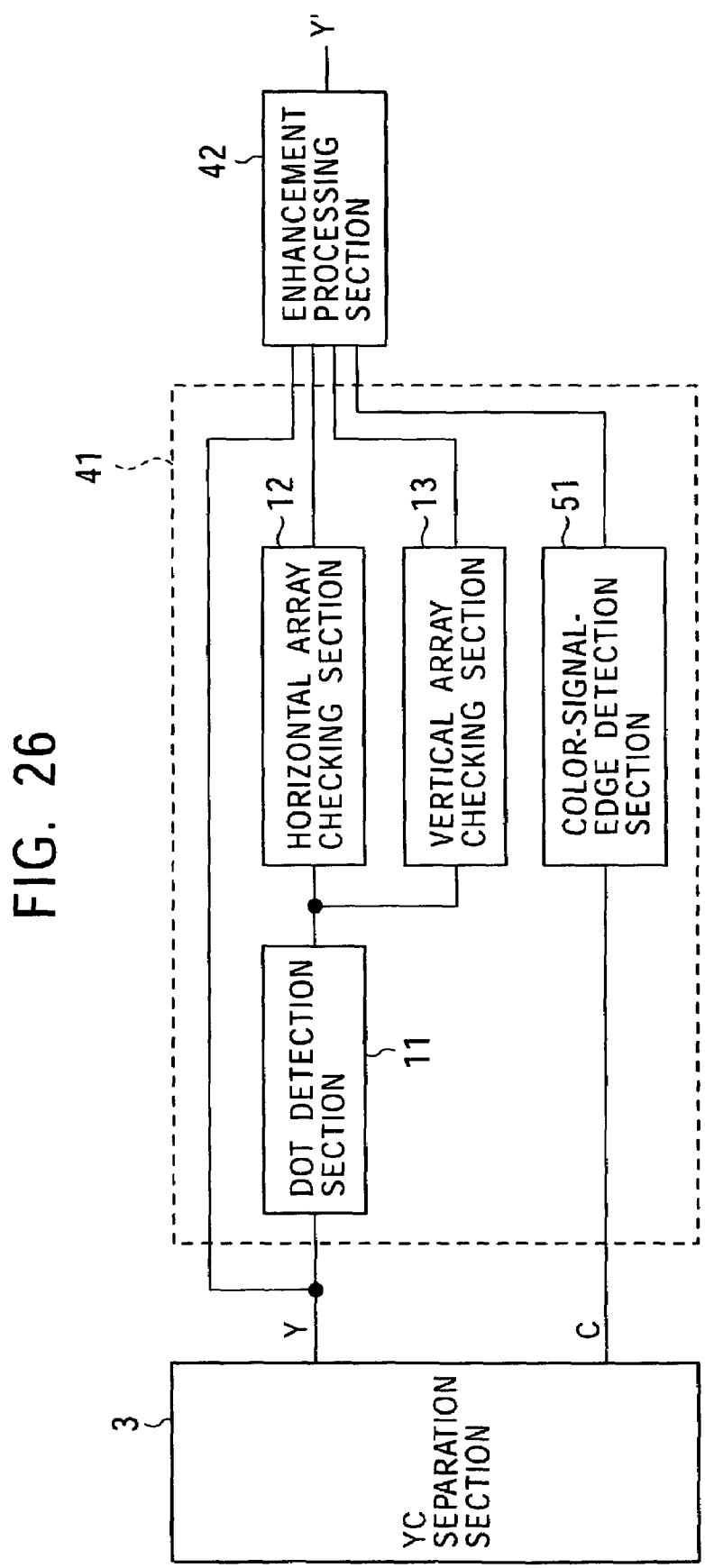
FIG. 26 is a block diagram illustrating a fourth embodiment of the present invention.

Next, FIG. 26 is a block diagram illustrating a fourth embodiment of the present invention. In the fourth embodiment, a description will be given of a case in which a process for a Y signal after an NTSC color image signal is YC-separated is performed using a C signal.

Components in FIG. 26 corresponding to those in FIG. 1 are given the same reference numerals, and accordingly, descriptions thereof are omitted. That is, in FIG. 26, a dot-interference detection section 41 is provided in place of the dot-interference detection section 1, and an enhancement processing section 42 is provided in place of the enhancement processing section 2. The dot-interference detection section 41 has basically the same configuration as that of the dot-interference detection section 1 described with reference to FIG. 1 except that a color-signal-edge detection section 51 is newly provided.

Figure 27:
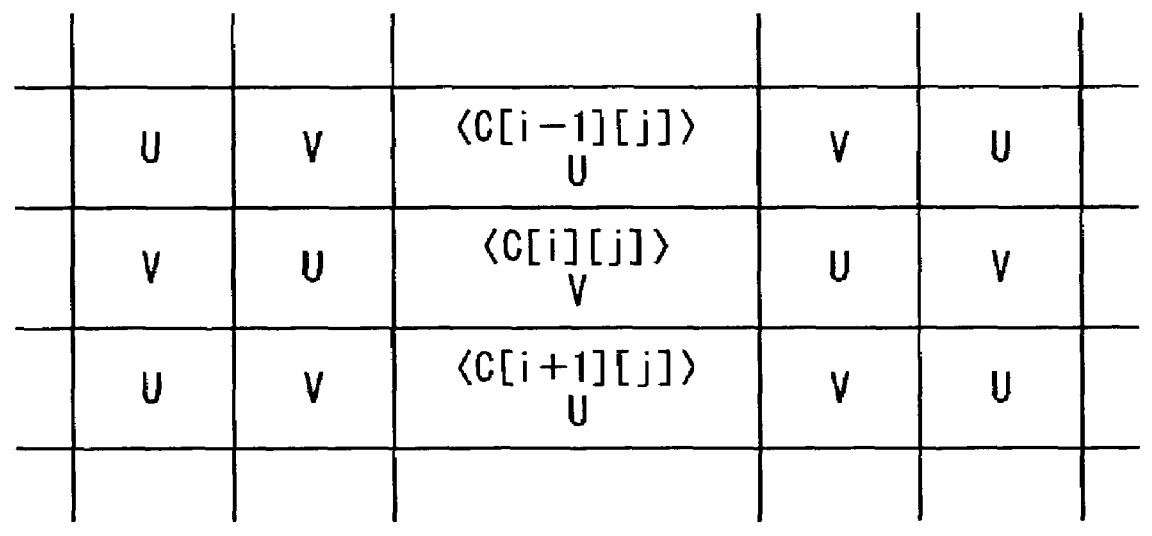

The color-signal-edge detection section 51 receives an input of a color signal C in which a U signal and a V signal appear alternately, as point sequence U, V, U, V . . . , from the YC separation section 3, as shown in FIG. 27, detects a color interface portion, that is, a color edge, and outputs it to the enhancement processing section 42.

In accordance with the signal supplied from the color-signal-edge detection section 51, the enhancement processing section 42 makes a determination of whether or not dot interference has occurred on the portion which is detected as a color edge on the basis of the signal input from the horizontal array checking section 12 and the vertical array checking section 13, and performs an enhancement process which is the same as that of the enhancement processing section 2 while avoiding portions where dot interference occurs.

The dot detection section 11, the horizontal array checking section 12, and the vertical array checking section 13 of the dot-interference detection section 41 perform processes which are the same as processes described with reference to FIGS. 4, 7, and 11, and accordingly, descriptions thereof are omitted here.

Figure 28:
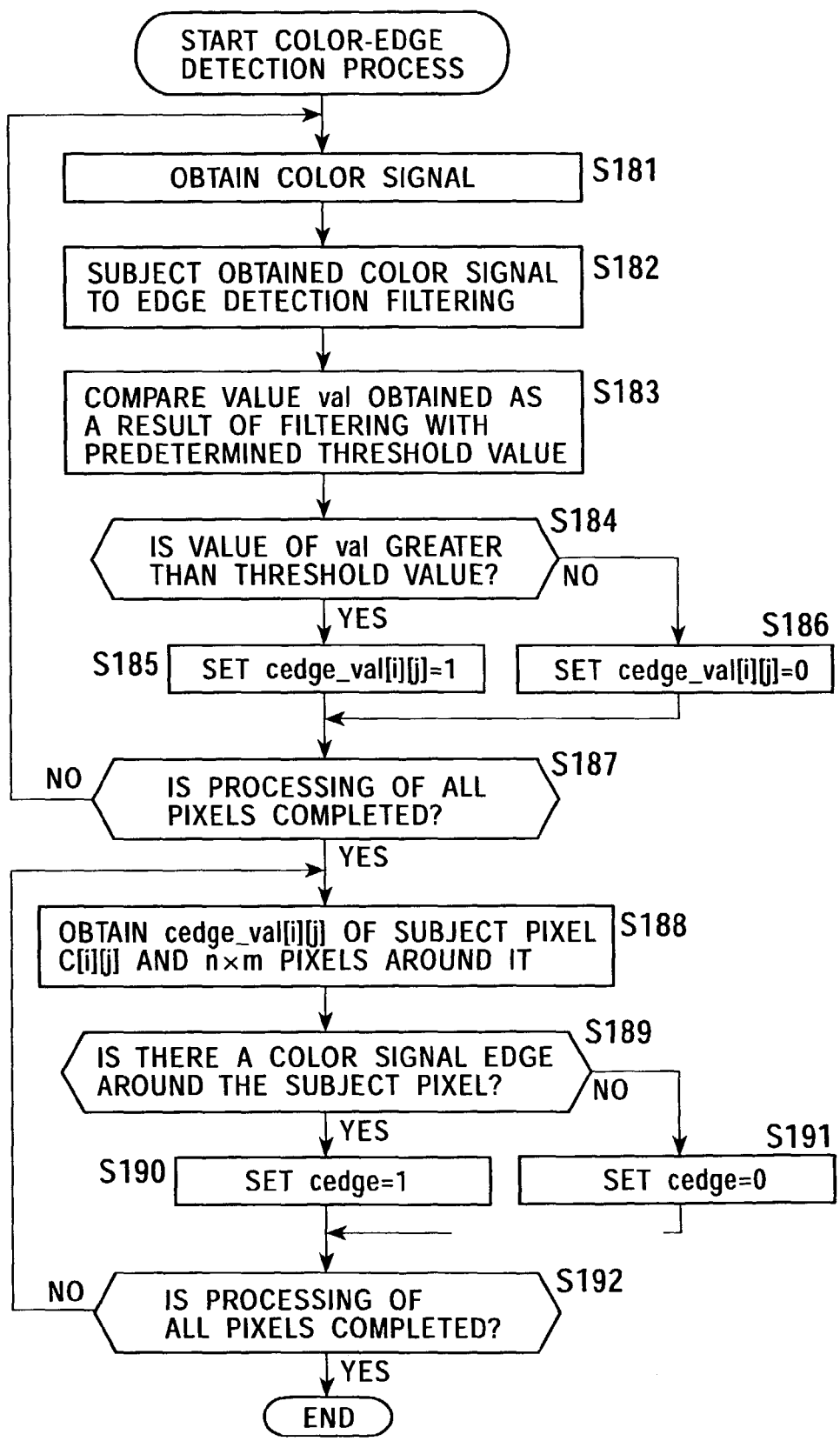
FIG. 28 is a flowchart illustrating a color-edge detection process.

Referring to the flowchart in FIG. 28, a description will be given of a color-edge detection process performed by the color-signal-edge detection section 51.

In step S181, the color-signal-edge detection section 51 obtains a color signal C, and in step S182, the color-signal-edge detection section 51 subjects the obtained color signal to edge detection filtering.

For the edge detection filter, a filter such as that shown in, for example, FIG. 29 is used. The edge detection filter shown in FIG. 29 is equivalent to that, after a 3×5 low-pass filter (moving averaging filter) is applied, a difference filter (1,0,−1) is applied.

The filtering result val[i][j] as a result of using the edge detection filter shown in FIG. 29 is expressed by the following equation (6):

$$val[i][j]=C[i-1][j-6]+C[i-1][j-4]-C[i-1][j+4]-C[i-1][j+6]+C[i][j-6]+C[i][j-4]-C[i][j+4]-C[i][j+6]+C[i+1][j-6]+C[i+1][j-4]-C[i+1][j+4]-C[i+1][j+6] \quad (6)$$

In step S183, the color-signal-edge detection section 51 compares the value val obtained as a result of filtering with a predetermined threshold value. Since the color-edge detection accuracy differs depending on the setting of this threshold value, the threshold value can be changed as desired on the basis of the type of input image, etc.

In step S184, the color-signal-edge detection section 51 determines whether or not the value of val is greater than the threshold value.

When it is determined in step S184 that the value of val is greater than the threshold value, in step S185, the color-signal-edge detection section 51 assumes that the pixel is a color edge and sets cedge_val[i][j]=1.

When it is determined in step S184 that the value of val is less than the threshold value, in step S186, the color-signal-edge detection section 51 assumes that the pixel is not a color edge and sets cedge_val[i][j]=0.

After the process of step S185 or S186, in step S187, the color-signal-edge detection section 51 determines whether or not the processes of steps S181 to S185 or the process of step S186 for all the pixels is completed.

When it is determined in step S187 that the processing of all the pixels is not completed, the process returns to step S181, and this and subsequent steps are repeated.

When it is determined in step S187 that the processing of all the pixels is completed, in step S188, the color-signal-edge detection section 51 obtains cedge_val[i][j] of the subject pixel C[i][j] and n×m pixels around it. The number n×m of pixels around the subject pixel can be set as desired.

In step S189, the color-signal-edge detection section 51 determines whether or not an edge of a color signal exists around the subject pixel on the basis of cedge_val[i][j] of n×m pixels, which are obtained in step S188.

When it is determined in step S189 that an edge of a color signal exists around the subject pixel, in step S190, the color-signal-edge detection section 51 sets cedge=1.

When it is determined in step S189 that an edge of a color signal does not exist around the subject pixel, in step S191, the color-signal-edge detection section 51 sets cedge=0.

In step S192, the color-signal-edge detection section 51 determines whether or not the processes of step S188 to S190 or the process of step S191 for all the pixels is completed.

When it is determined in step S192 that the processing of all the pixels is not completed, the process returns to step S188, and this and subsequent steps are repeated. When it is determined in step S192 that the processing of all the pixels is completed, the processing is terminated.

As a result of the processes described with reference to FIG. 28, the color edge is detected, and the value of cedge indicating whether or not each pixel has a color edge nearby is output to the enhancement processing section 42.

The color-edge detection process performed by the color-signal-edge detection section 51 may be a process differing from the process described with reference to FIG. 28 as long as it is a process capable of detecting the presence or absence of a color edge.

Figure 30:
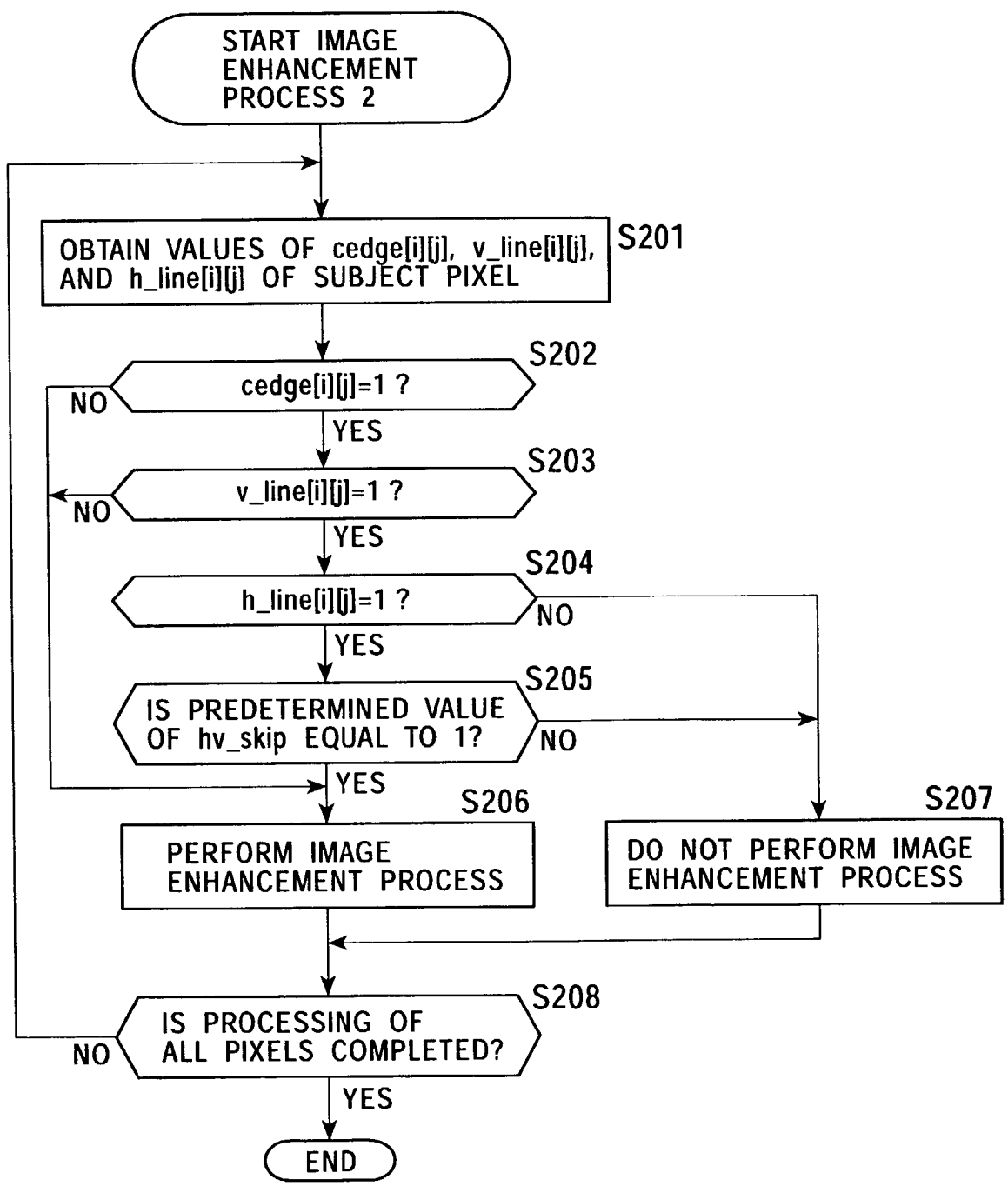
FIG. 30 is a flowchart illustrating an image enhancement process 2.

Next, referring to the flowchart in FIG. 30, a description will be given of an image enhancement process 2 by the enhancement processing section 42.

In step S201, the enhancement processing section 42 obtains the value of cedge[i][j] of the subject pixel and the values of v_line[i][j] and h_line[i][j], supplied from the horizontal array checking section 12 and the vertical array checking section 13, which are detected by the color-edge detection section 51 as a result of the processes described with reference to FIG. 28, and in step S202, the enhancement processing section 42 determines whether or not cedge[i][j]=1.

Figure 15:
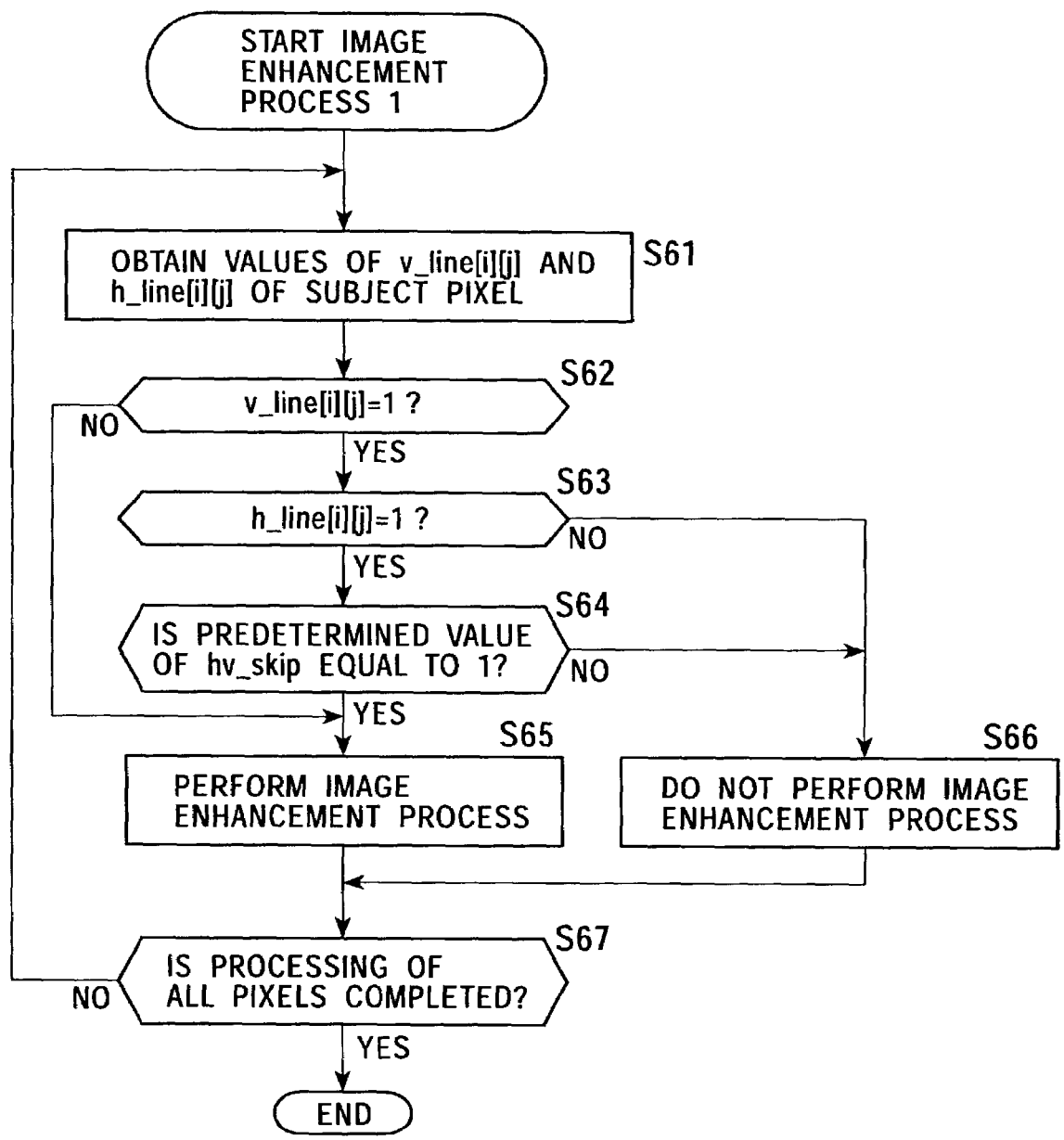
FIG. 15 is a flowchart illustrating an image enhancement process 1.

When it is determined in step S202 that cedge[i][j]=1, since the fact that a color edge exists near the subject pixel is detected, in steps S203 to S208, the processes which are the same as the processes of steps S62 to S67 of FIG. 15 are performed.

When it is determined in step S202 that cedge[i][j] is not equal to 1, since the fact that a color edge does not exist near the subject pixel is detected, the process proceeds to step S206, where the process which is the same as the image enhancement process performed in step S65 of FIG. 15 is performed, and subsequent steps are performed.

When it is determined in step S208 that the processing of all the pixels is not completed, the process returns to step S201, and this and subsequent steps are repeated. When it is determined in step S208 that the processing of all the pixels is completed, the processing is terminated.

As a result of the processes described with reference to FIG. 30, a determination as to whether or not dot interference has occurred is made in advance on only the pixel which is determined to have a color edge nearby, and based on the result, it is determined whether or not an enhancement process should be performed. Therefore, in the image enhancement process 2, processes having the same advantages are performed in a shorter time in comparison with the image enhancement process 1 described with reference to FIG. 15.

[Filtering Process of NTSC Color Image Signal Using Color-signal-edge Detection]

Figure 31:
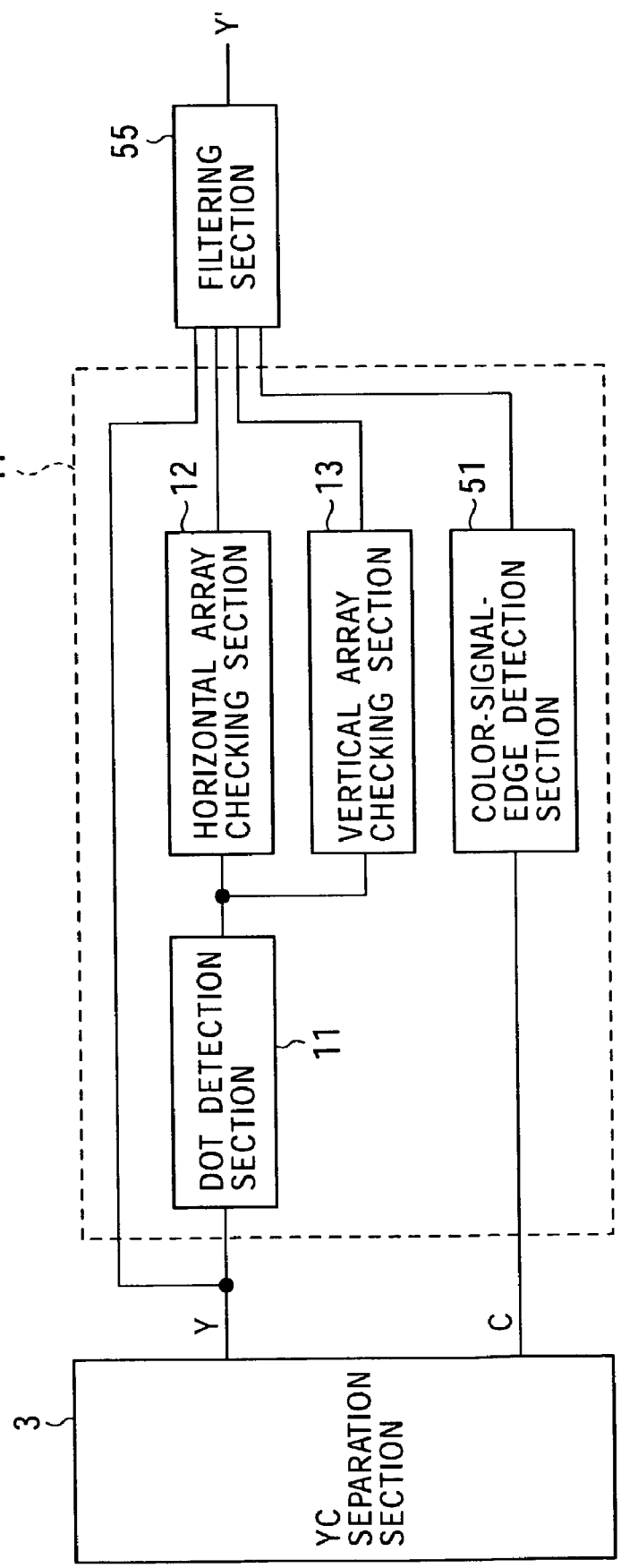
FIG. 31 is a block diagram illustrating a fifth embodiment of the present invention.

Next, FIG. 31 is a block diagram illustrating a fifth embodiment of the present invention. In the fifth embodiment, a description will be given of a case in which a process for a Y signal after an NTSC color image signal is YC-separated is performed using a C signal.

Components in FIG. 31 corresponding to those in FIG. 26 are given the same reference numerals, and accordingly, descriptions thereof are omitted. That is, in FIG. 31, the same configuration as that described with reference to FIG. 26 is provided except that a filtering section 55 is provided in place of the enhancement processing section 42.

In accordance with the signal supplied from the color-signal-edge detection section 51, the filtering section 55 determines whether or not dot interference has occurred in a portion which is detected as a color edge on the basis of the signal input from the horizontal array checking section 12 and the vertical array checking section 13, and performs the same filtering process as that of the filtering section 21 on only the portion where dot interference has occurred.

The dot detection section 11, the horizontal array checking section 12, the vertical array checking section 13, and the color-signal-edge detection section 51 of the dot-interference detection section 41 perform the same processes as the processes described with reference to FIGS. 4, 7, 11, and 28, and accordingly, descriptions thereof are omitted here.

Figure 32:
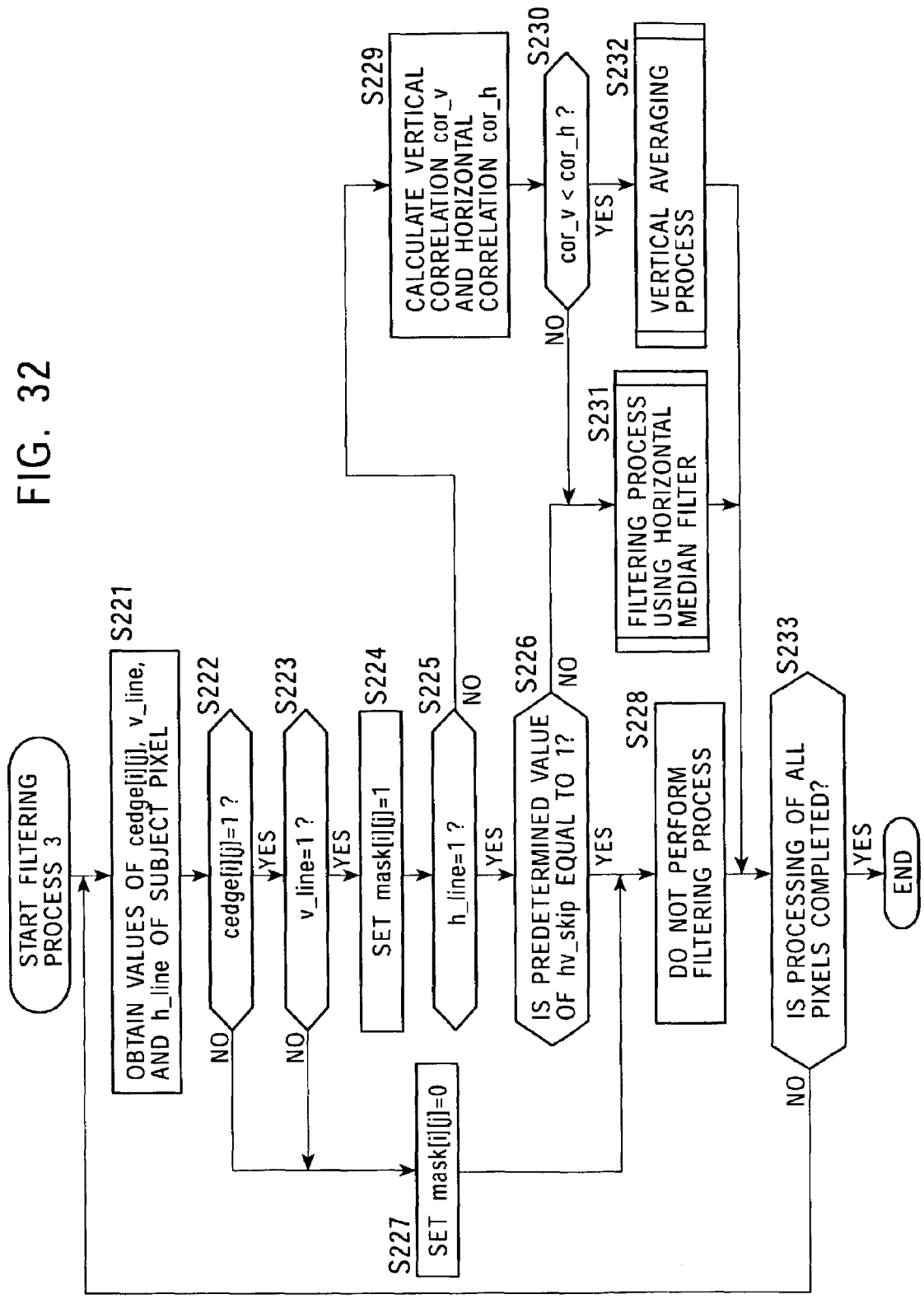
FIG. 32 is a flowchart illustrating a filtering process 3.

Next, referring to the flowchart in FIG. 32, a description will be given of a filtering process 3 performed by a filtering section 55.

In step S221, the filtering section 55 obtains the values of cedge[i][j] of the subject pixel, and v_line[i][j] and h_line[i][j] thereof, supplied from the horizontal array checking section 12 and the vertical array checking section 13, which are detected by the color-signal-edge detection section 51 as a result of the processes described with reference to FIG. 28, and in step S222, the filtering section 55 determines whether or not cedge[i][j]=1.

When it is determined in step S222 that cedge[i][j]=1, since the fact that a color edge exists near the subject pixel is detected, in steps S223 to S233, the same processes as those of steps S82 to S92 of FIG. 17 are performed.

When it is determined in step S222 that cedge[i][j] is not equal to 1, since the fact that a color edge does not exist near the subject pixel is detected, the process proceeds to step S227, where the same process as the process performed in step S83 of FIG. 17 is performed, and subsequent processes are performed.

When it is determined in step S23 that the processing of all the pixels is not completed, the process returns to step S221, and this and subsequent steps are repeated. When it is determined in step S233 that the processing of all the pixels is completed, the processing is terminated.

As a result of the processes described with reference to FIG. 32, a determination as to whether or not dot interference has occurred is made in advance in only the pixel which is determined to have a color edge nearby, and based on the result, it is determined whether or not the filtering process should be performed. Therefore, in the filtering section 55, processing having the same advantages is performed in a shorter time in comparison with the filtering process 1 described with reference to FIG. 17.

After the processes of the filtering process 3 described with reference to FIG. 32, the filtering process 2 described with reference to FIG. 20 may further be performed.

[Image Enlargement Process of NTSC Color Image Signal Using Color-signal-edge Detection]

Figure 33:
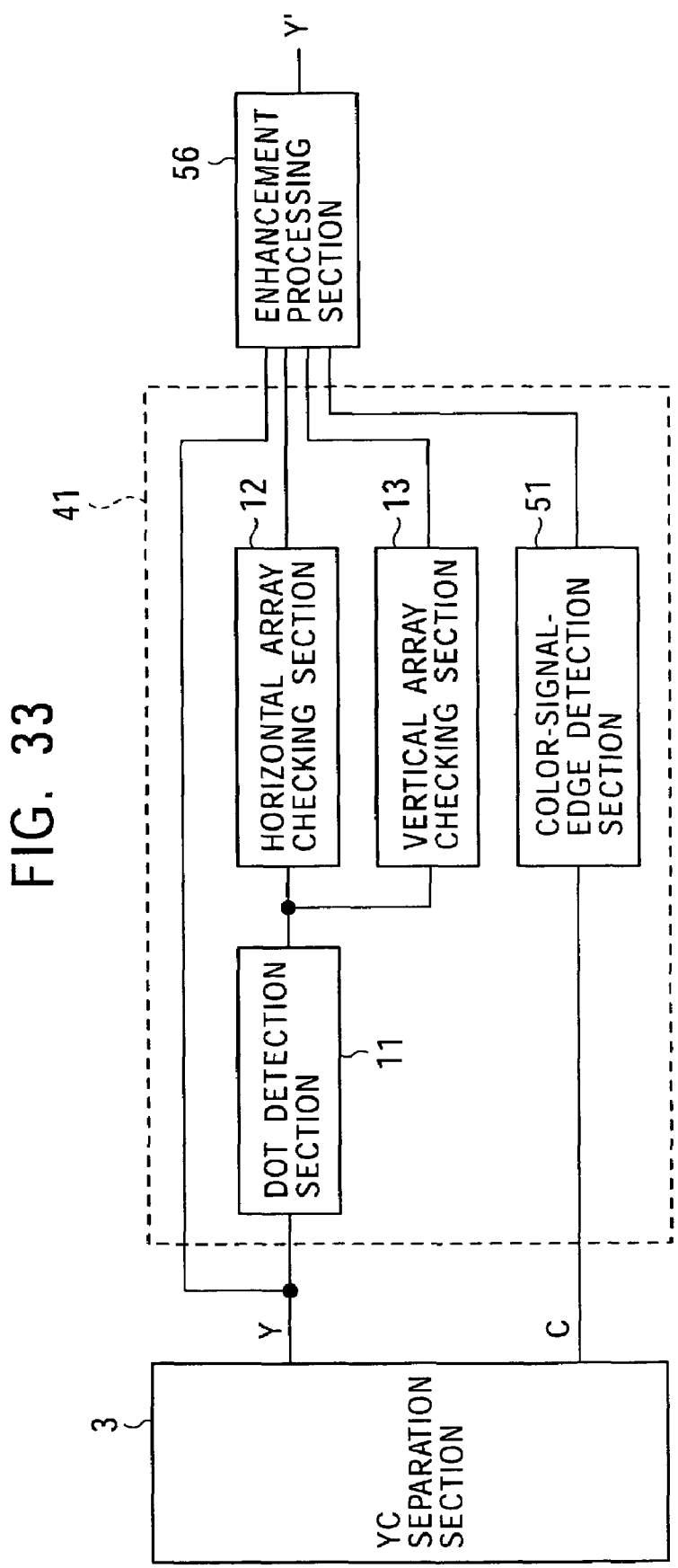
FIG. 33 is a block diagram illustrating a sixth embodiment of the present invention.

Next, FIG. 33 is a block diagram illustrating a sixth embodiment of the present invention. In the sixth embodiment, a description will be given of a case in which a process for a Y signal after an NTSC color image signal is YC-separated is performed using a C signal.

Components in FIG. 33 corresponding to those of FIG. 26 are given the same reference numerals, and accordingly, descriptions thereof are omitted. That is, in FIG. 33, the same configuration as that described with reference to FIG. 26 is provided except that an image enlargement section 56 is provided in place of the enhancement processing section 42.

In accordance with the signal supplied from the color-signal-edge detection section 51, the image enlargement section 56 determines whether or not dot interference has occurred in a portion which is detected as a color edge on the basis of the signals input from the horizontal array checking section 12 and the vertical array checking section 13, and performs a filtering process on only the portion where dot interference has occurred in a manner similar to the image enlargement section 31, and then the image enlargement section 56 performs an enlargement process.

The dot detection section 11, the horizontal array checking section 12, the vertical array checking section 13, and the color-signal-edge detection section 51 of the dot-interference detection section 41 perform the same processes as the processes described with reference to FIGS. 4, 7, 11, and 28, and accordingly, descriptions thereof are omitted here.

Figure 34:
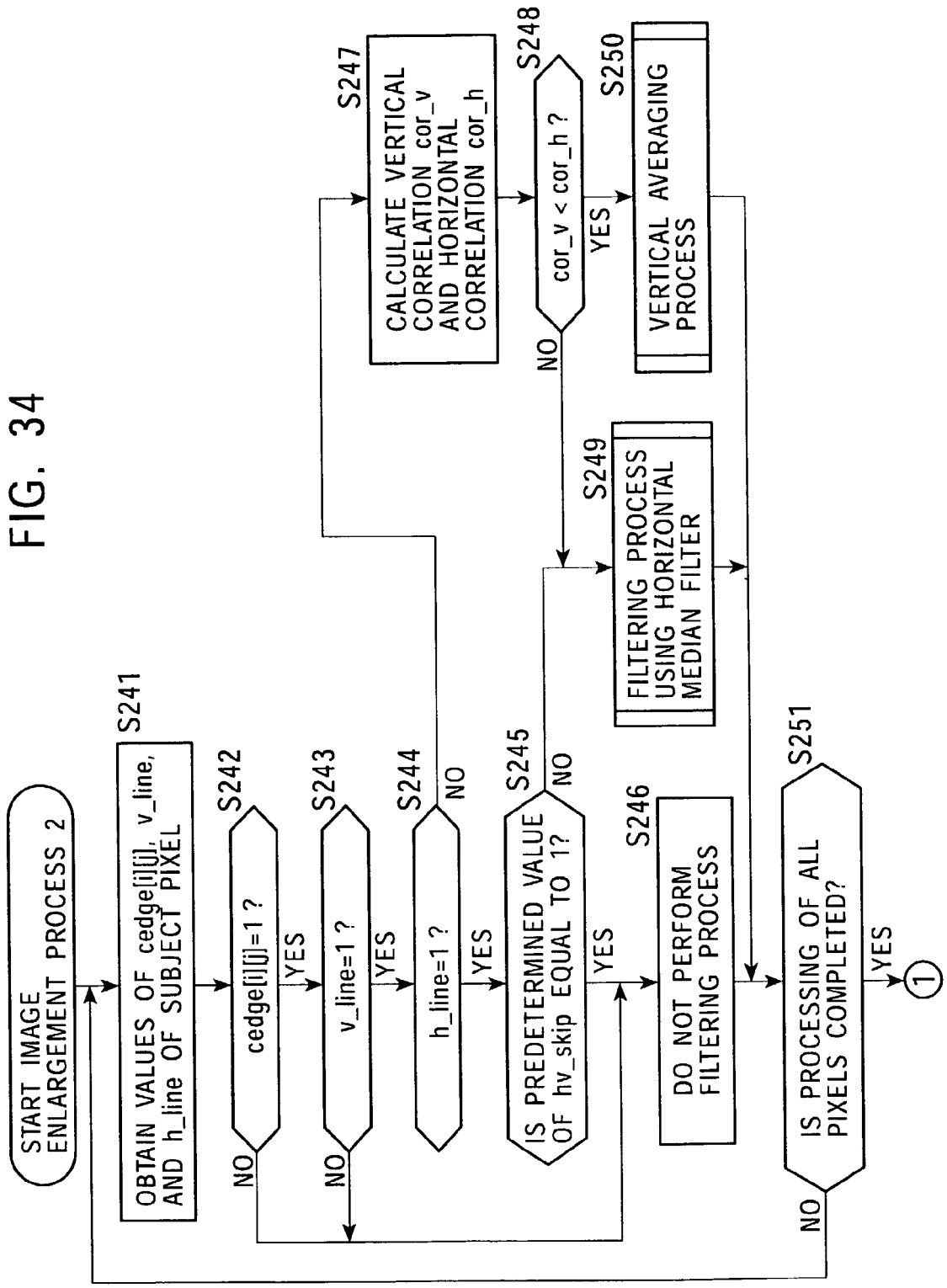
FIG. 34 is a flowchart illustrating an image enlargement process 2.
Figure 35:
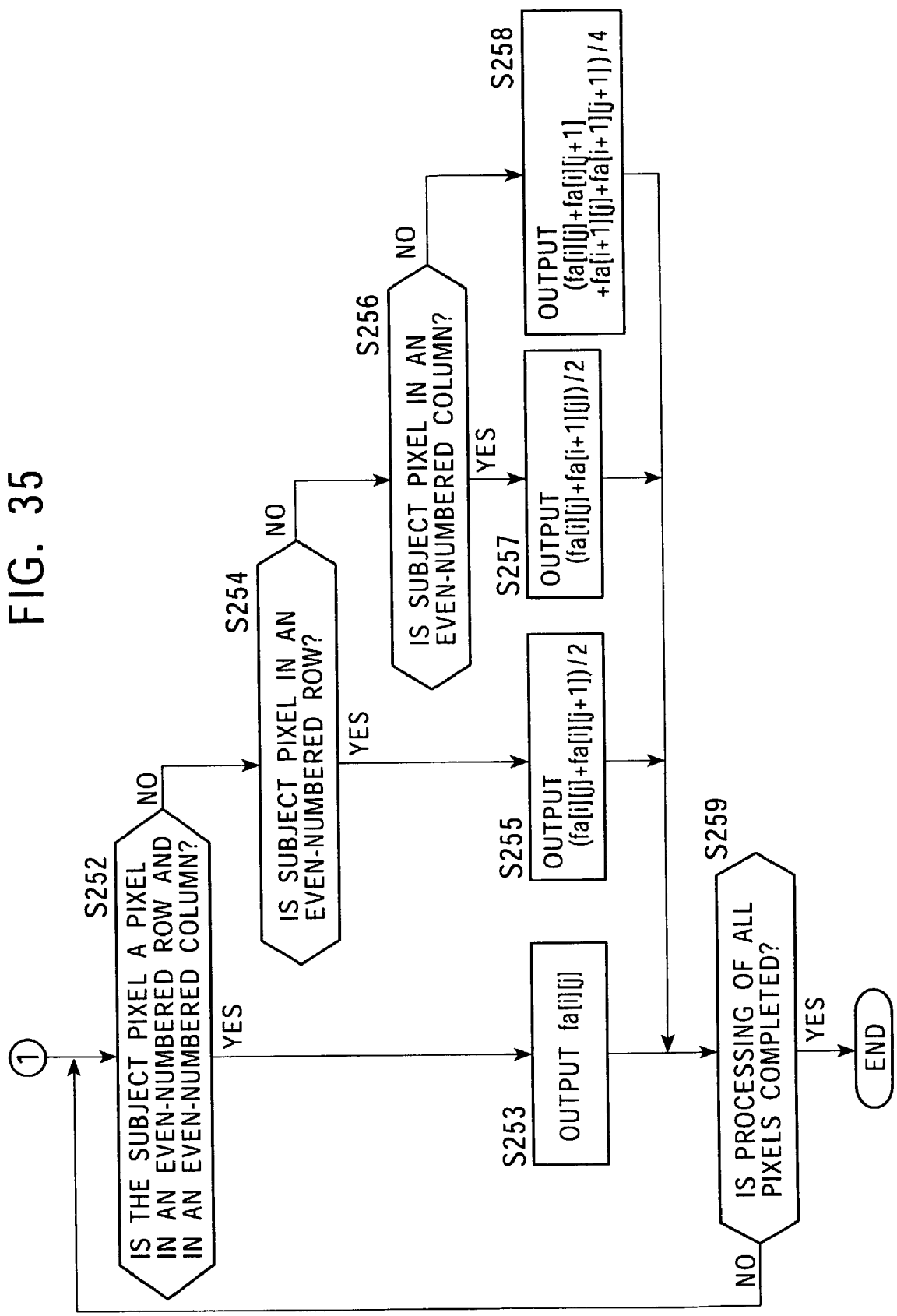
FIG. 35 is a flowchart illustrating the image enlargement process 2.

Next, referring to the flowchart in FIGS. 34 and 35, a description will be given of an image enlargement process 2 performed by the image enlargement section 56.

In step S241, the image enlargement section 56 obtains the values of cedge[i][j] of the subject pixel, and v_line[i][j] and h_line[i][j] thereof, supplied from the horizontal array checking section 12 and the vertical array checking section 13, which are detected by the color-signal-edge detection section 51 as a result of the processes described with reference to FIG. 28, and in step S242, the image enlargement section 56 determines whether or not cedge[i][j]=1.

When it is determined in step S242 that cedge[i][j]=1, since the fact that a color edge exists near the subject pixel is detected, in steps S243 to S259, the same processes as those of steps S152 to S168 of FIGS. 22 and 23 are performed.

When it is determined in step S242 that cedge[i][j] is not equal to 1, since the fact that a color edge does not exist near the subject pixel is detected, the process proceeds to step S246, where the same process as the process performed in step S87 of FIG. 17 is performed, and subsequent processes are performed.

When it is determined in step S259 that the processing of all the pixels is not completed, the process returns to step S252, where this and subsequent steps are repeated. When it is determined in step S259 that the processing of all the pixels is completed, the processing is terminated.

As a result of the processes described with reference to FIGS. 34 and 35, it is determined in advance whether or not dot interference has occurred only in the pixel which is determined to have a color edge nearby. Based on the result, it is determined whether or not a filtering process should be performed, and an image enlargement process is performed by using data after the filtering process is performed. Therefore, in the image enlargement section 56, processing having the same advantages is performed in a shorter time in comparison with image enlargement process 1 described with reference to FIGS. 22 and 23.

[Enhancement Process of PAL Color Image Signal]

Figure 36:
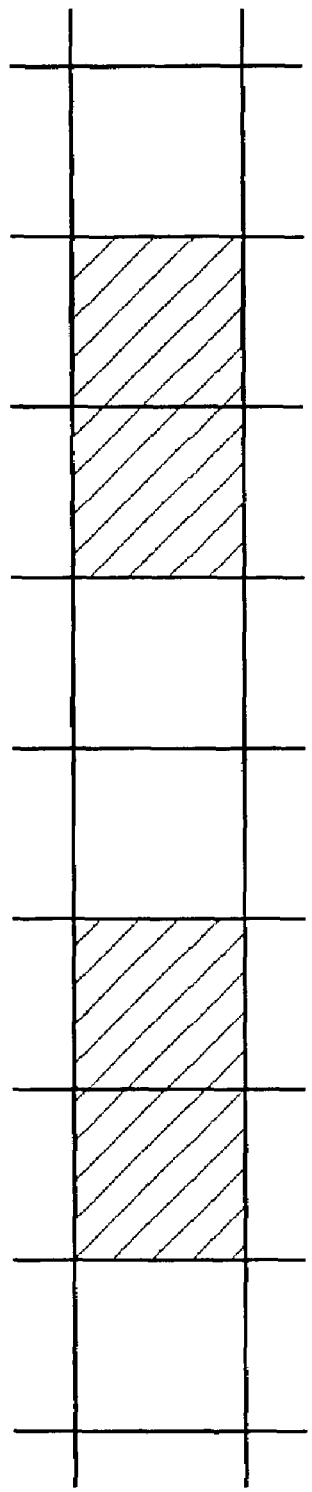
FIG. 36 illustrates dot interference which occurs in PAL (Phase Alternation Line)

In the foregoing, a description is given of a case in which an input of an NTSC color image signal is received, after a YC separation process is performed, a portion where dot interference resulting from a YC separation process occurs is detected, and based on the result, image processing is performed. In the NTSC color image signal, dot interference resulting from a YC separation process is such that a black dot occurs every dot. In contrast, in a PAL (Phase Alternation Line) color-image signal, there are cases in which a black dot occurs every two dots as a result of the YC separation process, as shown in FIG. 36. Hereafter, dot interference, shown in FIG. 36, in which a black dot occurs every two dots, is referred to as 2-dot interference in order to be distinguished from dot interference which occurs every dot.

Figure 37:
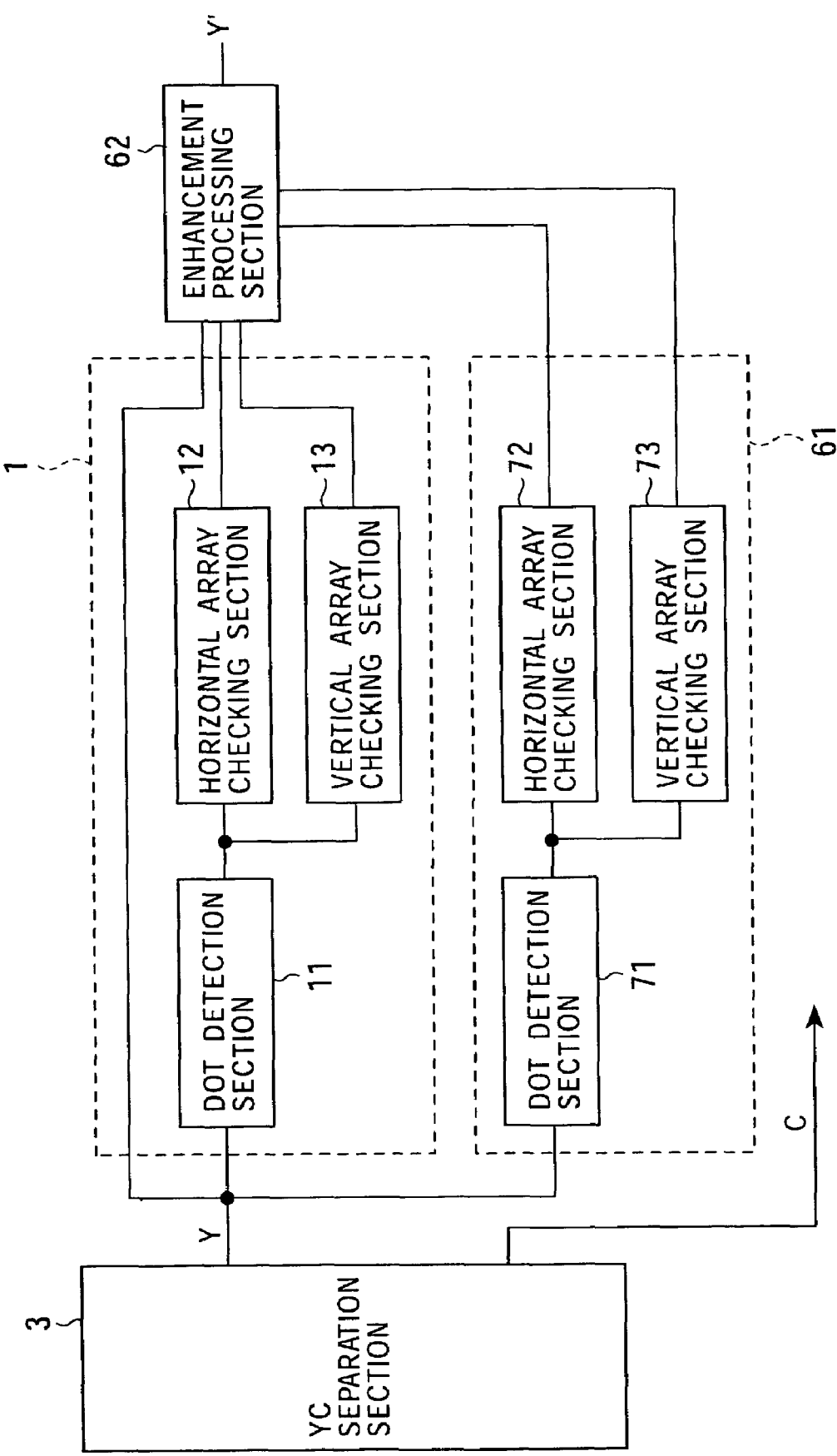
FIG. 37 is a block diagram illustrating a seventh embodiment of the present invention.

Next, FIG. 37 is a block diagram illustrating a seventh embodiment of the present invention. In the seventh embodiment, a description will be given of a case in which a process for a Y signal after a PAL color image signal is YC-separated is performed.

Components in FIG. 37 corresponding to those in FIG. 1 are given the same reference numerals, and accordingly, descriptions thereof are omitted. In FIG. 37, basically, the same configuration as that described with reference to FIG. 1 is provided except that an enhancement processing section 62 is provided in place of the enhancement processing section 2, and a 2-dot-interference detection section 61 is newly provided.

The 2-dot-interference detection section 61 detects dot interference which occurs every two dots, as described with reference to FIG. 36.

A dot detection section 71 compares the subject pixel with pixels which are positioned two pixels above and below the subject pixel in the array, within the input Y signal, extracts a portion where pixels are arranged as "dark-bright-dark" or "bright-dark-bright" in the horizontal direction, and outputs the extraction result as dot values d'[i][j] to a horizontal array checking section 72 and a vertical array checking section 73.

The horizontal array checking section 72 detects whether or not the dot values d'[i][j] of a predetermined number of pixels, arranged horizontally in such a manner as to contain the subject pixel, are the same as each other, and outputs the detection result to the enhancement processing section 62. The number of horizontal arrays can be set as desired.

The vertical array checking section 73 detects whether or not the dot values d'[i][j] of a predetermined number of pixels, which are arranged vertically in such a manner as to contain the subject pixel, occur in units of two dots alternately as 1 and 2, that is, it detects whether or not they are arranged as "1, 2, 1" or "2, 1, 2" (when the number of vertical arrays is 3) in the vertical direction by comparing the dot values which are positioned two lines above and below in the array, and outputs the detection result to the enhancement processing section 62. The number of vertical arrays can be set as desired.

The enhancement processing section 62 receives an input of a Y signal from the dot-interference detection section 1 detects whether or not there is a portion where 2-dot interference is thought to have occurred based on the signals input from the horizontal array checking section 72 and the vertical array checking section 73 of the 2-dot-interference detection section 61, and performs an enhancement process on a Y signal in portion other than the portions where 2-dot interference has occurred. Then, when it is determined that 2-dot interference has not occurred, the enhancement processing section 62 detects a portion where dot interference is thought to have occurred based on the signals input from the horizontal array checking section 12 and the vertical array checking section 13 of the dot-interference detection section 1, and performs an enhancement process on a Y signal in portions other than the portions where dot interference has occurred.

Referring to the flowchart in FIG. 38, a description will be given of a dot detection process 2 performed by a dot detection section 71.

In step S271, the dot detection section 71 reads, from the input Y signal, the values of the subject pixel Y[i][j], and the pixels Y[i−2][j] and Y[i+2][j] which are positioned two lines above and below the subject pixel, as shown in FIG. 39, and reads a predetermined threshold-level value T for detecting a dot.

The threshold-level value T can be set as desired. In a case where the value of T is set to a high value, only when the pixel value differs greatly, the array is detected as dots of a horizontal array. In a case where the value T is set to a low value, even when the pixel value does not differ greatly, the array is likely to be detected as dots. Therefore, when the original image contains a lot of color edges and dot interference is likely to occur, or when the original image contains data which is likely to be mis-detected as dot interference, the set value can be changed according to the original image corresponding to the input Y signal.

Figure 39A:
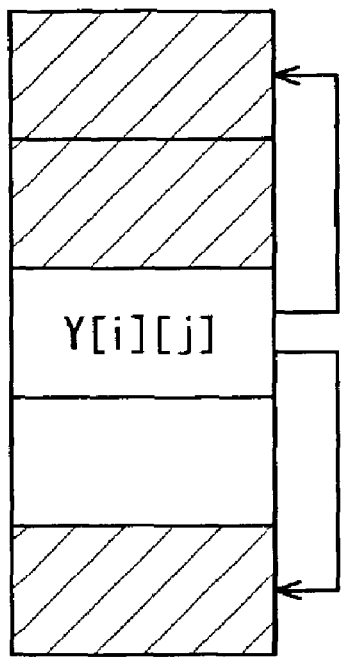
FIGS. 39A, 39B, 39C, and 39D illustrate a dot pattern.
Figure 39B:
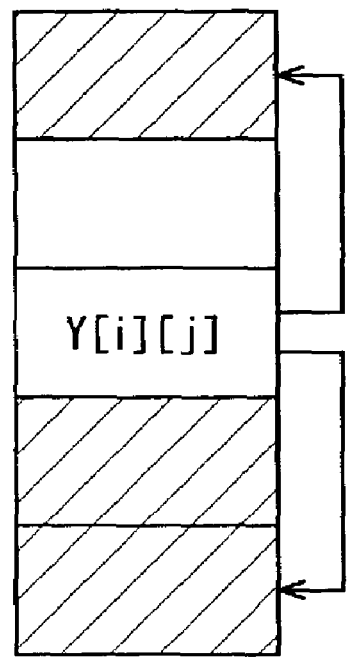

In step S272, the dot detection section 71 determines whether or not Y[i][j]−Y[i−2][j]>T and Y[i][j]−Y[i+2][j]>T on the basis of the pixel values and the threshold-level value T, which are obtained in step S271, that is, determines whether or not the obtained three pixels have the array shown in FIG. 39A or 39B.

When it is determined in step S272 that the obtained three pixels have one of the arrays shown in FIGS. 39A and 39B, in step S273, the dot detection section 71 sets the dot value d'[i][j]=1.

Figure 39C:
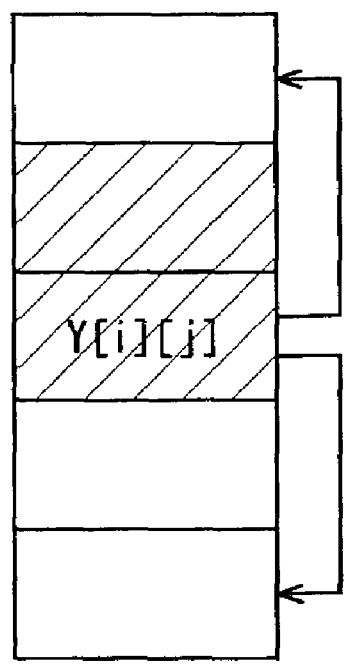
Figure 39D:
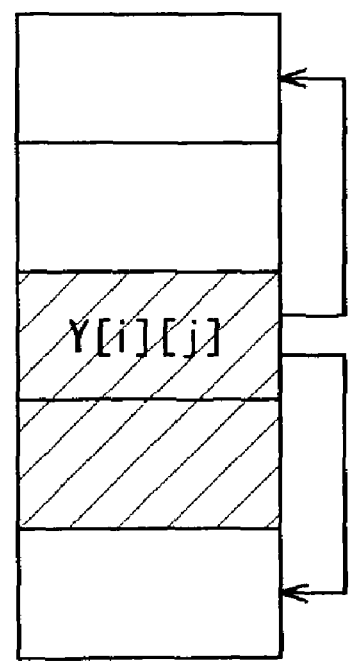

When it is determined in step S272 that the three obtained pixels do not have any one of the arrays shown in FIGS. 39A and 39B, in step S274, the dot detection section 71 determines whether or not Y[i−2][j]−Y[i][j]>T and Y[i+2][j]−Y[i][j]>T, that is, determines whether or not the obtained three pixels have the array shown in FIG. 39C or 39D.

When it is determined in step S274 that the three obtained pixels have one of the arrays shown in FIGS. 39C and 39D, in step S275, the dot detection section 71 sets dot value d'[i][j]=2.

When it is determined in step S274 that the obtained three pixels do not have any one of the arrays shown in FIGS. 39C and 39D, in step S276, the dot detection section 71 sets dot value d'[i][j]=0.

In step S277, the dot detection section 71 determines whether or not the processing of all the pixels is completed. When it is determined in step S277 that the processing of all the pixels is not completed, the process returns to step S271, and this and subsequent steps are repeated. When it is determined in step S277 that the processing of all the pixels is completed, the processing is terminated.

As a result of the processes described with reference to FIG. 38, when three pixels, which are arranged in the vertical direction with one line therebetween, in such a manner as to contain the subject pixel Y[i][j], are arranged as "dark-bright-dark" or "bright-dark-bright" in the vertical direction, this array is detected, the dot values d' are set based on the detection result, and the values are output to the horizontal array checking section 72 and the vertical array checking section 73.

Next, referring to the flowchart in FIG. 40, a description will be given of a horizontal array checking process 2 performed by the horizontal array checking section 72.

Figure 40:
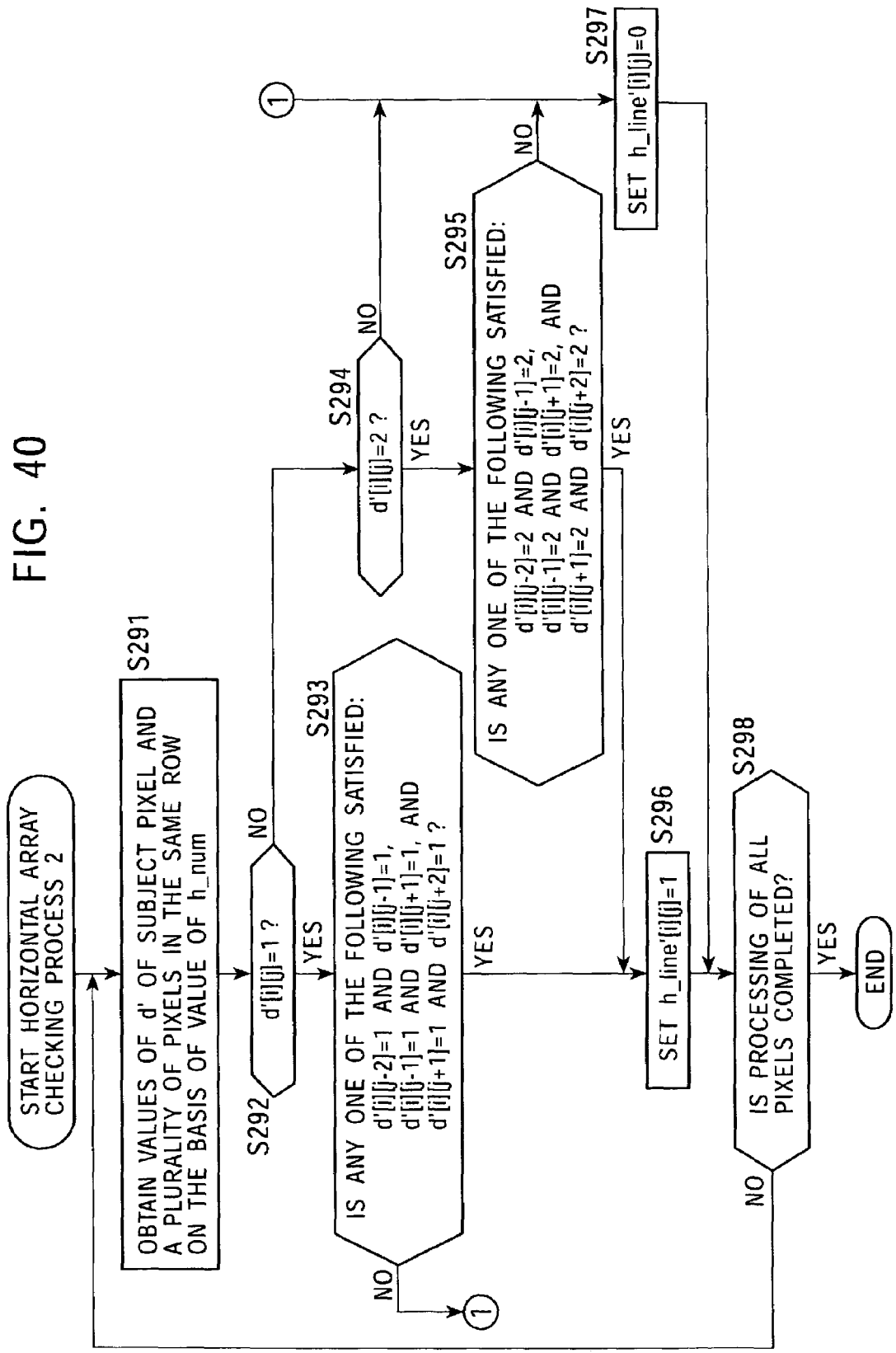
FIG. 40 is a flowchart illustrating a horizontal array checking process 2.

The horizontal array checking process 2 of FIG. 40 is basically the same process as the horizontal array checking process 1 described with reference to FIG. 7 except that the input dot value is denoted as d' instead of d and that the variable to be output is denoted as h_line'[i][j] instead of h_line[i][j].

In step S291, the horizontal array checking section 72 obtains the dot values d' of the subject pixel and a plurality of pixels of that row on the basis of the value of h_num indicating the number of checking of horizontal arrays. h_num can be set as desired. Here, a description will be given of the case of h_num=3.

In the case of h_num=3, similarly to the case described with reference to FIG. 8, the dot values d'[i][j−2], d'[i][j−1], d'[i][j], d'[i][j+1], and d'[i+2][j] of the five pixels which are horizontally arranged with the dot value d'[i][j] of the subject pixel as the center are obtained. When the three pixels containing the subject pixel have the same dot value, there are cases in which, similarly to the case described with reference to FIG. 9A, d'[i][j−2], d'[i][j−1], and d'[i][j] have the same dot value, cases in which, similarly to the case described with reference to FIG. 9B, d'[i][j−1], d'[i][j], and d'[i][j+1] have the same dot value, cases in which, similarly to the case described with reference to FIG. 9C, d'[i][j], d'[i][j+1], and d'[i+2][j] have the same dot value.

In step S292, the horizontal array checking section 72 determines whether d'[i][j]=1 on the basis of the dot value obtained in step S291.

When it is determined in step S292 that d'[i][j]=1, in step S293, the horizontal array checking section 72 determines whether any one of the following conditions is satisfied: d'[i][j−2]=1 and d'[i][j−1]=1 (that is, the array of the dot values, which is the same as that described with reference to FIG. 9A, is provided); d'[i][j−1]=1 and d'[i][j+1]=1 (that is, the array of the dot values, which is the same as that described with reference to FIG. 9B, is provided); and d'[i][j+1]=1 and d'[i][j+2]=1 (that is, the array of the dot values, which is the same as that described with reference to FIG. 9C, is provided).

When it is determined in step S293 that any one of the following conditions is satisfied: d'[i][j−2]=1 and d'[i][j−1]=1; d'[i][j−1]=1 and d'[i][j+1]=1; and d'[i][j+1]=1 and d'[i][j+2]=1, the process proceeds to step S296. When it is determined in step S293 that none of the following conditions is satisfied: d'[i][j−2]=1 and d'[i][j−1]=1; d'[i][j−1]=1 and d'[i][j+1]=1; and d'[i][j+1]=1 and d'[i][j+2]=1, the process proceeds to step S297.

When it is determined in step S292 that d'[i][j] is not equal to 1, in step S294, the horizontal array checking section 72 determines whether or not d'[i][j]=2 on the basis of the dot values obtained in step S291.

When it is determined in step S294 that d'[i][j] is not equal to 2, the process proceeds to step S297.

When it is determined in step S294 that d'[i][j]=2, in step S295, the horizontal array checking section 72 determines whether any one of the following conditions is satisfied: d'[i][j−2]=2 and d'[i][j−1]=2 (that is, the array of the dot values, which is the same as that described with reference to FIG. 10A, is provided); d'[i][j−1]=2 and d'[i][j+1]=2 (that is, the array of the dot values, which is the same as that described with reference to FIG. 10B, is provided); and d'[i][j+1]=2 and d'[i][j+2]=2 (that is, the array of the dot values, which is the same as that described with reference to FIG. 10C, is provided).

When it is determined in step S293 that any one of the following conditions is satisfied: d'[i][j−2]=1 and d'[i][j−1]=1; d'[i][j−1]=1 and d'[i][j+1]=1; and d'[i][j+1]=1 and d'[i][j+2]=1, or when it is determined in step S295 that any one of the following conditions is satisfied: d'[i][j−2]=2 and d'[i][j−1]=2; d'[i][j−1]=2 and d'[i][j+1]=2; and d'[i][j+1]=2 and d'[i][j+2]=2, in step S296, the horizontal array checking section 72 sets a variable h_line'[i][j] indicating whether or not the horizontally arranged pixels, containing the subject pixel, of a number based on the value of h_num, have the same dot value to h_line'[i][j]=1.

When it is determined in step S293 that none of the following conditions is satisfied: d'[i][j−2]=1 and d'[i][j−1]=1; d'[i][j−1]=1 and d'[i][j+1]=1; and d'[i][j+1]=1 and d'[i][j+2]=1, when it is determined in step S294 that d'[i][j] is not equal to 2, or when it is determined in step S295 that none of the following conditions is satisfied: d'[i][j−2]=2 and d'[i][j−1]=2; d'[i][j−1]=2 and d'[i][j+1]=2; and d'[i][j+1]=2 and d'[i][j+2]=2, in step S297, the horizontal array checking section 72 sets a variable h_line'[i][j] indicating whether or not the horizontally arranged pixels, containing the subject pixel, of a number based on the variable of h_num have the same dot value to h_line'[i][j]=0.

After the process of step S296 or after the process of step S297, in step S298, the horizontal array checking section 72 determines whether or not the processing of all the pixels is completed.

When it is determined in step S298 that the processing of all the pixels is not completed, the process returns to step S291, and this and subsequent steps are repeated. When it is determined in step S298 that the processing of all the pixels is completed, the processing is terminated.

As a result of the processes described with reference to FIG. 40, when the subject pixel has a dot value 1 or 2, it is determined whether or not the horizontally arranged pixels, containing the subject pixel, of a number based on the value of h_num, have the same dot value, and a variable h_line'[i][j] is output. When h_line'[i][j]=1, since the pixels having the same dot value are arranged horizontally, it may be said that the possibility that dot interference has not occurred is high.

Figure 41:
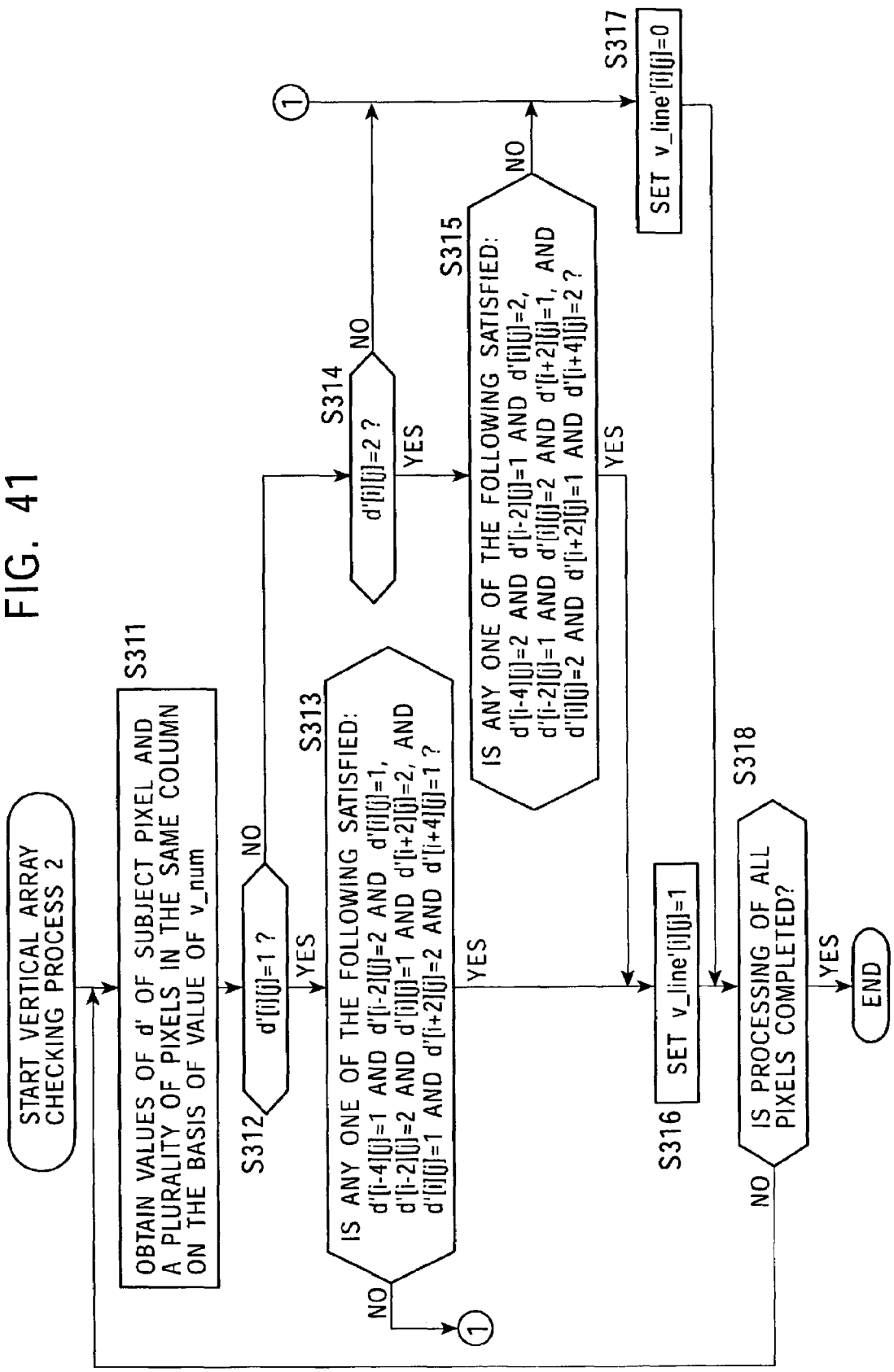
FIG. 41 is a flowchart illustrating a vertical array checking process 2.

Next, referring to the flowchart in FIG. 41, a description will be given of a vertical array checking process 2 performed by the vertical array checking section 73.

In step S311, the vertical array checking section 73 obtains the dot values d of the subject pixel and a plurality of pixels in the same column on the basis of the value of v_num indicating the number of checking of vertical arrays. v_num can be set as desired. Here, the case of v_num=3 will be described.

Figure 42:
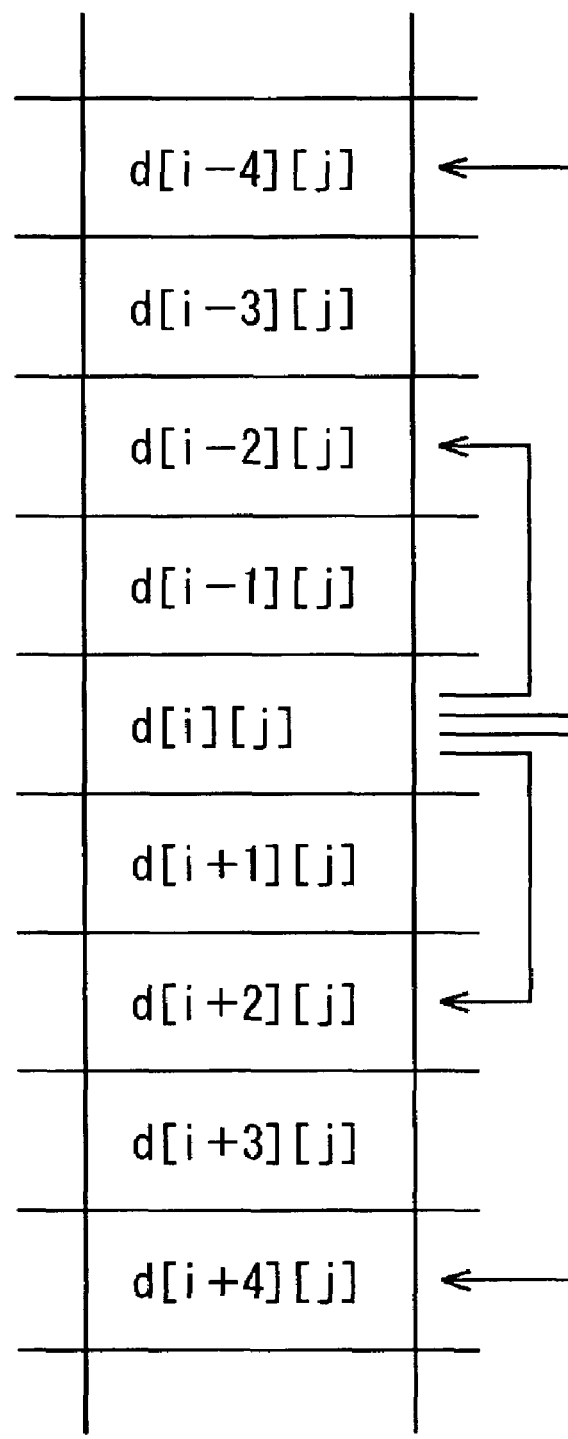
FIG. 42 illustrates dot values to be obtained.
Figure 43A:
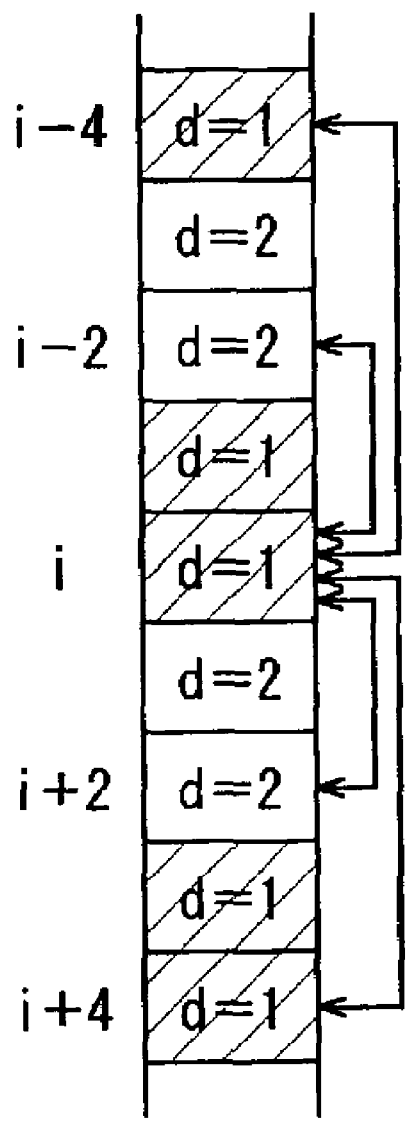
FIGS. 43A and 43B illustrate a vertical array pattern.
Figure 43B:
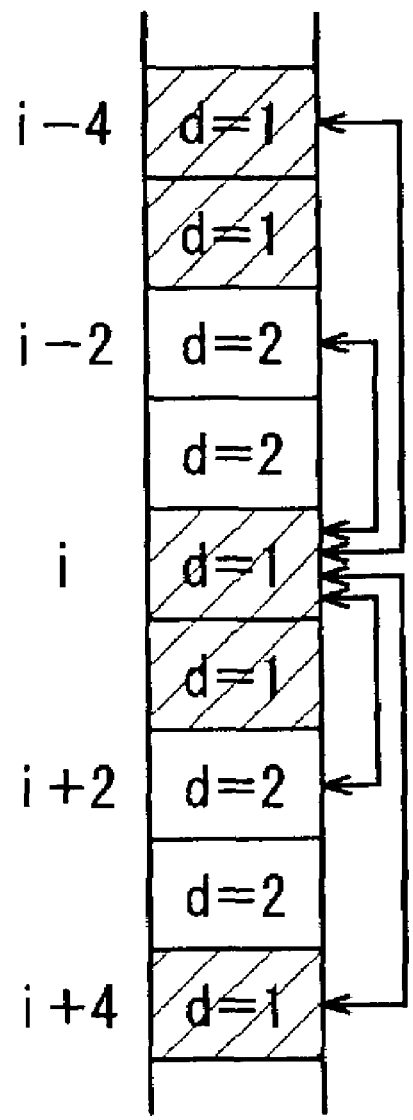
Figure 44A:
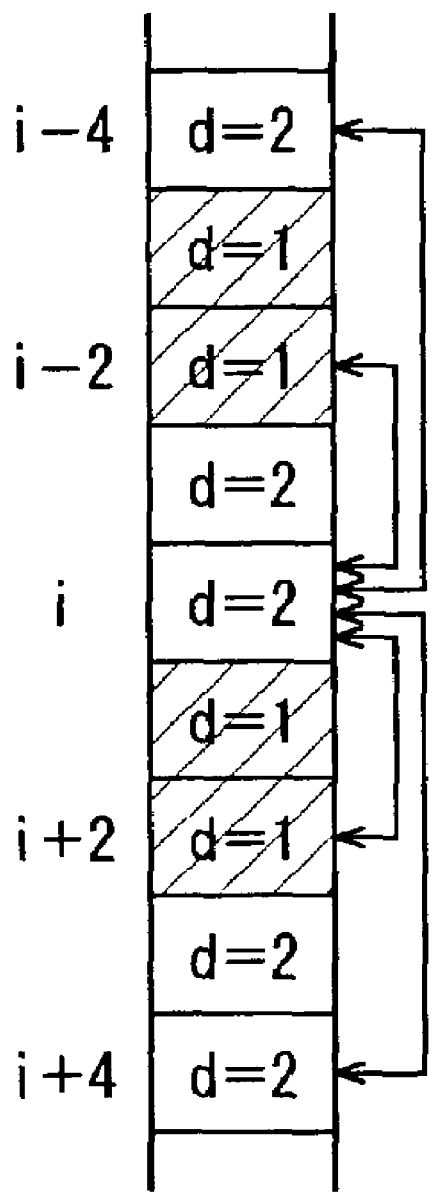
FIGS. 44A and 44B illustrate a vertical array pattern.
Figure 44B:
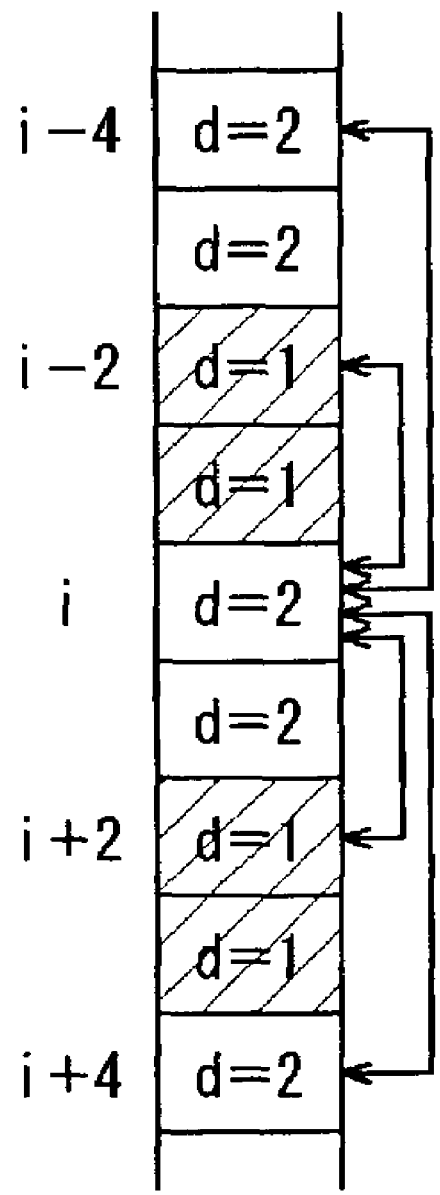

When v_num=3, as shown in FIG. 42, the dot values d'[i+4][j], d'[i+2][j], d'[i][j], d'[i−2][j], and d'[i−4][j] of five values which are vertically arranged every other line with the dot value d'[i][j] of the subject pixel as the center are obtained. A case in which the dot value of the subject pixel is 1 and the dot values of three pixels containing the subject pixel are arranged as "1,2,1" or "2,1,2" using 1 and 2 is shown in FIGS. 43A and 43B. Furthermore, a case in which the dot value of the subject pixel is 2 and the dot values of three pixels containing the subject pixel are arranged as "2,1,2" using 1 and 2 is shown in FIGS. 44A and 44B.

In step S312, the vertical array checking section 73 determines whether or not d'[i][j]=1 on the basis of the dot values obtained in step S311.

When it is determined in step S312 that d'[i][j]=1, in step S313, the vertical array checking section 73 determines whether any one of the following conditions is satisfied: d'[i−4][j]=1 and d'[i−2][j]=2 and d'[i][j]=1; d'[i−2][j]=2 and d'[i][j]=1 and d'[i+2][j]=2; and d'[i][j]=1 and d'[i+2][j]=2 and d'[i+4][j]=1 (that is, the array of the dot values, shown in FIG. 43A or 43B, is provided) on the basis of the dot values obtained in step S311.

When it is determined in step S313 that any one of the following conditions is satisfied: d'[i−4][j]=1 and d'[i−2][j]=2 and d'[i][j]=1; d'[i−2][j]=2 and d'[i][j]=1 and d'[i+2][j]=2; and d'[i][j]=1 and d'[i+2][j]=2 and d'[i+4][j]=1, the process proceeds to step S316. When it is determined in step S313 that none of the following conditions is satisfied: d'[i−4][j]=1 and d'[i−2][j]=2 and d'[i][j]=1; d'[i−2][j]=2 and d'[i][j]=1 and d'[i+2][j]=2; and d'[i][j]=1 and d'[i+2][j]=2 and d'[i+4][j]=1, the process proceeds to step S317.

When it is determined in step S312 that d'[i][j] is not equal to 1, in step S314, the vertical array checking section 73 determines whether or not d'[i][j]=2 on the basis of the dot values obtained in step S311.

When it is determined in step S314 that d'[i][j] is not equal to 2, the process proceeds to step S317.

When it is determined in step S314 that d'[i][j]=2, in step S315, the vertical array checking section 73 determines whether any one of the following conditions is satisfied: d'[i−4][j]=2 and d'[i−2][j]=1 and d'[i][j]=2; d'[i−2][j]=1 and d'[i][j]=2 and d'[i+2][j]=1; and d'[i][j]=2 and d'[i+2][j]=1 and d'[i+4][j]=2 (that is, the array of the dot values shown in FIG. 44A or 44B is provided) on the basis of the dot values obtained in step S311.

When it is determined in step S313 that any one of the following conditions is satisfied: d'[i−4][j]=1 and d'[i−2][j]=2 and d'[i][j]=1; d'[i−2][j]=2 and d'[i][j]=1 and d'[i+2][j]=2; and d'[i][j]=1 and d'[i+2][j]=2 and d'[i+4][j]=1, or when it is determined in step S315 that any one of the following conditions is satisfied: d'[i−4][j]=2 and d'[i−2][j]=1 and d'[i][j]=2; d'[i−2][j]=1 and d'[i][j]=2 and d'[i+2][j]=1; and d'[i][j]=2 and d'[i+2][j]=1 and d'[i+4][j]=2, in step S316, the vertical array checking section 73 sets a variable v_line'[i][j] indicating whether or not the vertically arranged pixels, containing the subject pixel, of a number based on the value of v_num, have the dot values arranged as "2,1,2" or "1,2,1" to v_line'[i][j]=1.

When it is determined in step S313 that none of the following conditions is satisfied: d'[i−4][j]=1 and d'[i−2][j]=2 and d'[i][j]=1; d'[i−2][j]=2 and d'[i][j]=1 and d'[i+2][j]=2; and d'[i][j]=1 and d'[i+2][j]=2 and d'[i+4][j]=1, when it is determined in step S314 that d'[i][j] is not equal to 2, or when it is determined in step S315 that none of the following conditions is satisfied: d'[i−4][j]=2 and d'[i−2][j]=1 and d'[i][j]=2; d'[i−2][j]=1 and d'[i][j]=2 and d'[i+2][j]=1; and d'[i][j]=2 and d'[i+2][j]=1 and d'[i+4][j]=2, in step S317, the vertical array checking section 73 sets a variable v_line'[i][j] indicating whether or not the vertically arranged pixels, containing the subject pixel, of a number based on the value of v_num, have the dot values arranged as "2,1,2" or "1,2,1" to v_line'[i][j]=0.

After the process of step S316 or after the process of step S317, in step S318, the vertical array checking section 73 determines whether or not the processing of all the pixels is completed.

When it is determined in step S318 that the processing of all the pixels is not completed, the process returns to step S311, and this and subsequent steps are repeated. When it is determined in step S318 that the processing of all the pixels is completed, the processing is terminated.

As a result of the processes described with reference to FIG. 41, when the subject pixel has a dot value 1 or 2, it is determined whether or not the dot values, which are vertically arranged every other line, containing the subject pixel, of a number based on the value of v_num, are arranged as "2,1,2" or "1,2,1", and the variable v_line'[i][j] is output. When v_line'[i][j]=1, since the dot values of the pixels which are vertically arranged every other line are arranged as "2,1,2" or "1,2,1", it may be said that the possibility that dot interference has occurred is high.

Next, referring to the flowchart in FIG. 45, a description will be given of an image enhancement process 3 performed by the enhancement processing section 62.

In step S331, the enhancement processing section 62 receives an input of a Y signal, and obtains the values of v_line'[i][j] and h_line'[i][j] of the subject pixel from the horizontal array checking section 72 and the vertical array checking section 73 of the 2-dot-interference detection section 61.

In step S332, the enhancement processing section 62 determines whether or not v_line'[i][j] of the subject pixel is equal to 1.

When it is determined in step S332 that v_line'[i][j]=1, in step S333, the enhancement processing section 62 determines whether or not h_line'[i][j] of the subject pixel is equal to 1.

When it is determined in step S333 that h_line'[i][j]=1, in step S334, the enhancement processing section 62 determines whether or not the predetermined value of hv_skip is 1.

Here, the value of hv_skip can be set to 1 or 0, whichever is desired. The pixel in which v_line'[i][j] and h_line'[i][j]=1 has a possibility that, similarly to the case of the image enhancement process 1 described with reference to FIG. 15, 2-dot interference has occurred, but that possibility is low to some degree. For such a pixel, when the value of hv_skip is set to 1 in advance, it is determined that 2-dot interference has not occurred, and when the value of hv_skip is set to 0 in advance, it is determined that 2-dot interference has occurred.

When it is determined in step S332 that v_line'[i][j] is not equal to 1, or when it is determined in step S334 that the value of hv_skip is equal to 1, in steps S335 to S341, the processes which are the same as the processes of steps S61 to S67 of FIG. 15 are performed.

When it is determined in step S333 that h_line'[i][j] is not equal to 1 or when it is determined in step S334 that the value of hv_skip is not equal to 1, it is determined that 2-dot interference has occurred, and the process proceeds to step S340.

When it is determined in step S341 that the processing of all the pixels is not completed, the process returns to step S331, and this and subsequent steps are repeated. When it is determined in step S341 that the processing of all the pixels is completed, the processing is terminated.

As a result of the processes described with reference to FIG. 45, the position at which dot interference, which occurs when YC separation is performed on a color video signal of a PAL method, occurs is accurately detected, and an enhancement process is performed on only the portion where dot interference has not occurred. As a result, it becomes possible to obtain a better enhanced image in which the portion where dot interference has occurred is enhanced.

Here, a case is described in which the position where dot interference occurs is detected after a YC separation process of a color video signal of a PAL method, and an enhancement process is performed on portions other than the portions in which dot interference occurs. Alternatively, as a result of the same processes, the position where dot interference occurs is detected after a YC separation process of a color video signal of a PAL method, and a filtering process described in the second embodiment is performed on portions in which dot interference occurs, making it possible to obtain an image signal in which the influence of dot interference is reduced.

In the vertical averaging process in which a filtering process is performed on a color video signal of a PAL method, similarly to the dot detection process 2 described with reference to FIG. 38 and the vertical array checking process 2 described with reference to FIG. 41, a comparison with pixels which are positioned two lines above and below the subject pixel is performed.

Similarly, the position at which dot interference occurs is detected after a YC separation process of a color video signal of a PAL method, and similarly to the case described in the third embodiment, after a filter is applied at the position where dot interference occurs, an interpolation process is performed using an image signal in which the influence of dot interference is reduced, making it possible to obtain a better enlarged image.

[Enhancement Process of PAL Color Image Signal Using Color-signal-edge Detection]

Figure 46:
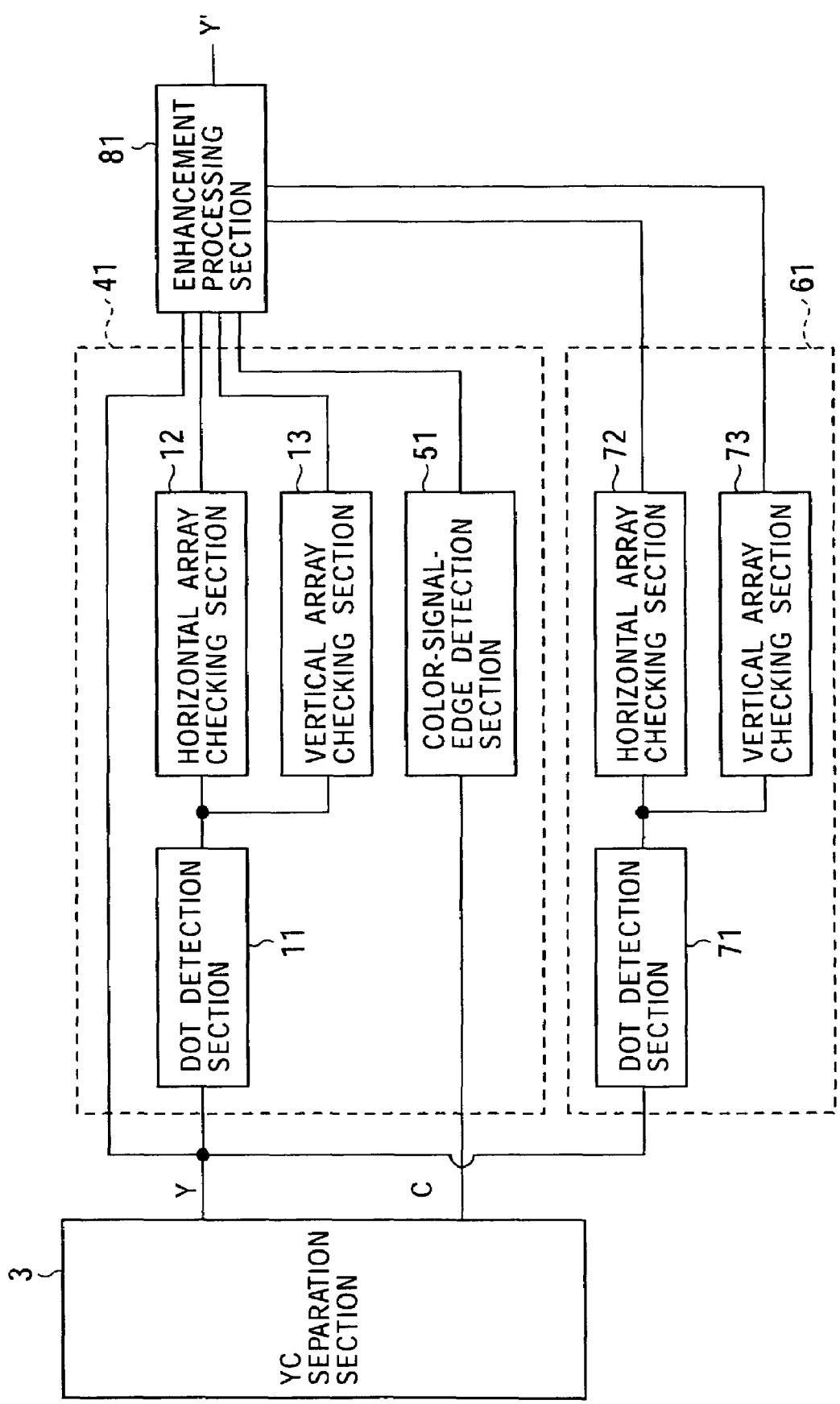
FIG. 46 is a block diagram illustrating an eighth embodiment of the present invention.

Next, FIG. 46 is a block diagram illustrating an eighth embodiment of the present invention. In the eighth embodiment, a description will be given of a case in which a process for a Y signal after a PAL color image signal is YC-separated is performed using a C signal.

Components in FIG. 46 corresponding to those in FIGS. 26 and 37 are given the same reference numerals, and accordingly, descriptions thereof are omitted. That is, in FIG. 46, basically, the same configuration as that described with reference to FIG. 37 is provided except that an enhancement processing section 81 is provided in place of the enhancement processing section 62 and the dot-interference detection section 41 described with reference to FIG. 37 is provided in place of the dot-interference detection section 1.

However, the color-signal-edge detection section 51 of the dot-interference detection section 41 receives an input of a C signal after a PAL color image signal is YC-separated. Therefore, for the edge detection filter used in step S182 of the color-edge detection process described with reference to FIG. 2, for example, the edge detection filter shown in FIG. 47 is used. The edge detection filter shown in FIG. 47 corresponds to that in which a difference filter (1,0,−1) is applied after applying a moving average filter of 5×5.

The enhancement processing section 81 receives an input of a Y signal from the dot-interference detection section 41, detects whether or not there is a portion where 2-dot interference is thought to have occurred on the basis of the signals input from the horizontal array checking section 72 and the vertical array checking section 73 of the 2-dot-interference detection section 61 by using a target pixel which is determined to be a color edge on the basis of the signal input from the color-signal-edge detection section 51 of the dot-interference detection section 41, and performs an enhancement process on a Y signal of portions other than the portions where 2-dot interference occurs. Then, when it is determined that 2-dot interference has not occurred, the enhancement processing section 81 detects the portion where dot interference is thought to have occurred on the basis of the signals input from the horizontal array checking section 12 and the vertical array checking section 13, and performs an enhancement process on the Y signal of portions other than the portions where dot interference occurs.

Figure 48:
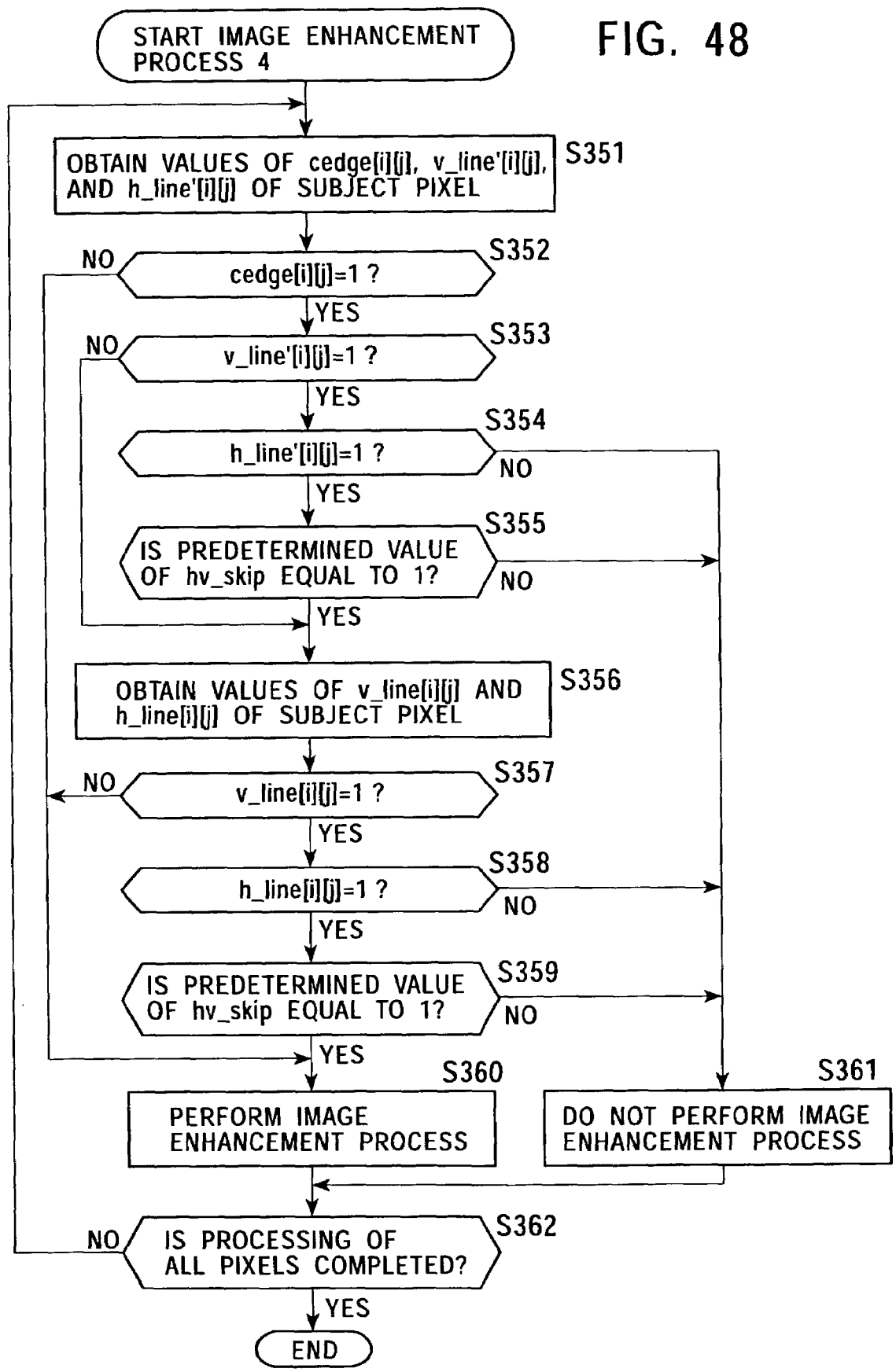
FIG. 48 is a flowchart illustrating an image enhancement process 4.

Next, referring to the flowchart in FIG. 48, a description will be given of an image enhancement process 4 performed by the enhancement processing section 81.

In step S351, the enhancement processing section 81 obtains the values of cedge[i][j], v_line'[i][j], and h_line'[i][j] of the subject pixel.

In step S352, the enhancement processing section 81 determines whether or not cedge[i][j]=1.

Figure 45:
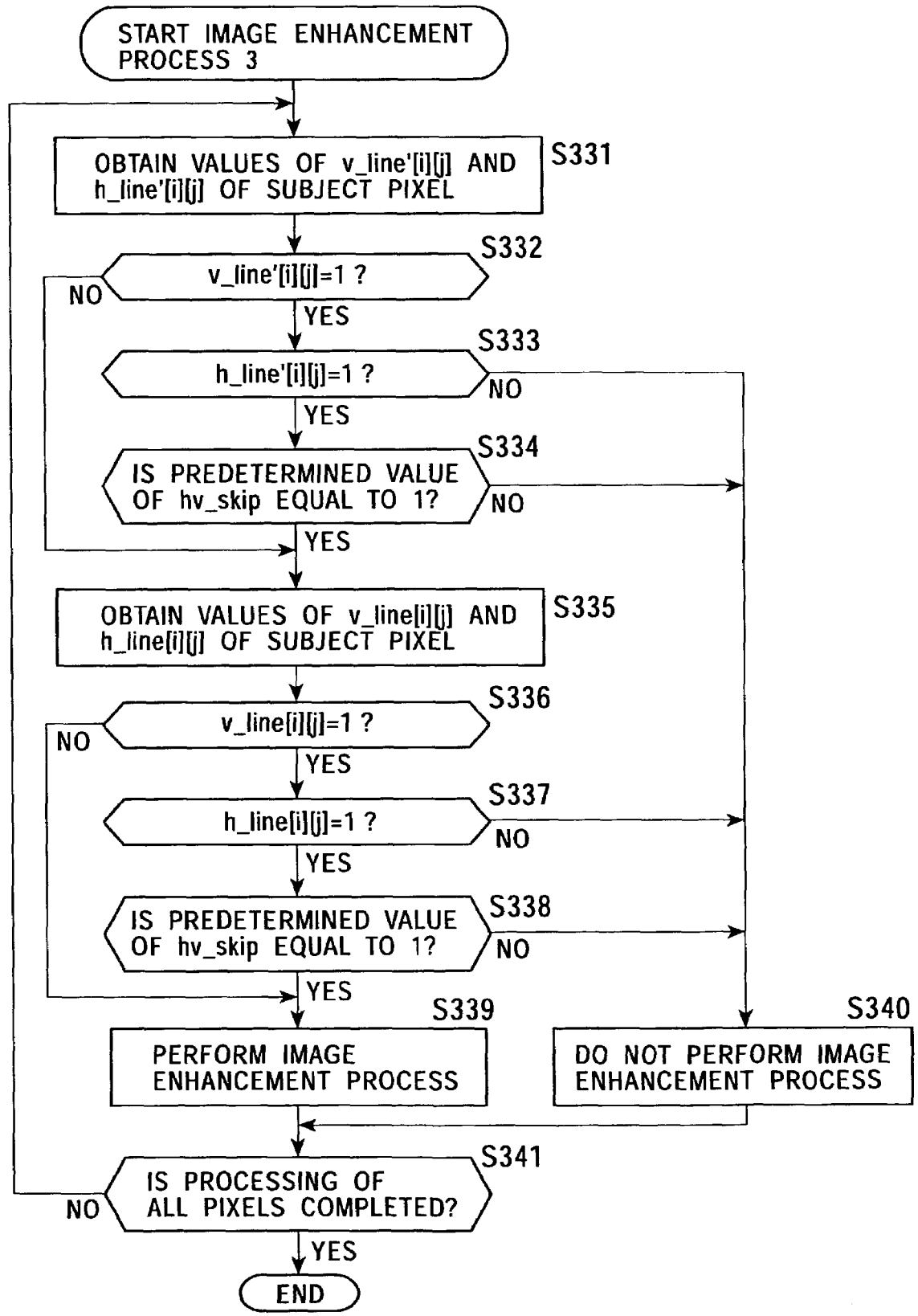
FIG. 45 is a flowchart illustrating an image enhancement process 3.

When it is determined in step S352 that cedge[i][j]=1, in steps S353 to S362, the same processes as those of steps S332 to S341 of FIG. 45 are performed.

When it is determined in step S352 that cedge[i][j] is not equal to 1, the process proceeds to step S360, where the image enhancement process is performed, and then, subsequent processes are performed.

When it is determined in step S362 that the processing of all the pixels is not completed, the process returns to step S351, and this and subsequent steps are repeated. When it is determined in step S362 that the processing of all the pixels is completed, the processing is terminated.

As a result of the processes described with reference to FIG. 48, since the position where dot interference, which occurs when YC separation is performed in a color video signal of a PAL method, occurs is detected as the target pixel for which a color edge is detected in the vicinity thereof, the same advantages as those of the processes described with reference to FIG. 45 can be obtained in a short processing time.

Here, a case is described in which, after a YC separation process of a color video signal of a PAL method, a color edge is detected, the position at which dot interference occurs is detected on the basis of the color-edge detection result, and an enhancement process is performed while avoiding portions where dot interference occurs. Alternatively, as a result of the same processes, after the YC separation process of a color video signal of a PAL method, the position at which dot interference occurs is detected on the basis of the color-edge detection result, and a filtering process described in the fifth embodiment is performed at the position where dot interference occurs, thereby making it possible to obtain an image signal in which the influence of dot interference is reduced in a short processing time.

In the vertical averaging process in a case where a filtering process is performed on a color video signal of a PAL method, a comparison with pixels which are positioned two lines above and below the subject pixel is made similarly to the dot detection process 2 described with reference to FIG. 38 and the vertical array checking process 2 described with reference to FIG. 41.

Similarly, based on the color-edge detection result, the position where dot interference occurs is detected. Similarly to the case described in the sixth embodiment, after a filter is applied at the position of the portion where dot interference occurs, by performing an interpolation process using an image signal in which the influence of dot interference is reduced, it is possible to obtain a better enlarged image in a short processing time.

As a result of the processes which have thus been described, portions where dot interference occurs are accurately extracted from the YC-separated signal, containing dot interference which occurs by YC separation, and image processing at subsequent stages is performed using the result. Consequently, for example, the following types of problem do not occur: the dot interference portion being further enhanced due to an enhancement process; the resolution of the portion where dot interference has not occurred being reduced due to a filtering process for reducing the influence of dot interference; or an image having a conspicuous dot interference portion being generated as a result of performing an enlargement process on an image in which dot interference occurs. Therefore, it becomes possible to obtain a better image in which the influence of dot interference is reduced.

In the present invention, the separation of an image signal into two or more image component signals can be performed within the signal processing apparatus. That is, the separation section for separating an image signal into two or more image component signals can be disposed within the signal processing apparatus. In such a configuration, the size of the image processing apparatus including the signal processing apparatus can be reduced.

Furthermore, the separation of an image signal into two or more image component signals can also be performed outside the signal processing apparatus. That is, the separation section for separating an image signal into two or more image component signals can be disposed outside the signal processing apparatus. In such a configuration, the flexibility of the image processing apparatus including the signal processing apparatus can be increased.

In the present invention, various patterns can be used as long as a specific noise pattern occurs in one or more image component signals. The present invention is suitable for use in a case where, in particular, a pattern specific to the noise occurs in one or more image component signals. Examples of image signal noise include dot interference, cross color, and checkered noise.

Although the above-described series of processes can be performed by hardware, the processes can also be performed by software. For the software, programs which form the software are installed from a recording medium into a computer incorporated into dedicated hardware or into, for example, a general-purpose personal computer capable of executing various types of functions by installing various programs.

Figure 49:
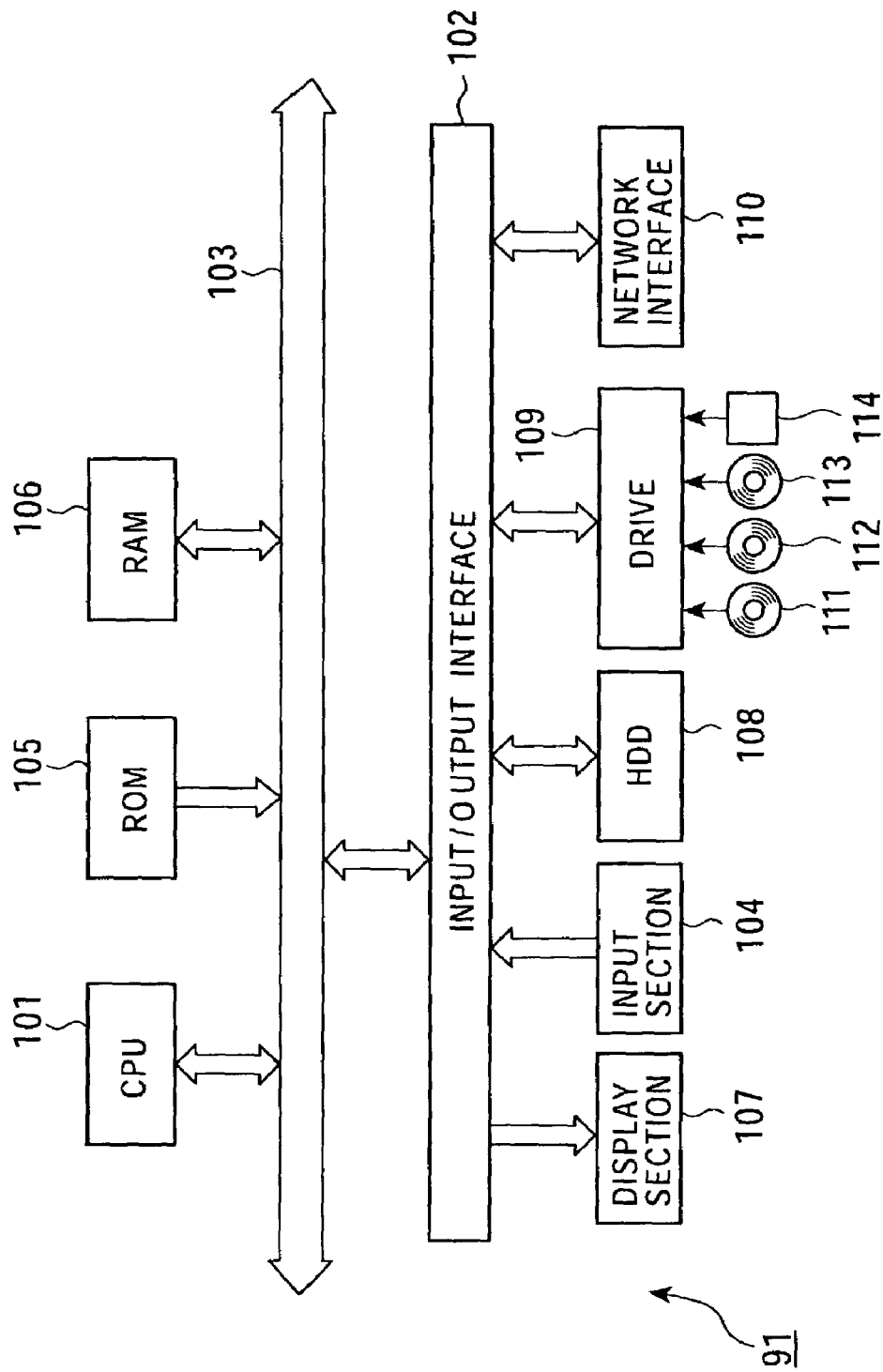
FIG. 49 illustrates a personal computer.

This recording medium, as shown in FIG. 49, is constructed by packaged media formed of a magnetic disk 111 (including a flexible disk), an optical disk 112 (including a CD-ROM (Compact Disk-Read Only Memory), and a DVD (Digital Versatile Disk)), a magneto-optical disk 113 (including an MD (Mini-Disk)(trademark)), or a semiconductor memory 114, in which programs are recorded, which is distributed separately from the computer so as to distribute programs to a user.

A description will now be given of a personal computer 91 with reference to FIG. 49.

The CPU (Central Processing Unit) 101 receives an input of signals corresponding to various commands which are input by a user using the input section 104 through an input/output interface 102 and an internal bus 103 and an input of a control signal transmitted by another personal computer, and performs various processes in accordance with the input signals. The ROM (Read Only Memory) 105 basically stores fixed data among programs and computation parameters used by the CPU 101. The RAM (Random Access Memory) 106 stores programs during execution by the CPU 101 and parameters which vary appropriately during the execution. The CPU 101, the ROM 105, and the RAM 106 are interconnected with each other through the internal bus 103.

The internal bus 103 is also connected to the input/output interface 102. The input section 104 is formed of, for example, a keyboard, a touch pad, a jog dial, a mouse, etc., and this section is operated when the user inputs various commands to the CPU 101. The display section 107 is formed of, for example, a CRT (Cathode Ray Tube) or a liquid-crystal display device, and displays various types of information in the form of text or images.

A HDD (hard disk drive) 108 drives a hard disk so that a program executed by the CPU 101 and information are recorded into or reproduced from the hard disk. The magnetic disk 111, the optical disk 112, the magneto-optical disk 113, and the semiconductor memory 114 are loaded into the drive 109 as necessary, so that data is exchanged.

A network interface 110 is connected to other personal computers or various devices other than the personal computers in a wired or wireless manner by using a predetermined cable, exchanges information with those personal computer and devices, and accesses a Web server over the Internet in order to exchange information.

The series of the input section 104 to the network interface 110 is connected to the CPU 101 via the input/output interface 102 and the internal bus 103.

In this specification, steps which describe a program recorded in a recording medium contain not only processing performed in a time-series manner along the described sequence, but also processing performed in parallel or individually although the processing is not necessarily performed in a time-series manner.

What is claimed is:

1. A signal processing apparatus comprising:
    a detection section for detecting a position at which a specific pattern, corresponding to noise which occurs after an image signal is separated into component signals, is generated, from one or more of said component signals within the two or more component signals generated by the separation; and
    an extraction section for extracting a position of an image having a predetermined feature on the basis of one or more of the other of said component signals within the component signals generated by said separation,
    wherein said detection section detects the position at which said specific pattern is generated on the basis of data of one or more of said component signals corresponding to the image position extracted by said extraction section.

2. A signal processing apparatus according to claim 1, wherein said predetermined feature is a color edge.

3. A signal processing apparatus according to claim 1, wherein said separation is YC separation.

4. A signal processing apparatus according to claim 1, further comprising an enhancement processing section for performing enhancement processing on said component signal,
    wherein said enhancement processing section performs enhancement processing on said component signal which is not detected by said detection section as a signal indicating the position at which the specific pattern corresponding to said noise is generated.

5. A signal processing apparatus according to claim 1, further comprising a filtering processing section for performing a filtering process on said component signal,
    wherein said filtering processing section performs a filtering process on said component signal which is detected by said detection section as a signal indicating the position at which the specific pattern corresponding to said noise is generated.

6. A signal processing apparatus according to claim 5, further comprising an interpolation section for performing an interpolation process by using said component signal after being subjected to a filtering process by said filtering processing section.

7. A signal processing apparatus according to claim 1, wherein said detection section detects the position at which the specific pattern is generated when said one or more of said component signals are arranged at a predetermined pattern in the vertical direction or in the horizontal direction.

8. A signal processing method comprising:
    detecting a position at which a specific pattern, corresponding to noise which occurs after an image signal is separated into component signals, is generated, from one or more of said component signals within the two or more component signals generated by the separation; and
    extracting a position of an image having a predetermined feature on the basis of one or more of the other of said component signals within the component signals generated by said separation,
    wherein said detecting detects the position at which said specific pattern is generated on the basis of data of one or more of said component signals corresponding to the image position extracted.

9. A computer-executable program comprising:
    detecting a position at which a specific pattern, corresponding to noise which occurs after an image signal is separated into component signals, is generated, from one or more of said component signals within the two or more component signals generated by the separation; and
    extracting a position of an image having a predetermined feature on the basis of one or more of the other of said component signals within the component signals generated by said separation,
    wherein said detecting detects the position at which said specific pattern is generated on the basis of data of one or more of said component signals corresponding to the image position extracted.

* * * * *

UNITED STATES PATENT AND TRADEMARK OFFICE
CERTIFICATE OF CORRECTION

PATENT NO. : 7,088,399 B2 Page 1 of 1
APPLICATION NO. : 10/265662
DATED : August 8, 2006
INVENTOR(S) : Shinichiro Gomi et al.

It is certified that error appears in the above-identified patent and that said Letters Patent is hereby corrected as shown below:

Column 8, line 23, change "d[i-1[j]=2" to --d[i-1][j]--;
         line 26, change "(j]=1" to --[j]=1--.

Column 10, line 57, change "h_line[i][i][j]=1" to --h_line [i][j]=1--.

Column 22, line 54, change "d'[i]" to --d'[i]--.

Column 25, line 32, change "v_line'[i][j] and" to --v_line'[i][j]=1 and--.

Signed and Sealed this

First Day of May, 2007

JON W. DUDAS
*Director of the United States Patent and Trademark Office*